United States Patent
Ueno et al.

(10) Patent No.: US 11,146,155 B2
(45) Date of Patent: Oct. 12, 2021

(54) MOTOR COMPONENT ALIGNMENT METHOD

(71) Applicant: HONDA MOTOR CO., LTD., Tokyo (JP)

(72) Inventors: Daisuke Ueno, Tochigi (JP); Kenichi Ohno, Tochigi (JP); Yutaka Matsumoto, Tochigi (JP); Shinichi Kawano, Tochigi (JP); Mitsugu Ueno, Ehime (JP)

(73) Assignee: HONDA MOTOR CO., LTD., Tokyo (JP)

( * ) Notice: Subject to any disclaimer, the term of this patent is extended or adjusted under 35 U.S.C. 154(b) by 55 days.

(21) Appl. No.: 16/437,439

(22) Filed: Jun. 11, 2019

(65) Prior Publication Data

US 2019/0296622 A1    Sep. 26, 2019

Related U.S. Application Data

(62) Division of application No. 15/022,647, filed as application No. PCT/JP2014/074464 on Sep. 17, 2014, now abandoned.

(30) Foreign Application Priority Data

Sep. 18, 2013    (JP) ................................. 2013-193297

(51) Int. Cl.
*H02K 15/085*    (2006.01)
*H02K 15/06*    (2006.01)
(Continued)

(52) U.S. Cl.
CPC ............. *H02K 15/085* (2013.01); *H02K 3/12* (2013.01); *H02K 15/067* (2013.01); *H02K 15/0037* (2013.01); *H02K 15/0421* (2013.01)

(58) Field of Classification Search
CPC ........... H02K 15/0037; H02K 15/0421; H02K 15/05; H02K 15/067; H02K 15/085; H02K 3/12
See application file for complete search history.

(56) References Cited

U.S. PATENT DOCUMENTS

| 3,315,105 | A | 4/1967 | Moore, Jr. | |
| 7,721,413 | B2 * | 5/2010 | Guercioni | H02K 15/064 |
| | | | | 29/596 |

(Continued)

FOREIGN PATENT DOCUMENTS

| JP | 2003264966 A | * | 9/2003 | ........... H02K 15/085 |
| JP | 2005-65386 | | 3/2005 | |

(Continued)

OTHER PUBLICATIONS

International Search Report, dated Nov. 25, 2014 (Nov. 25, 2014).

*Primary Examiner* — Peter Dungba Vo
*Assistant Examiner* — Jeffrey T Carley
(74) *Attorney, Agent, or Firm* — Rankin, Hill & Clark LLP

(57) ABSTRACT

Provided are an alignment method and an alignment device by which, immediately before aligning, the leg parts of adjacent conductors do not interfere with each other. The alignment method, in which by providing a plurality of coil elements (40) in an annular shape and moving the plurality of coil elements (40) in a direction in which the diameter of the annular shape is reduced, the plurality of coil elements (40) are aligned in a state where turn sections (42) provided at substantially apex portions are alternately overlapped, wherein the plurality of coil elements (40) are aligned by moving each of the plurality of coil elements (40) toward an annularly shaped center, and while doing so, rotating the (Continued)

plurality of coil elements about a rotation axis (231e) that is parallel to the central axis (C1) of the annular shape.

4 Claims, 39 Drawing Sheets

(51) Int. Cl.
*H02K 3/12* (2006.01)
*H02K 15/00* (2006.01)
*H02K 15/04* (2006.01)

(56) References Cited

U.S. PATENT DOCUMENTS

| | | | |
|---|---|---|---|
| 9,016,610 B2* | 4/2015 | Dunesme | H02K 3/12 |
| | | | 242/432.2 |
| 9,444,315 B2* | 9/2016 | Saito | H02K 15/085 |
| 9,712,026 B2* | 7/2017 | Shigematsu | H02K 15/0428 |
| 2003/0121139 A1* | 7/2003 | Katou | H02K 15/0037 |
| | | | 29/596 |
| 2005/0166393 A1 | 8/2005 | Sawada | |
| 2010/0289374 A1* | 11/2010 | Koga | H02K 15/085 |
| | | | 310/195 |
| 2011/0260572 A1* | 10/2011 | Hiraga | H02K 15/068 |
| | | | 310/207 |
| 2012/0200190 A1 | 8/2012 | Matsuoka et al. | |
| 2013/0104381 A1* | 5/2013 | Guercioni | H02K 15/0081 |
| | | | 29/559 |
| 2015/0207391 A1* | 7/2015 | Yamada | H02K 15/085 |
| | | | 29/825 |

FOREIGN PATENT DOCUMENTS

| | | |
|---|---|---|
| JP | 2005-211951 | 8/2005 |
| JP | 3973592 | 6/2007 |
| JP | 2008-61291 | 3/2008 |
| JP | 4214469 | 11/2008 |
| JP | 2012-165624 | 8/2012 |

* cited by examiner (A)

(B)

(A)

(B)

(A)

(B)

(A)

(B)

(A)

(B)

(A)

(B)

(A)

(B)

MOTOR COMPONENT ALIGNMENT METHOD

TECHNICAL FIELD

The present invention relates to an alignment method and an alignment device. In more detail, it relates to an alignment method and an alignment device that align a plurality of electrical conductors in a state of turn sections provided to substantially apex portions being alternately overlapped, by arranging a plurality of substantially U-shaped electrical conductors in an annular shape, and causing the plurality of electrical conductors to move in a direction reducing the diameter of the annular shape.

BACKGROUND ART

The stator coil of a rotating electrical machine is formed in the following way, for example. First, a plurality of electrical conductors molded in a substantially U-shape are aligned in an annular shape while overlapping in the circumferential direction. Next, the legs of each electrical conductor aligned in an annular shape are inserted into the respective slots lined up in an annular shape in the stator core. Then, the ends of adjacent legs are connected. The stator coil of a rotating electrical machine is thereby formed.

However, concerning technology for aligning a plurality of substantially U-shaped electrical conductors in an annular shape while overlapping in the circumferential direction, a variety of considerations has been made thus far. For example, a technology has been proposed that inserts one leg part possessed by a plurality of substantially U-shaped electrical conductors into a plurality of housing grooves provided on an alignment ring pallet, respectively, and rotates the alignment ring pallet in this state (refer to Patent Document 1). Similarly, a technology has been proposed that inserts the one leg part possessed by a plurality of substantially U-shaped electrical conductors respectively into a plurality of holes provided in an alignment device, and then causes the holes to rotate by rotating an inner-circumferential member of the alignment device in this state (refer to Patent Document 2). According to these technologies, by the plurality of electrical conductors rotating by driving to follow the rotation of the alignment ring pallet or the inner-circumferential member of the alignment device, it is said that the plurality of electrical conductors can be aligned in an annular shape while overlapping in the circumferential direction.

Patent Document 1: Japanese Patent No. 3973592
Patent Document 2: Japanese Patent No. 4214469

DISCLOSURE OF THE INVENTION

Problems to be Solved by the Invention

However, with the above-mentioned technologies, it is not possible to manufacture a stator coil made by collecting a plurality of electrical conductors with high density.

On the other hand, in order to collect a plurality of electrical conductors with high density, a technology has been considered that causes each of the plurality of electrical conductors to gather at the center by gripping with gripping devices. In this case, when gripping and aligning one leg part possessed by the plurality of electrical conductors, since the other leg part not being gripped will scatter, a problem arises in that leg parts of adjacent electrical conductors will interfere immediately before alignment.

The present invention is for solving the above-mentioned problems, and an object thereof is to provide an alignment method and alignment device whereby the leg parts of adjacent electrical conductors will not interfere immediately before alignment, when gripping and aligning one leg part possessed by a plurality of electrical conductors.

Means for Solving the Problems

According to a first aspect of the present invention, in an alignment method for aligning a plurality of substantially U-shaped electrical conductors (e.g., the coil element 40 described later) in a state in which turn sections provided to a substantially apex portion thereof are alternately overlapped, by arranging the plurality of electrical conductors in an annular shape, and causing the plurality of the electric conductors to move in a direction to reduce the diameter of the annular shape, the method includes: aligning the plurality of the electrical conductors by causing each of the plurality of the electrical conductors to rotate about a shaft (e.g., the rotation shaft 231e described later) that is parallel to a central axis (e.g., the central axis C1 described later) of the annular shape, while causing to move towards the center of the annular shape.

According to the first aspect of the present invention, each of the plurality of electrical conductors is made to rotate about the shaft that is parallel to the central axis of annular shape, while being made to move towards the center of the annular shape.

Since the plurality of the electrical conductors thereby rotate, the diameter of the annular shape in which the plurality of electrical conductors is arranged becomes smaller than a state not rotated, and interference between adjacent electrical conductors is avoided, and the plurality of electrical conductors align in a state in which turn sections provided to the substantially apex portions are alternately overlapped.

Therefore, when one leg part possessed by the plurality of electrical conductors is gripped and made to align, the leg parts of adjacent electrical conductors will not interfere immediately before alignment.

According to a second aspect of the present invention, in the alignment method as described in the first aspect, each of the plurality of the electrical conductors is arranged in a state rotated by a predetermined angle about the shaft that is parallel to the central axis of the annular shape, when aligning by reducing the diameter of the annular shape.

According to the second aspect of the present invention, since the plurality of electrical conductors rotates by a predetermined angle about the shaft that is parallel to the central axis of annular shape, the diameter of the annular shape in which the plurality of electrical conductors is arranged becomes smaller than a state not rotated, and interference between adjacent electrical conductors is avoided.

According to a third aspect of the present invention, in alignment device (e.g., the stator manufacturing device 1 described later) for aligning a plurality of substantially U-shaped electrical conductors (e.g., the coil element 40 described later) in a state in which turn sections provided to substantially apex portions thereof are alternately overlapped, by arranging the plurality of electrical conductors in an annular shape, and causing the plurality of the electric conductors to move in a direction to reduce the diameter of the annular shape, the alignment device includes: a plurality of gripping devices (e.g., the gripping device 230 described later) that respectively grip a plurality of the electrical conductors; and a movement device (e.g., the drive mechanism 250 described later) that causes the plurality of the gripping devices to move towards the center of an annular shape, in which each of the plurality of the gripping devices causes the electrical conductor to rotate about a shaft (e.g., the rotation shaft 231e described later) that is parallel to a central axis (e.g., the central axis C1 described later) of annular shape, while moving by way of the movement device.

Similar operations and effects as the first aspect of the present invention are exerted according to the third aspect of the present invention.

According to a fourth aspect of the present invention, in the alignment device as described in the third aspect, each of the plurality of the gripping devices has a biasing member (e.g., the spring 233 described later) that biases in the opposite direction to a direction rotating the electrical conductor by a predetermined angle about a shaft that is parallel to the central axis of the annular shape.

According to the fourth aspect of the present invention, each of the plurality of electrical conductors is biased by a biasing means to the opposite direction to the direction of rotating the electrical conductors by a predetermined angle about the shaft that is parallel to the central axis of annular shaft. For this reason, it is possible to rotate each of the plurality of electrical conductors about the shaft that is parallel to the central axis of annular shape, while causing to move towards the center of the annular shape.

According to a fifth aspect of the present invention, in the alignment device as described in the third or fourth aspect, each of the plurality of the gripping devices has an upper branch (e.g., the upper branch 232 described later) that grips the electrical conductor and is capable of rotating about the shaft that is parallel to the central axis of the annular shape, and a pin (e.g., the pin 232c described later) that is provided to the upper branch and projects on a movement path of the gripping device, a correction groove (e.g., the correction groove 223 described later) that guides the pin is provided on the movement path of the gripping device, and the upper branch gripping the electrical conductor is made to rotate by the pin being guided in the correction groove.

According to the fifth aspect of the present invention, by the pin being guided in the correction groove to cause the upper branch gripping the electrical conductor to rotate, it is possible to rotate each of the plurality of electrical conductors about the shaft that is parallel to the central axis of annular shape, while causing to move towards the center of the annular shape.

Effects of the Invention

According to the present invention, it is possible to provide an alignment method and alignment device whereby the leg parts of adjacent electrical conductors will not interfere immediately before alignment, when gripping and aligning one leg part possessed by a plurality of electrical conductors.

PREFERRED MODE FOR CARRYING OUT THE INVENTION

Hereinafter, embodiments of the present invention will be explained in detail while referencing the drawings.
<Configuration of Stator Manufacturing Device>

Figure 1:
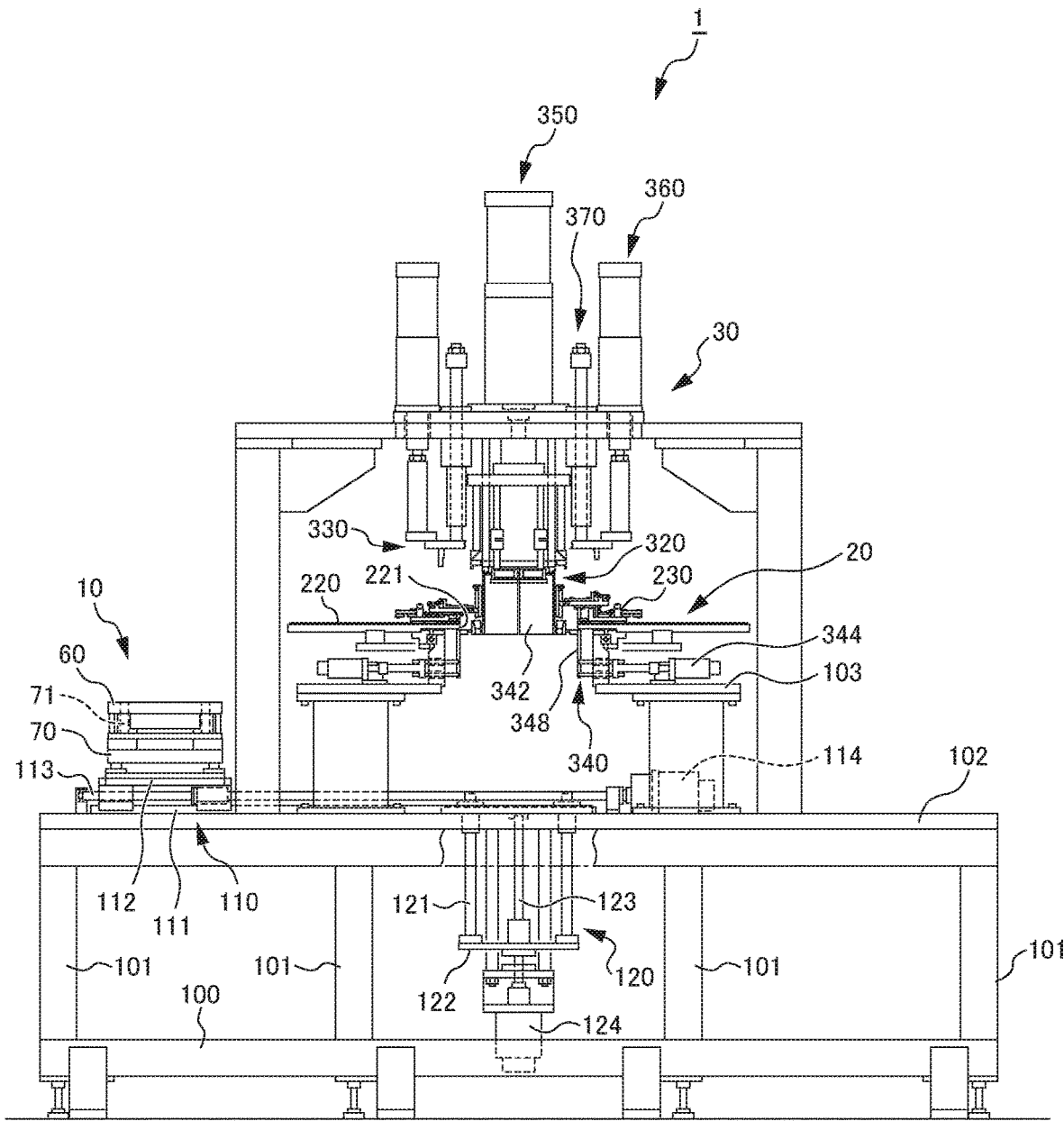
FIG. 1 is a front view showing a stator manufacturing device according to an embodiment of the present invention.
Figure 2:
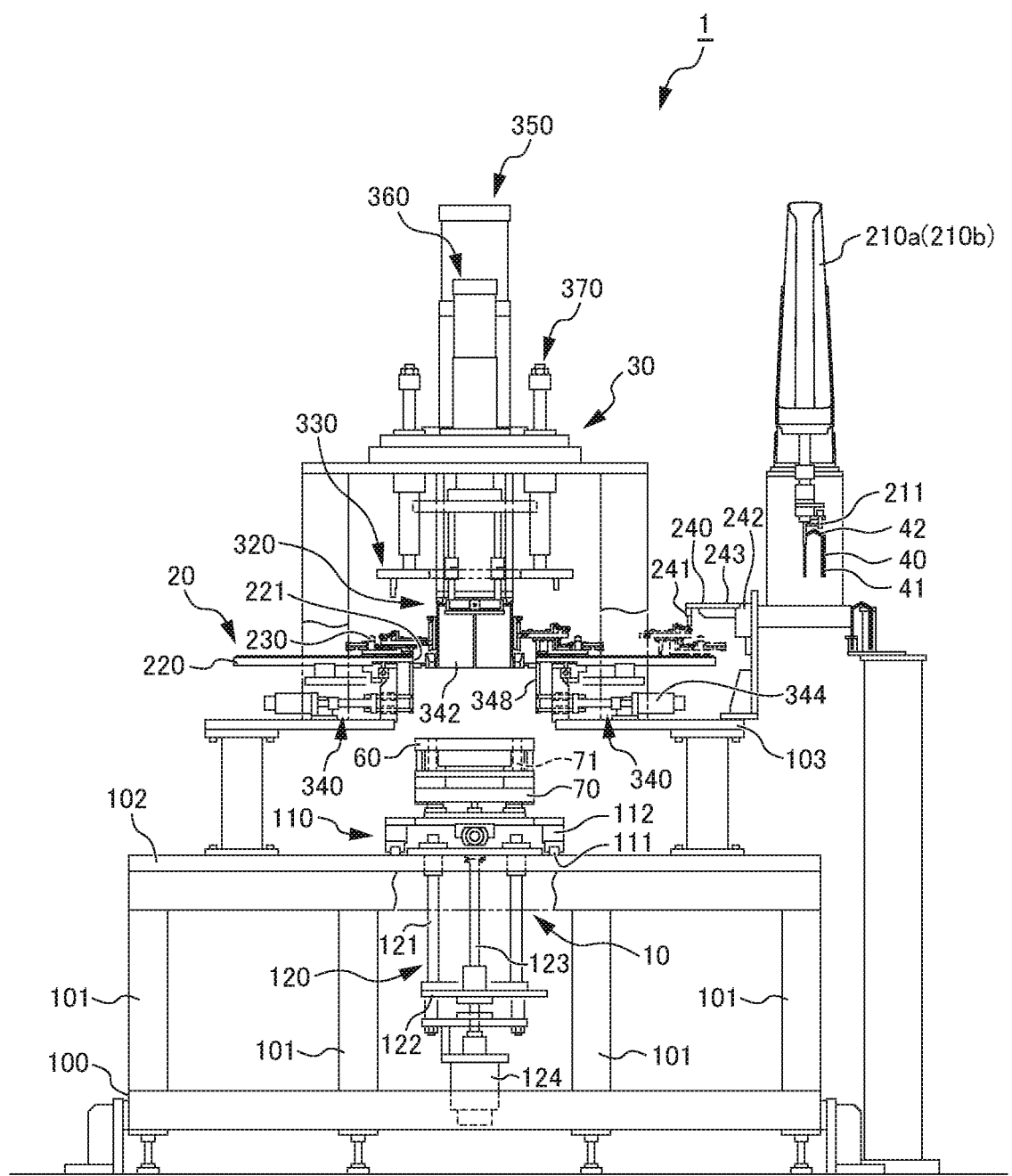
FIG. 2 is a side view showing the stator manufacturing device according to the above-mentioned embodiment.
Figure 3:
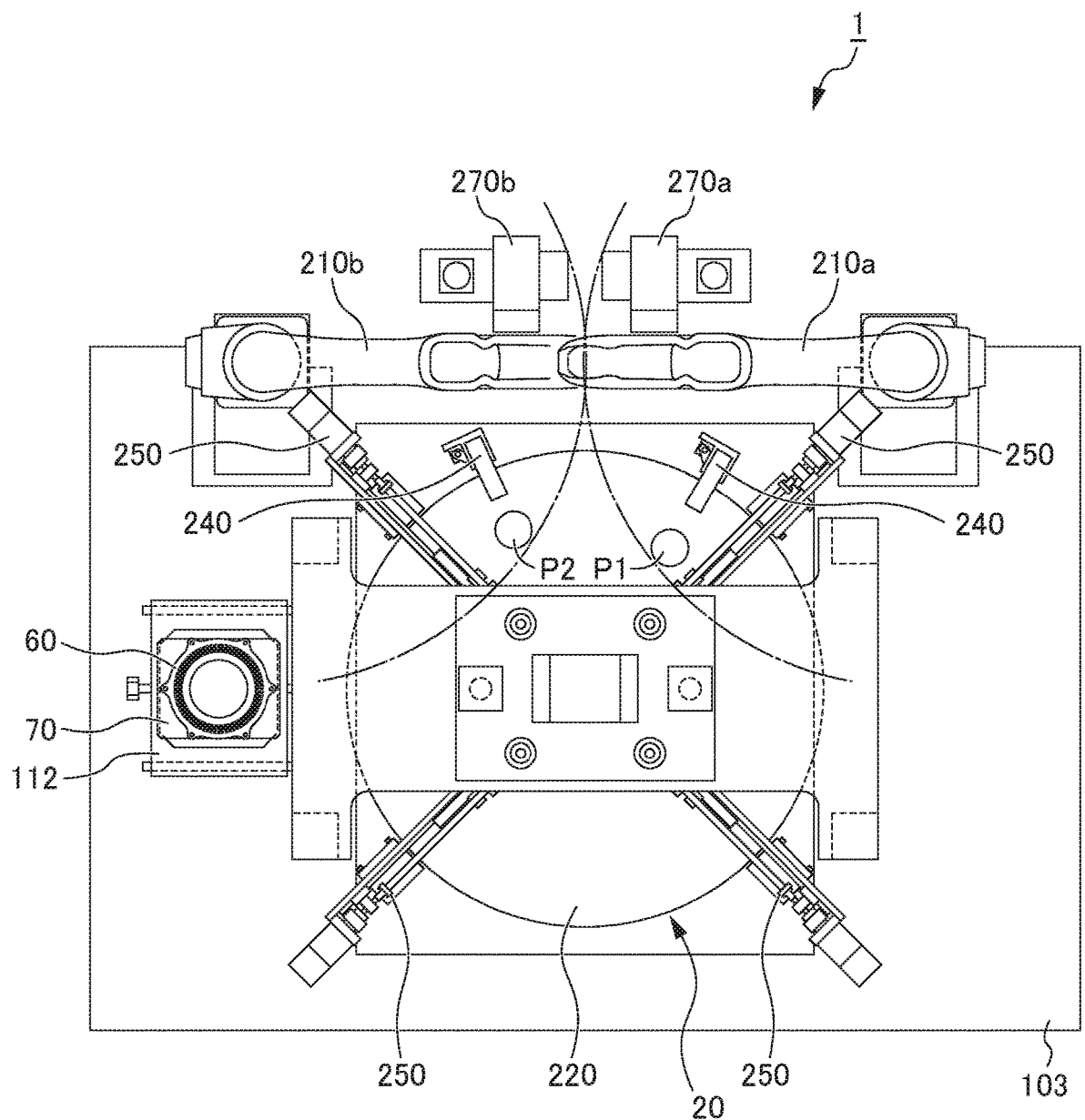
FIG. 3 is a top view showing the stator manufacturing device according to the above-mentioned embodiment.

FIG. 1 is a front view showing a stator manufacturing device 1 according to the present embodiment. FIG. 2 is a side view showing the stator manufacturing device 1 according to the present embodiment. FIG. 3 is a top view showing the stator manufacturing device 1 according to the present embodiment.

The stator manufacturing device 1 is configured to include a stator core conveying device 10, coil element alignment device 20, and coil element insertion device 30.

The stator manufacturing device 1 manufactures a stator by forming an assembly 50 assembled by molding substantially U-shaped coil elements 40 from linear electrical conductors at the device rear, arranging a plurality of the coil elements 40 thus molded in an annular shape with the coil element alignment device 20, and causing the plurality of coil elements 40 thus arranged in an annular shape to move in a direct reducing the diameter of the annular shape with the coil element alignment device 20, and then inserting a leg part 41 of each of the coil elements 40 in the assembly 50 thus formed into the respective slots 61 of a stator core 60 with the coil element insertion device 30.

Herein, as the coil element 40 serving as the electrical conductor, a coil element 40 for rotating electrical machines forming the stator coil by each being inserted into the respective slots 61 of the stator core 60 of a rotating electric machine, and the ends of each other being connected.

In addition, the stator core 60 has the plurality of slots 61 lined up in an annular shape. Insulating paper 62 is installed inside of the slots 61 by sticking to the inner wall. The insulating paper 62 allows contact between the coil element 40 and stator core 60 to be avoided.

The stator manufacturing device 1 arranges the stator core conveying device 10 on a base 100, arranges the coil element arrangement device 20 above the stator core conveying device 10, and arranges the coil element insertion device 30 at a central part of the coil element alignment device 20.

The base 100 has a plurality of columnar base leg sections 101, and a rectangular plate section 102 supported by these base leg sections 101. The plate section 102 is positioned at waist-height of the operator.

Next, each device will be explained.
<Configuration of Stator Core Conveying Device 10>

The stator core conveying device 10 conveys a jig 70 to which the stator core 60 is fixed until the coil element insertion device 30 provided at the center of the stator manufacturing device 1.

The stator core conveying device 10 has a horizontal-direction conveying mechanism 110 and a lift mechanism 120.

The horizontal-direction conveying mechanism 110 is provided to extend in a range from a front-left side end of the stator manufacturing device 10 until the center at which the coil element insertion device 30 is positioned, above the plate section 102 of the base 100.

The horizontal-direction conveying mechanism 110 has a slide rail 111 laying from the front-left side end of the stator manufacturing device 1 until the center at which the coil element insertion device 30 is positioned above the plate section 102 of the base 100; a conveying stand 112 that has a rectangular hole at the center and places the jig 70 to which the stator core 60 is fixed and moves by engaging with the slide rail 111; a ball-screw mechanism 113 that causes the conveying stand 112 to move in the horizontal direction by engaging with the slide rail 111; and a servo-motor 114 that is arranged more to the front-right side of the stator manufacturing device 1 than the slide rail 111 and causes the ball-screw mechanism 113 to rotate.

After the operator places the jig 70 to which the stator core 60 is fixed onto the conveying stand 112 at the front-left side end of the stator manufacturing device 1, the horizontal-direction conveying mechanism 110 causes the conveying stand 112 driven by the servo-motor 114 to engage with the slide rail 111 and conveys until the center of the stator manufacturing device 1. In addition, the horizontal-direction conveying mechanism 110 conveys the conveying stand 112 on which the jig 70 is placed from the center of the stator manufacturing device 1 to the front-left side end, after a plurality of the coil elements 40 is inserted in the stator core 60 while being fixed to the jig 70.

Herein, the jig 70 fixing the stator core 60 retains the stator core 60 in a state lifting up at a support wall 71 having vertical holes. The stator core 60 fixed to the jig 70 can thereby be maintained in a state suspending leg parts into the vertical holes without allowing the leading ends of the leg parts 41 interfering with the jig 70, when the leg parts 41 of the respective coil elements 40 of the assembly 50 are inserted into the respective slots 61.

The lift mechanism 120 is provided to extend in the vertical direction of the plate section 102 of the base at the center of the stator manufacturing device 1.

The lift mechanism 120 has four rods 121 inserted at four corners in holes formed in the conveying stand 112 and that push the jig 70 to which the stator core 60 is fixed from the conveying stand 112 of the horizontal-direction conveying mechanism 110 upwards; a fixing plate 122 that fixes a lower end of the four rods 121 below the plate section 102 of the base 100; a ball-screw mechanism 123 that causes the fixing plate 122 to move in the vertical direction; and the servo-motor 124 that causes the ball-screw mechanism 123 to rotate.

The lift mechanism 120 lifts up the jig 70 to which the stator core 60 above the conveying stand 112 conveyed to the center of the stator manufacturing device 1 by the horizontal-direction conveying mechanism 110, until the coil element insertion device 30 provided at the center of the stator manufacturing device 1, by the four rods 121 according to the movement of the ball-screw mechanism 123 driven by the servo-motor 124. In addition, by lowering the four rods 121, the lift mechanism 120 places the jig 70 to which the stator core 60 into which the plurality of coil elements 40 is inserted is fixed on the conveying stand 112.

<Configuration of Coil Element Alignment Device 20>

The coil element alignment device 20 arranges the plurality of coil elements 40 in an annular shape relative to the central axis C1 by lining up in the circumferential direction, and subsequently, assembles by moving the plurality of coil elements 40 in a direction reducing the diameter of the annular shape to form the assembly 50.

The coil element alignment device 20 includes two robot arms 210a, 210b; a rotating table 220; a plurality of gripping devices 230; and two switch devices 240. Furthermore, the coil element alignment device 20 includes four drive mechanisms 250; and a table drive device 260.

As shown in FIGS. 2 and 3, the two robot arms 210a, 210b are articulated arms arranged at a rear side of the stator manufacturing device 1, and have hands 211 at the leading end that grip the coil element 40.

The two robot arms 210a, 210b each grip the coil element 40.

Herein, the coil element 40 is a substantially U-shaped coil element molded in a chevron shape providing an S-shaped part to a turn section 42 that is a substantially apex portion and in which the linear leg part 41 is provided to both ends of the turn section 42, by bending while twisting the substantially central part of the S-shaped part formed from four linear rectangular wires for coils. The coil elements 40 are respectively molded by two coil molding devices 270a, 270b installed at the back of the stator manufacturing device 1.

The two robot arms 210a, 210b grip each of the coil elements 40 from the two coil molding devices 270a, 270b, and supply and arrange to each of two predetermined arrangement points P1, P2 on the rotating table 220.

The rotating table 220 makes the plurality of gripping devices 230 annularly arranged to integrally rotate.

The rotating table 220 is disk shape having a circular hole 221 at the center.

The circular hole 221 at the center of the rotating table 220 is established in a diameter corresponding to the diameter of the stator core 60, e.g., somewhat larger than the diameter of the stator core 60. Along with the stator core 60 being installed below the circular hole 221, the coil element insertion device 30 for inserting the leg part 41 of each of the coil elements 40 of the assembly 50 made by assembling the plurality of coil elements 40 aligned by the coil element alignment device 20 into the respective slots 61 of the stator core 60. The leg part 41 of each of the coil elements 40 of the assembly 50 aligned in an annular shape by the coil element alignment device 20 is thereby inserted into the respective slots 61 of the stator core 60 by the coil element insertion device 30.

Figure 4:
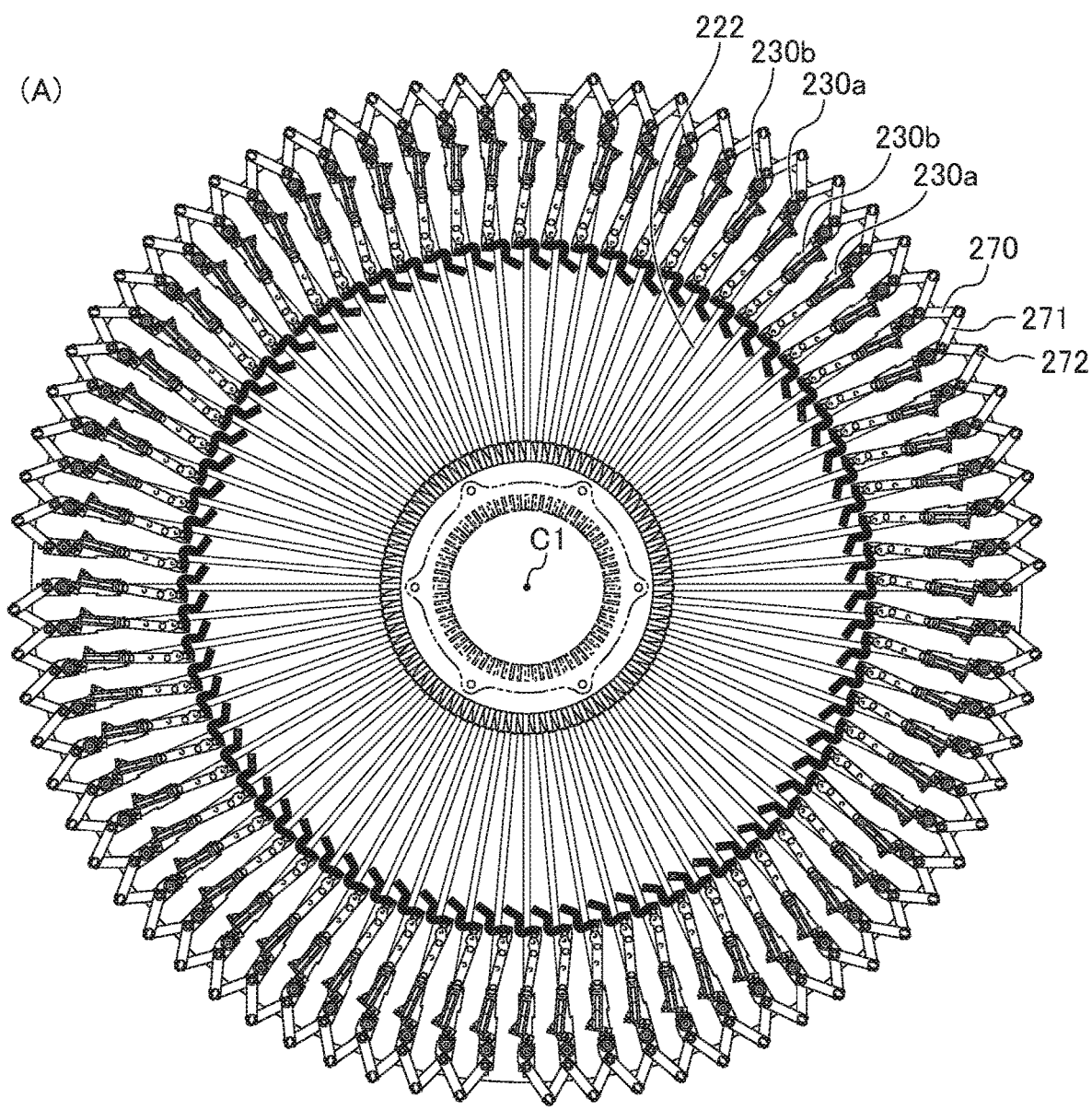
FIG. 4 is a view showing a plurality of gripping devices according to the above-mentioned embodiment.
Figure 4:
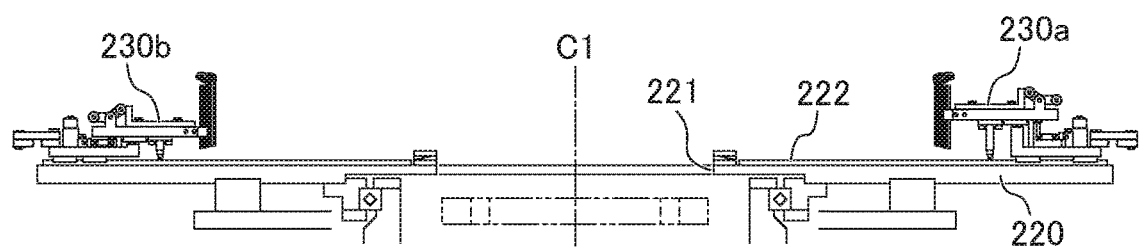

FIG. 4 is a view showing a plurality of the gripping devices 230 according to the present embodiment.

The plurality of gripping devices 230 retain a lower part of one leg part 41 of each of the coil elements 40 arranged by the two robot arms 210a, 210b. As shown in FIG. 4(A), the plurality of gripping devices 230 is arranged annularly on the rotating table 220. In more detail, the plurality of gripping devices 230 is respectively engaged with the slide rails 222 provided to extend radially on the rotating table 220, and are movable in the radial direction by way of the driving force of the four drive mechanisms 250 (refer to FIG. 3).

As shown in FIG. 4(B), the plurality of gripping devices 230 is arranged by the heights of adjacent gripping devices 230 being alternately shifted in the axis-line direction (height direction) of the central axis C1 of the ring. In more detail, when the plurality of gripping devices 230 gathers by advancing in the radially inward direction by way of the slide rails 222, they are arranged to alternately be shifted in the axis-line direction of the central axis C1, so that gripping devices 230 do not interfere with each other. In FIG. 4(B), the first gripping device 230a is shown on the right side of the drawing, and the second gripping device 230b is shown on the left side of the drawing.

The plurality of gripping devices 230 is configured from the two types of the first gripping device 230a and the second gripping device 230b receiving drive power from the drive mechanism 250 and having different heights in the axis-line direction of the central axis C1.

The height of the first gripping device 230a is high, and the height of the second gripping device 230b is lower than the first gripping device 230a, and this first gripping device 230a and second gripping device 230b are alternately arranged side-by-side in the circumferential direction.

As shown in FIG. 3, the first gripping device 230a receives the coil element 40 from the first robot arm 210a at the arrangement point P1 on the front-right side of the stator manufacturing device 1. The second gripping device 230b receives the coil element 40 from the second robot arm 210b at the arrangement point P2 on the front-left side of the stator manufacturing device 1.

As shown in FIG. 4(A), among the plurality of gripping devices 230, adjacent gripping devices 230 are joined by a link mechanism 270. According to this link mechanism 270, the second gripping device 230b adjacent to the first gripping device 230a is joined to the first gripping device 230a, and the second gripping device 230b joined to this first gripping device 230a is joined to an adjacent first gripping device 230a. By the plurality of gripping devices 230 adjacent in this way being joined in sequence, they follow the driving of the drive mechanisms 250.

Figure 5:
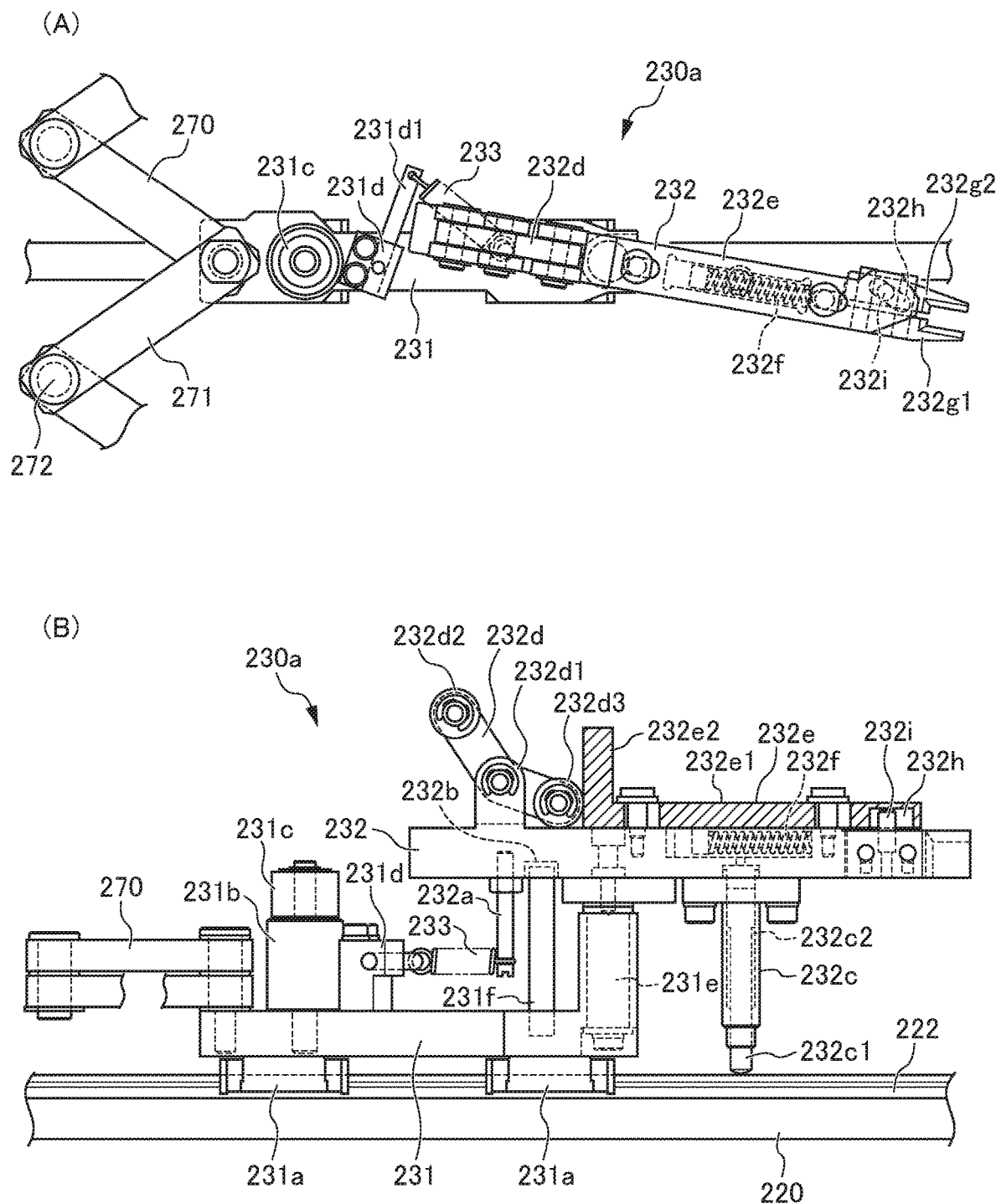
FIG. 5 is a view showing a first gripping device according to the above-mentioned embodiment, with FIG. 5(A) being a partially transparent top view, and FIG. 5(B) being a partially transparent side view.
Figure 6:
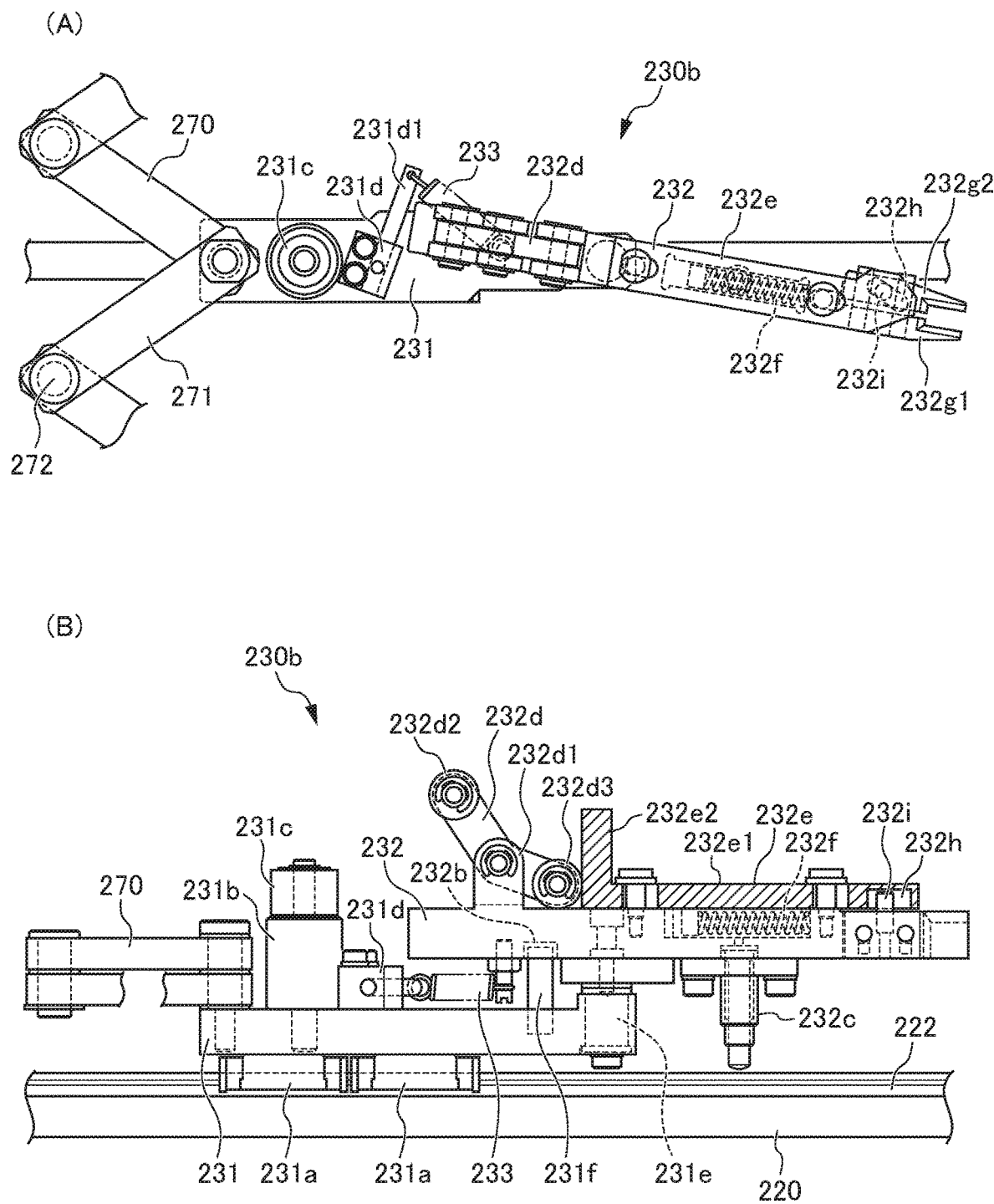
FIG. 6 is a view showing a second gripping device according to the above-mentioned embodiment, with FIG. 6(A) being a partially transparent top view, and FIG. 6(B) being a partially transparent side view.

FIG. 5 is a view showing the first gripping device 230a according to the present embodiment, with FIG. 5(A) being a partial transparent top view, and FIG. 5(B) being a partial transparent side view. In addition, FIG. 6 is a view showing the second gripping device 230b according to the present embodiment, with FIG. 6(A) being a partial transparent top view, and FIG. 6(B) being a partial transparent side view.

Herein, the first gripping devices 230a and second gripping devices 230b constituting the plurality of gripping devices 230 are the same basic configurations, and only differ by the heights in the axis-line direction of the central axis C1 differing. For this reason, it will be explained by giving the first gripping device 230a as an example by referencing FIG. 5, with the same reference symbols being assigned for the second gripping device 230b shown in FIG. 5, and explanation thereof being omitted.

As shown in FIG. 5, the first gripping device 230a has a main body 231 attached to the link mechanism 270, and an upper branch 232 to which a pair of claws 232g1, 232g2 attached to the leading end side of the main body 231 are provided.

The main body 231 is a rod-shaped member with rectangular cross-section, and is provided with two slide guides 231a aligned in the radial direction in a convex shape engaging with the slide rail 222 at the bottom face; a weight part 231b that is provided to the top face on the base end side and adjusts the weight balance of the gripping device 230a; a roller 231c provided on a top end of the weight part 231b; a spring post 231d more adjacent to the leading end side than the weight part 231b; a rotation shaft 231e parallel to the central axis C1 of annular shape extending from the top face on the leading end side to upwards; and a bushing 231f that is arranged between the spring post 231d and the rotation shaft 231e and defines the movable range of the upper branch 232.

The spring post 231d has a fixed piece 231d1 extending to the left side towards the central axis C1 and in the leading end direction, and fixing a spring 233.

The upper branch 232 is attached to an upper end of the rotation shaft 231e, and extends to the leading end side. The upper branch 232 is provided with a spring post 232a arranged at a base end side; a hole 232b that is larger than the diameter of the bushing 231f into which the bushing 231a is freely fitted at the bottom face; the pin 232c is extended downwards to freely slide in the vertical direction at the leading end side lower face and positioned on a movement path of the gripping device 230a; a lever 232d folded at an obtuse angle retained to freely rotate at the top face on the base end side; an L-shaped member 232e retained to freely retract in the radial direction by the top face on the leading end side of the lever 232d; a spring 232f that biases the L-shaped member 232 to the base end side; and a pair of the claws 232g1, 232g2.

The spring 233 is installed between the main body 231 and the upper branch 232. By being retained between the spring post 232a of the upper branch 232 and the spring post 231d of the main body 231, the spring 233 biases the upper branch 232 to the right side towards the central axis C1, so as to bias the gripped coil element 40 in the opposite direction to the direction of rotating by a predetermined angle about the rotation shaft 231e that is parallel to the central axis C1 of annular shape. The upper branch 232 thereby slants 100 to the right towards the central axis C1 about the rotation shaft 231e parallel to the central axis C1 of annular shape (refer to FIG. 24).

The pin 232c is configured from a shaft 232c1 that freely slides in the vertical direction; a holder 232c2 that surrounds the outer circumference of the shaft 232c and to which an upper end is fixed to the upper branch 232; and a spring that is not illustrated, biasing the shaft 232c1 downwards.

The lever 232d is attached to the upper branch 232 via a shaft fixed to two projecting pieces provided to be separated in the circumferential direction of the upper branch 232 at a central part 232d1 bent back at an obtuse angle. The lever 232d has a rotatable roller at each of the base end 232d2 and leading end 232d3. The lever 232d has a leading end 232d3 that retracts to the base end side when raising the leading end 232d3 more than the central part 232d1, and the leading end 232d3 advances to the leading end side when lowering the leading end 232d3 more than the central part 232d1.

The L-shaped member 232e is configured from a main piece 232e1 that is arranged at the upper face of the upper branch 232 and moves in the radial direction along the upper branch 232; and a short piece 232e2 projecting upwards at the base end of the main piece 232e1 and that receives the action of the lever 232d transmitted from the switch device 240 to cause the main piece 232e1 to move. The main piece 232e1 has two holes into which bolts fixed to the upper branch 232 are inserted, and defining the moveable range in the radial direction of the main piece 232e1. A spring post projecting downwards and arranged in a convex part of the upper branch 232 is provided between the two holes of the main piece 232e1. A spring 232f thereby pulls the spring post to the base end side and the L-shaped member 232e is biased to the base end side. The lower face of a leading end of the main piece 232e1 has an elongated hole 232h sloped from the base end side towards the central axis C1 on the leading end side.

The pair of claws 232g1, 232g2 is configured from a fixed claw 232g1 integrated with the upper branch 232, and a mobile claw 232g2 separated from the upper branch 232. The mobile claw 232g2 is arranged inside a convex part notched in a shape slightly larger than the mobile claw 232g2 at the leading end of the upper branch 232. The fixed claw 232g1 and mobile claw 232g2 are coupled by arranging two shafts extending in the circumferential direction and horizontal direction into holes extending in the circumferential direction and horizontal direction of the fixed claw 232g1 and mobile claw 232g2. At the mobile claw 232g2, a protrusion 232i of rectangular cross-section that is arranged to be mobile in the elongated hole 232h of the L-shaped member 232e is provided.

With the mobile claw 232g2, when the leading end 232d3 of the lever 232d rises and the L-shaped member 232e is biased to the base end side by the spring 232f, the elongated hole 232h in the L-shaped member 232 moves to the base end side, and the protrusion 232i of the mobile claw 232g2 is arranged at the leading end side close to the right towards the central axis C1 of the elongated hole 232h. The mobile claw 232g2 is pressed to the left wall face of the elongated hole 232h and a chuck mechanism of the pair of claws 232g1, 232g2 enters a clamping state, whereby one leg part 41 of the coil element 40 can be clamped. At this time, the gripping device 230 can maintain the clamping state of the chuck mechanism, since the lever 232d is fixed to the short piece 232e2 of the L-shaped member 232e in a state raising the leading end 232d3 higher than the central part 232d1.

On the other hand, with the mobile claw 232g2, when the leading end 232d3 of the lever 232d lowers and the L-shaped member 232e moves to the leading end side against the spring 232f, the protrusion 232i of the mobile claw 232g2 is arranged at the base end side closer to the left towards the central axis C1 of the elongated hole 232h by the elongated hole 232h of the L-shaped member 232e moving to the leading end side. The mobile claw 232g2 is thereby pushed to the right wall face of the elongated hole 232h and the chuck mechanism of the pair of claws 232g1, 232g2 enters an open state, whereby one leg part 41 of the coil element 40 can be released. At this time, the gripping device 230a can maintain the open state of the chuck mechanism, since the lever 232*d* is fixed to the short piece 232*e*2 of the L-shaped member 232*e* in a state lowering the leading end 232*d*3 lower than the central part 232*d*1.

As shown in FIG. 4(A), the link mechanism 270 is configured by a rod-shaped plate member 271 and a bolt 272. With the link mechanism 270, the ends of two plate members 271 are connected to be rotatable at a tail end of the gripping device 230. In addition, the other end of the plate member 271 has a hole that is slightly larger than the bolt 272. In a state in which a shaft part of the bolt 272 is inserted into this hole, and a gap is secured between the hole of the plate member 271 and the head of the bolt 272, the bolt 272 is also inserted into a hole of the plate member 271 connected to an adjacent gripping device 230. The link mechanism 270 made by the plurality of plate members 271 being coupled in a zig-zag shape to go around in an annular shape is thereby configured.

For this reason, the plurality of gripping devices 230 follow the movement in the radial direction of the four gripping devices 230 receiving the drive force of the four drive mechanisms 250, respectively, and are movable in the radial direction via the link mechanism 270. In more detail, in the case of the four drive mechanisms 250 causing the gripping device 230 receiving drive force in the radially outward direction to move, the plate members 271 of the link mechanism 270 slant in the circumferential direction, and the plurality of gripping devices 230 move in the radially outward direction. In addition, in the case of the four drive mechanisms 240 causing the gripping device 230 receiving drive force in the radially inward direction to move, the plate members 271 slant in the radial direction, and the plurality of gripping devices 230 move in the radially inward direction. The link mechanism 270 thereby transmits the drive power of the four drive mechanisms 250 to the plurality of gripping devices 230, while maintaining a coupled state.

Figure 7:
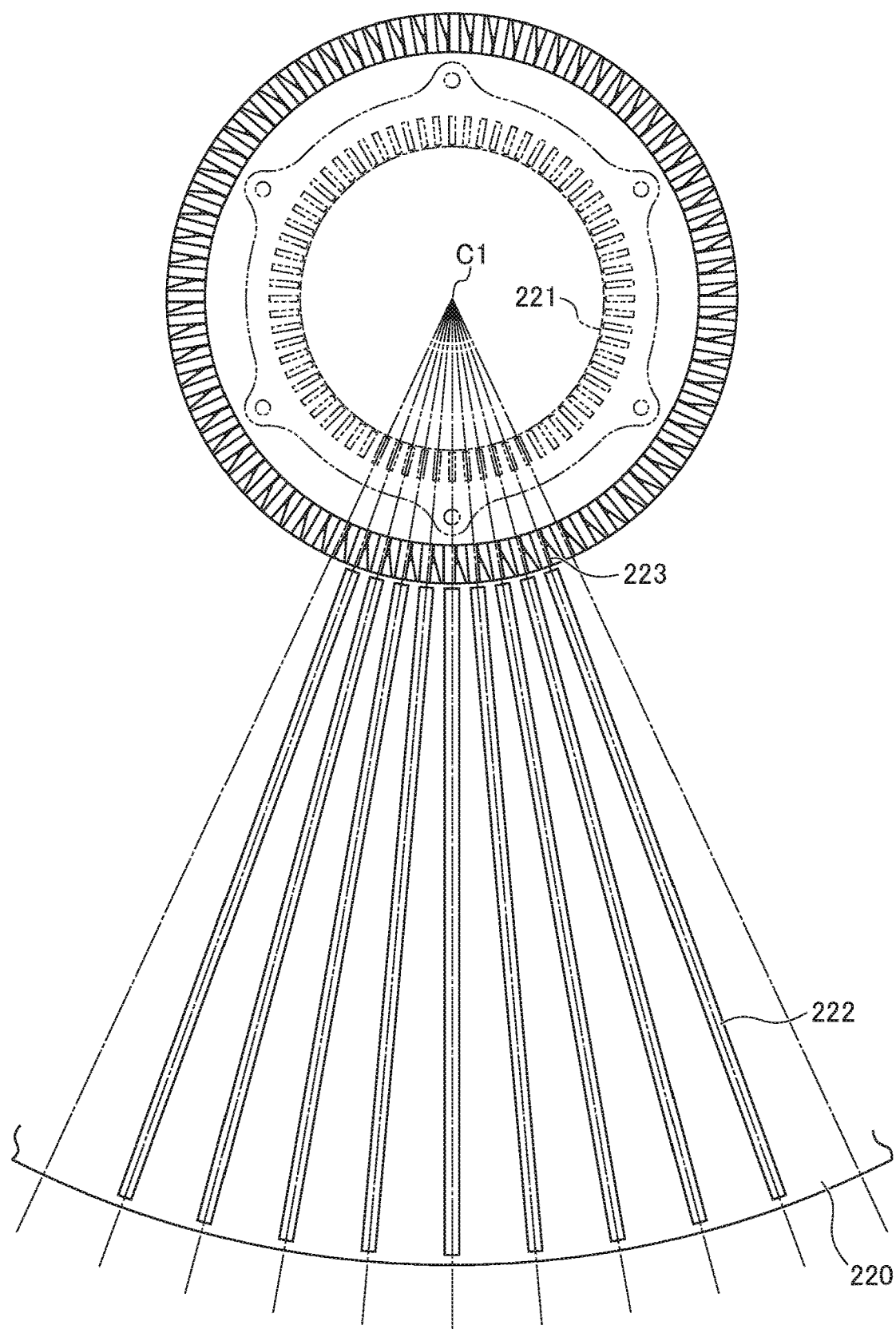
FIG. 7 is a view showing the state of an upper face of a rotating table according to the above-mentioned embodiment.

FIG. 7 is a view showing a state of a top face of the rotating table 220 according to the present embodiment.

A plurality of slide rails 222 and a plurality of correction grooves 223 are formed in the top face of the rotating table 220.

The plurality of slide rails 222 are laid in the same number as the number of the plurality of gripping devices 230 on the top face of the rotating table 220, and extend radially in the radial direction. Herein, as shown in FIG. 5(B), the two slide guides 231*a* engaging with the slide rails 222 of the first gripping device 230*a* are separated from each other. On the other hand, as shown in FIG. 6(B), the two slide guides 231*a* engaging with the slide rails 222 of the second gripping device 230*b* are adjacent to each other. In the case of moving the plurality of gripping devices 230 in the radially inward direction, it is thereby possible to cause the plurality of gripping devices 230 to densely gather without the slide guides 231*a* of the adjacent gripping devices 230 interfering.

The plurality of correction grooves 223 is formed at the inside diameter side of the plurality of slide rails on the top face of the rotating table 220, respectively, and the pin 232*c* of the upper branch 232 of the gripping device 232 is guided at the near side at which the plurality of gripping devices 230 gather in the radially inward direction. In other words, the plurality of correction grooves 223 correct the upper branch 232 by 10° to the left towards to the central axis C1 at a position at which interference does not occur between adjacent gripping devices 230 in the case of the plurality of gripping devices 230 gathering in the radially inward direction. The plurality of correction grooves 223 are arranged in the circumferential direction in the same number as the plurality of slide rails 222, and are formed in an annular shape.

Figure 8:
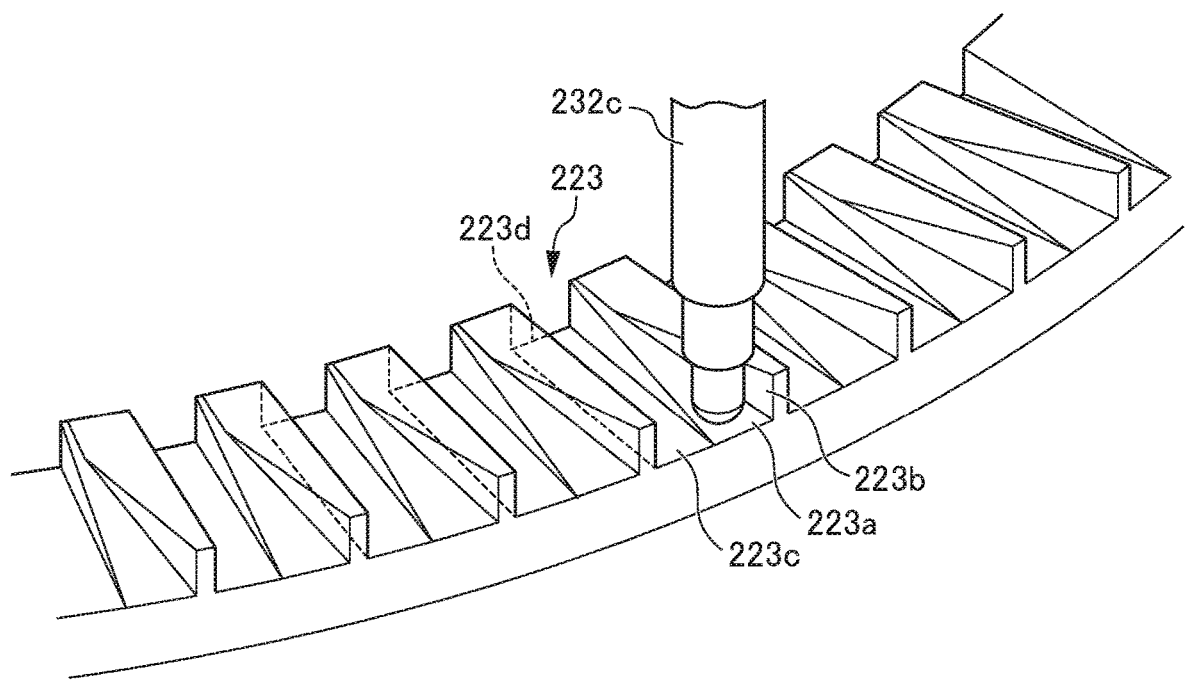
FIG. 8 is a perspective view viewing correction grooves according to the above-mentioned embodiment from outside diameter side.

FIG. 8 is a perspective view looking at the correction grooves 223 according to the present embodiment from an outside diameter side.

The correction groove 223 is configured from a sloped face 223*a* that is formed on the extension of a line towards the central axis C1 of the slide rail 222, rising towards the central axis C1, and having a width that narrows towards the central axis C1 side; a regulating wall face 223*b* that is a side wall on the right side relative to the sloped face 223*a* towards the central axis C1 and that corrects the upper branch 232 of the gripping device 230 by 10° to the left side towards the central axis C1, due to narrowing the width of the sloped face 223*a* towards the central axis C1 by sloping relative to the radial direction while approaching the central axis C1; and a bottom face 232*c* of equal width that is formed on the left side towards the central axis C1 relative to the sloped face 223*a*, and formed at a height equal to the lowest position of the sloped face 223*a* until the central axis C1 side more than the regulating wall face 223*b*.

Herein, a swelled part 223*d* that swells to constitute the regulating wall face 223*b* of another correction groove 223 positioned to the left side towards the central axis C1 is provided at the left side towards the central axis C1 relative to the bottom face 223*c*.

The bottom face 223*c* has a length in the radial direction so that interference between adjacent gripping devices 230 does not occur, when the upper branch 232 is biased 10° to the right towards the central axis C1 by causing the gathered plurality of gripping devices 230 to retract to the radially outward direction, the bias of the spring 233 rising, and releasing from the restriction of the sloped face 223*a* that slopes.

By providing such a plurality of correction grooves 223, the plurality of gripping devices 230 tend to gather more in the radially inward direction, whereby a size reduction of the coil element alignment device 20 is achieved.

As shown in FIG. 2, the two switch devices 240 depress the base ends 232*d*2 of the lever 232*d* of the gripping device 230.

The switch device 240 is a separate body from the gripping device 230, and has a depressing member 241, drive part 242 and support frame 243. The depressing member 241 separates upwards from the rotating table 220 and are in the vicinity of the two arrangement points P1, P2 at which the two robot arms 210*a*, 201*b* arrange the coil elements 40, and are arranged directly above the base end 232*d*2 of the lever 232*d* of the first gripping device 230*a* and the second gripping device 230*b* that grip this coil element 40. The drive part 242 causes the depressing member 241 to lower using a piston that is not illustrated. The support frame 243 has a spring that supports the depressing member 241 to be slidable in the vertical direction, as well as biasing upwards so as to retain the depressing member 241 at an upper position.

The two switch devices 240, when the two robot arms 210*a*, 210*b* grip the coil element 40 from the two coil molding devices 270*a*, 270*b*, respectively, and arrange at the two arrangement points P1, P2 on the rotating table 220, depress the base ends 232*d*2 of the lever 232*d* of the first gripping device 230*a* and second gripping device 230*b* so as that each of the first gripping device 230*a* and second gripping device 230*b* grip the coil element 40. The two switch devices 240 thereby follow the lever 232*d* and lever 232*d* to operate the L-shaped member 232*e*, and the first gripping device 230a and second gripping device 230b positioned at the arrangement points P1, P2 grip the coil elements 40.

Since the switch device 240 is a separate body from the gripping device 230, and operates the L-shaped member 232e, it is possible to grip the coil element 40 without the gripping device 230 having a separate drive source. For this reason, the gripping devices 230 become low-cost, simple, small-scale configurations.

The four drive mechanisms 250 impart the drive force on the plurality of gripping devices 230.

As shown in FIG. 3, the four drive mechanisms 250 are arranged at the four corners of a support table 103 provided on the plate part 102 of the base 100 to be at an outer side of the rotating table 220.

Figure 9:
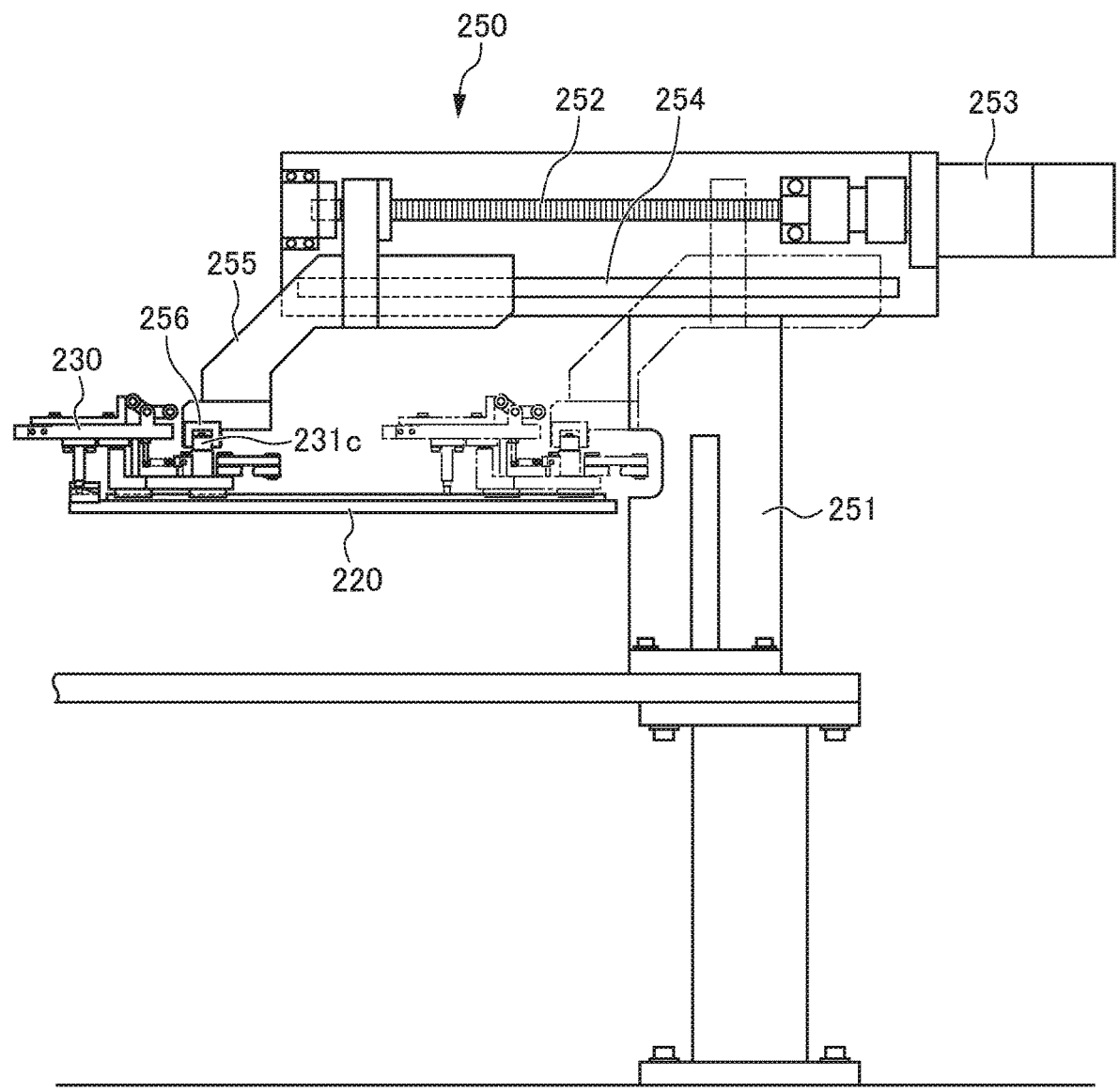
FIG. 9 is a side view showing a drive mechanism according to the above-mentioned embodiment.

FIG. 9 is a side view showing the drive mechanism 250 according to the present embodiment.

As shown in FIG. 9, the drive mechanism 250 has a support stand 251, a ball-screw mechanism 252 supported by the support stand 251, a servo-motor 253 that drives the ball-screw mechanism 252, a slide rail 254 arranged in line with the ball-screw mechanism 252, and a plate 255 attached to the ball-screw mechanism 252 and slide rail 254.

The plate 255 has a convex part 256 that recesses downwards. The convex part 256 continues the recess in the circumferential direction to be open at both ends. The convex part 256 fits with the roller 231c provided at the upper end of the weight part 231b of the retracted gripping device 230, whereby the gripping device 230 and drive mechanism 250 are connected. The drive power of the drive mechanism 250 is thereby transmitted to the plurality of gripping devices 230. The drive mechanism 250 conducts only linear motion in the radial direction in this way.

Figure 10:
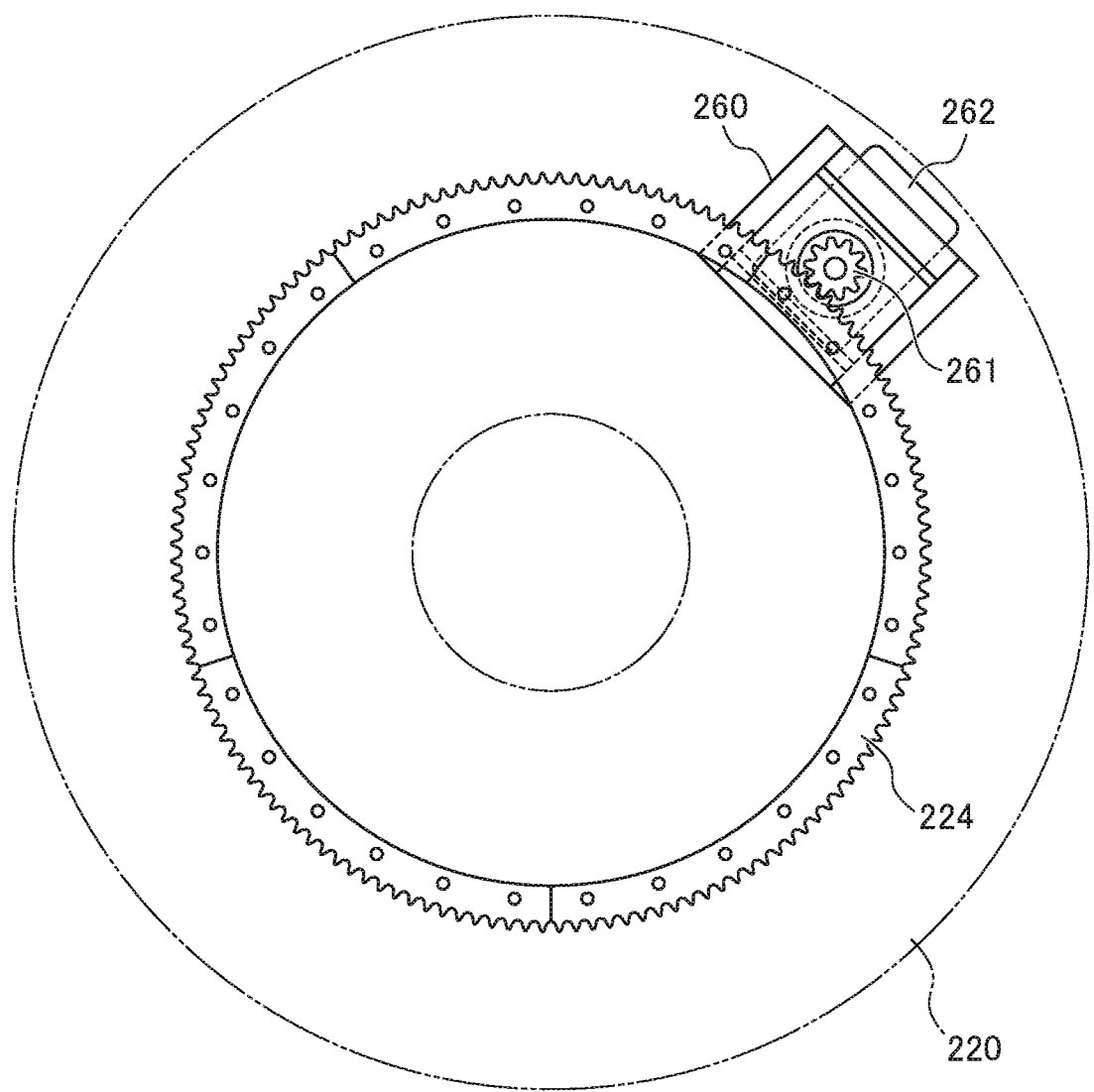
FIG. 10 is view showing a table drive device according to the above-mentioned embodiment.

FIG. 10 is a view showing a table drive device 260 according to the present embodiment.

As shown in FIG. 10, the table drive device 260 is installed to the lower face of the rotating table 220. The rotating table 220 has teeth 224 cut in the lower face in the circumferential direction according to the number of plurality of gripping devices 230. The table drive device 260 has a gear mechanism 261 having teeth that mesh with the plurality of teeth 224 in the lower face of the rotating table 220, and a servo-motor 262 that drives this gear mechanism 261.

The table drive device 260 shifts by only two of the teeth 224 in the lower face of the rotating table 220 by driving the servo-motor 262, when delivery of the coil elements 40 to the first gripping device 230a and second gripping device 230b from the two robot arms 210a, 210b completes. From each of the first gripping device 230a and second gripping device 230b for which gripping of the coil element 40 has thereby completed, one of the empty gripping devices 230a, 230b of the same type that has not yet gripped the coil element 40 is arranged at the two arrangement points P1, P2 on the rotating table 220, respectively.

In this way, among the two arrangement points P1, P2, one causes the coil element 40 to be gripped by the first gripping device 230a, and the other one causes the coil element 40 to be gripped by the second gripping device 230b.

Herein, every time shifting one tooth 224 in the lower face of the rotating table 220 by driving the servo-motor 262, the roller 231c fitting with the convex part 256 in the plate 255 of the four drive mechanisms 250 moves in the circumferential direction from the convex part 256 according to the movement in the circumferential direction of the gripping device 230 accompanying the rotation of the rotating table 220, whereby the fitting between the roller 231c and the convex part 256 is released. Then, the gripping device 230 having this roller 231c moves from the four drive mechanisms 250.

Furthermore, the gripping device 230 adjacent to the gripping drive 230 moving from these four drive mechanisms 250 moves to the four drive mechanisms 250. Then, the roller 231c of the gripping device 230 moving to the four drive mechanisms 250 comes together from the circumferential direction with the convex part 256 according to the movement in the circumferential direction of the gripping device 230 accompanying the rotation of the rotating table 220, and the roller 231c and the convex part 256 fit together.

<Configuration of Coil Element Insertion Device>

The coil element insertion device 30 inserts the leg part 41 of each of the coil elements 40 of the assembly 50 into the respective slots 61 of the stator core 60.

Figure 11:
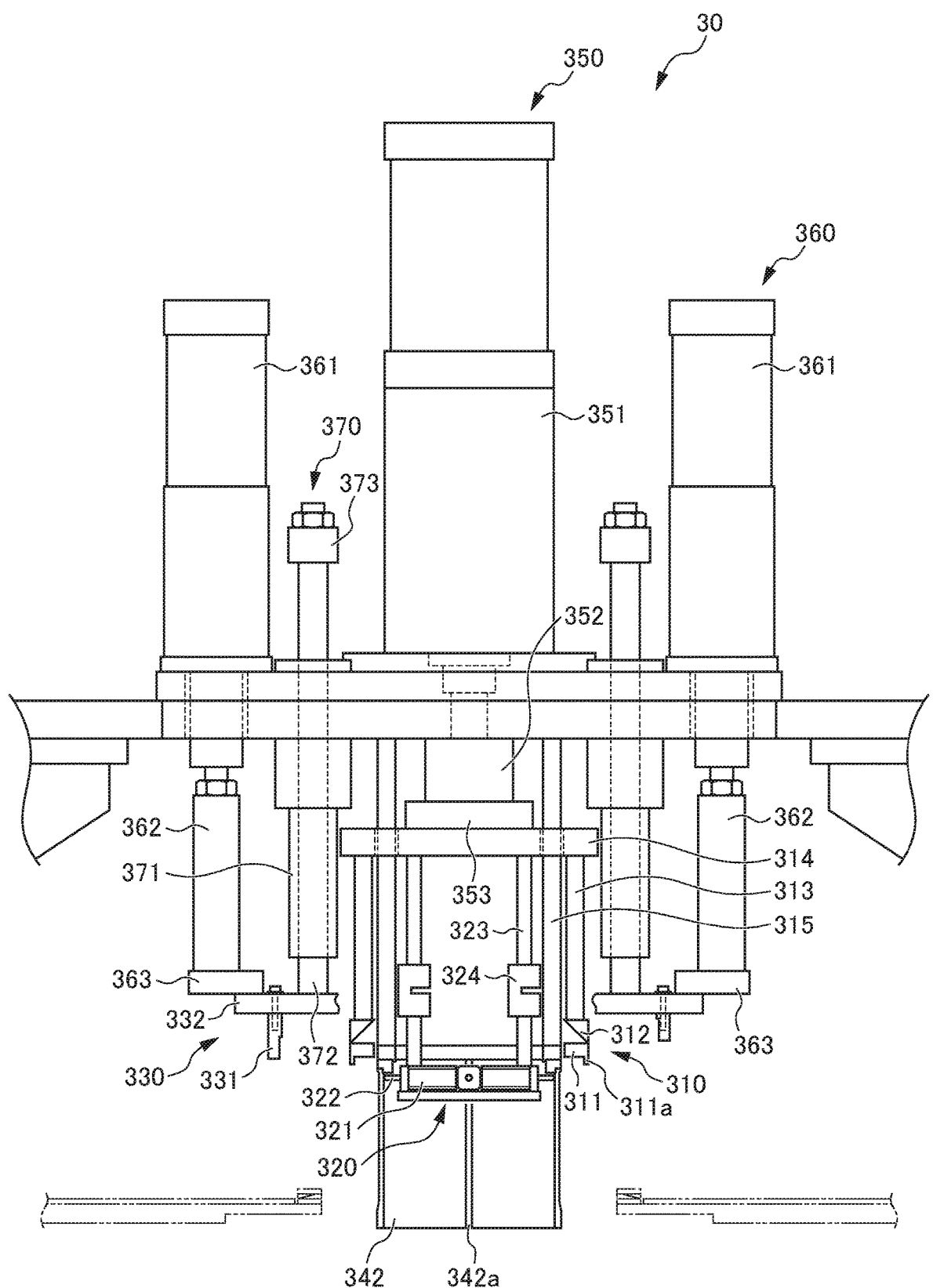
FIG. 11 is a front view showing a coil element insertion device according to the above-mentioned embodiment.

FIG. 11 is a front view showing the coil element insertion device 30 according to the present embodiment.

The coil element insertion device 30 has a coil element depressing mechanism 310, pin projecting mechanism 320, lever depressing mechanism 330, and guidance device 340. Furthermore, the coil element insertion device 30 has a coil element depressing mechanism-cylinder mechanism 350, two lever depressing mechanism-cylinder mechanisms 360, and four lever depressing mechanism-guide mechanisms 370.

The coil element depressing mechanism 310 depresses the assembly 50 made by assembling the plurality of coil elements 40 by the coil element alignment device 20, downwards of where the stator core 60 is positioned.

The coil element depressing mechanism 310 has a depressing member 311, a lower ring part 312 fixed to an upper face of the depressing member 311, a plurality of support posts 313 provided to extend upwards at the upper face of the lower ring part 312, an upper disk part 314 connected to an upper end of the plurality of support posts 313, and a guide rod 315 that is inserted in the upper disk part 314 and guides the depressing member from the inner circumferential side.

The depressing member 311 is an annular shape having the same diameter as the diameter of the assembly 50, and has an annular protrusion 311a that projects downwards at the outer circumferential side of the lower face, and supports the outer circumferential side of the turn part 42 of the respective coil elements 40 in the assembly 50 from the outside diameter side.

The coil element depressing mechanism 310 is connected to the coil element depressing mechanism-cylinder mechanism 350.

The coil element depressing mechanism-cylinder mechanism 350 has a cylindrical cylinder 351 arranged at the center of the stator manufacturing device 1, a piston (not illustrated) provided to be reciprocally movable inside the cylinder 351, a rod 352 connected to the piston, and a disk part 353 provided at the leading end of the rod 352.

The disk part 353 is connected to an upper face of the upper disk part 314 of the coil element depressing mechanism 310 at the lower face.

The coil element depressing mechanism 310 causes the rod 352 to move downwards by driving the piston of the coil element depressing mechanism-cylinder mechanism 350, thereby lowering the depressing member 311, after forming the assembly 50 by assembling the plurality of coil elements 40 by way of the coil element alignment device 20. The lower face of the lowered depressing member 311 thereby depresses the assembly 50 by contacting the turn section 42 of each of the coil elements 40 in the assembly 50.

Figure 12:
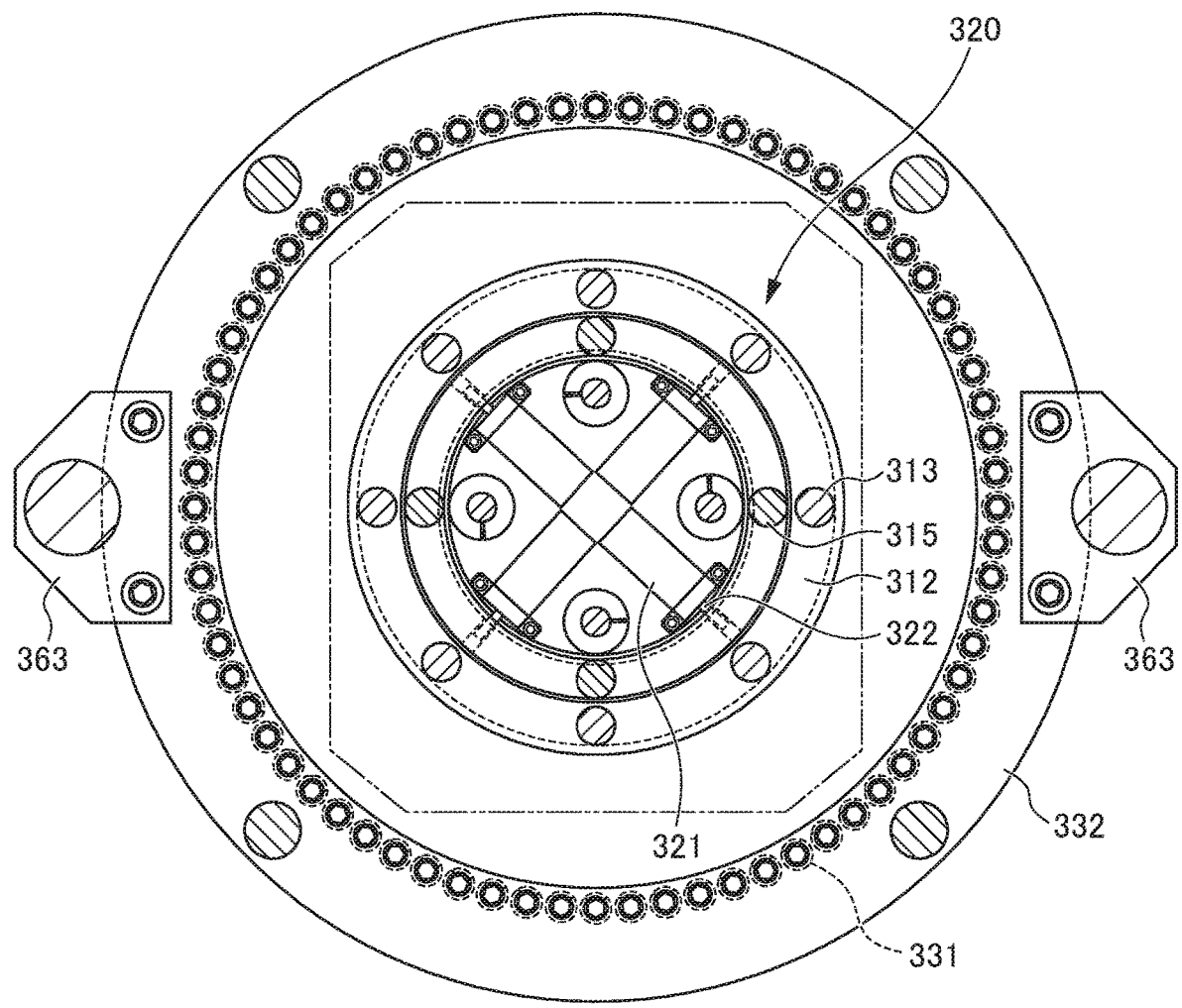
FIG. 12 is a top view showing a pin projecting mechanism according to the above-mentioned embodiment.

FIG. 12 is a top view showing the pin projecting mechanism 320 according to the present embodiment.

The pin projecting mechanism 320 prevents the assembling 50 depressed by the coil element depressing mechanism 310 from falling down after the plurality of gripping devices 230 release grip.

The pin projecting mechanism 320 has a disk-shaped pin projecting part 321 that is a smaller diameter than the diameter of the assembly 50, four pins 322 that can set projection to separate from the pin projecting part 321 every 90° relative to the center, a plurality of support posts 323 provided to extend from the upper face of the pin projecting part 321 upwards until the upper disk part 314 of the coil element depressing mechanism 310, and a guide member 324 provided in the middle of the plurality of support posts 323 and causing the outer circumference to be guided to the guide rod 315 of the coil element depressing mechanism 310.

The four pins 322 abut the lower side of the turn section 42 of a predetermined coil element 40 in the assembly 50 when projecting in the radially outward direction, sandwich the turn section 42 with the depressing member 311, and can support the assembly 50 by supporting from the lower side using the shape of the turn part 42.

The pin projecting part 321 is adjusted in relative distance from the depressing member 311 of the coil element depressing mechanism 310 so as to project at a predetermined timing at which the pin 322 abuts the lower side of the turn section 42 of a predetermined coil element 40 in the assembly 50, and is arranged to be low according to the height and width of the turn part 42 of the coil element 40 in the assembly 50 relative to the lower face of the depressing member 311.

The pin projecting mechanism 320, in the case of depressing the assembly 50 by way of the coil element depressing mechanism 310, projects at the same time in the radially outward direction the four pins 322 at the predetermined timing from the pin projecting part 321 lowered.

The four pins 322 thereby come between the leg parts 41 of the plurality of coil elements 40 in the assembly 50, abut the lower side of the turn part 42 of a predetermined coil element 40, and support the assembly 50 from below.

The lever depressing mechanism 330 simultaneously depresses the leading ends 232d3 of the levers 232d of the plurality of gripping devices 230, and simultaneously releases the gripping of the coil elements 40 by the plurality of gripping devices 230.

The lever depressing mechanism 330 has a plurality of depressing pins 331, and an annular part 332 that supports the plurality of depressing pins 331 at a lower face in a state facing downwards.

The plurality of depressing pins 331 are provided in the same number as the number of the plurality of gripping devices 230 at the lower face of the annular part 332, and is arranged side-by-side in the circumferential direction directly above the leading ends 232d3 of the levers 232d of the plurality of gripping devices 230 positioned to gather at the inner circumferential side on the rotating table 220.

Among the plurality of depressing pins 331, a depressing pin depressing the leading end 232d3 of the lever 232d of the first gripping device 230a is short from the annular part 232, and the depressing pin 331 depressing the leading end 232d3 of the lever 232d of the second gripping device 230b is long from the annular part 332, and the plurality of these depressing pins 331 is lined up alternately in the circumferential direction. The depressing pin 331 is configured to be flat matching the inside-diameter side wall with the plane of the short piece 232e2 so as not to collide against the short piece 232e2 of the L-shaped member 232e of each of the gripping devices 230 when depressing the leading end 232d3 of the lever 232d.

The lever depressing mechanism 330 is connected to the two lever depressing mechanism-cylinder mechanisms 360 and the four lever depressing mechanism-guide mechanisms 370.

The two lever depressing mechanism-cylinder mechanisms 360 are arranged one on the left and right relative to the front of the stator manufacturing device 1.

The lever depressing mechanism-cylinder mechanism 360 has a cylindrical cylinder 361, a piston (not illustrated) provided to be reciprocally movable inside the cylinder 361, a rod 362 connected to the piston, and a pressurizing part 363 provided at the leading end of the rod 362.

The four lever depressing mechanism-guide mechanisms 370 are arranged more to a central side than the two lever depressing mechanism-cylinder mechanisms 360 so as to sandwich the lever depressing mechanism-cylinder mechanism 360 on both lateral faces of the stator manufacturing device 1. By arranging the four lever depressing mechanism-guide mechanisms 370 in this way, the plurality of depressing pins 331 are set so as to simultaneously depress the leading ends 232d3 of the levers 232d of the plurality of gripping devices 230, without the annular part 332 jolting by the drive power from the two lever depressing mechanism-cylinder mechanisms 360.

The lever depressing mechanism-guide mechanism 370 has a cylindrical holder 371, a rod 372 provided to be reciprocally movable inside the holder 371, and a cushion 373 provided at the upper end of the rod 372.

The pressurizing part 363 of the two lever depressing mechanism-cylinder mechanisms 360 and the rod 372 of the four lever depressing mechanism-guide mechanisms 370 are connected at the upper face of the annular part 332 of the lever depressing mechanism 330.

The lever depressing mechanism 330, after causing the pins 322 to project by the pin projecting mechanism 320 to support the assembly 50 by the pins 322, causes the rod 362 to move downwards by driving the piston of the lever depressing mechanism-cylinder mechanism 360 to simultaneously depress the leading ends 232d3 of the levers 232d of the plurality of gripping devices 230 by the plurality of depressing pins 331 lowering. The plurality of gripping devices 230 thereby simultaneously release the gripping of the coil elements 40.

Figure 13:
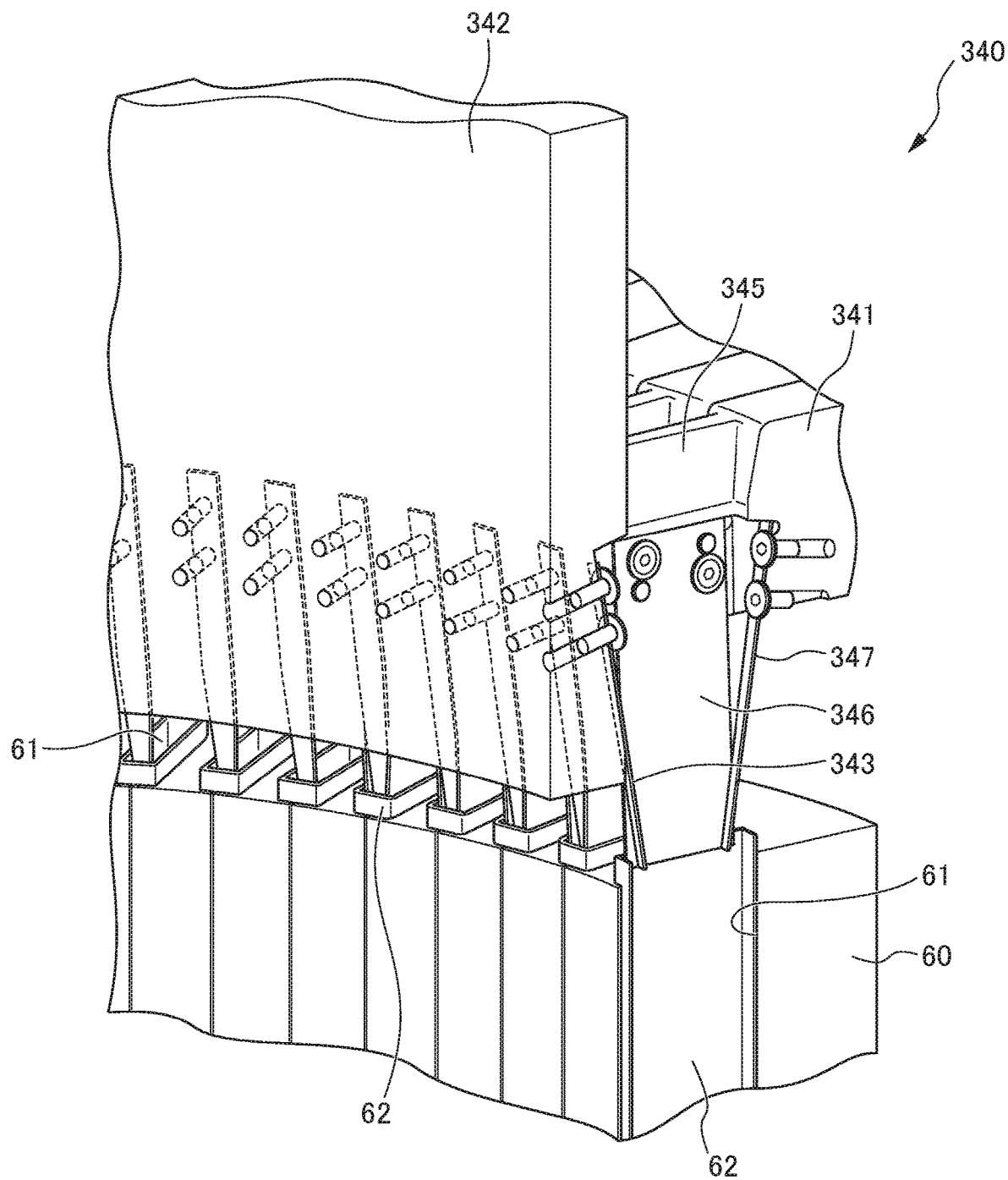
FIG. 13 is a perspective view showing a guidance device according to the above-mentioned embodiment.

FIG. 13 is a perspective view showing the guidance device 340 according to the present embodiment.

The guidance device 340 inserts the leg parts 41 of each of the coil elements 40 in the assembly 50 being depressed by the coil element depressing mechanism 310 into the respective slots 61 of the stator core 60. The guidance device 340 is continuously arranged on the inside-diameter side of the rotating table 220 and below the rotating table 220.

The guidance device 340 includes a support part 341, inner-circumferential guide 342, guide plate 343, slide mechanism 344, guiding part 345, pair of first expanded plates 346, second expanded plate 347, and arc-shaped guide 348.

The support part 341 consists of an annular frame, and supports the slide mechanism 344 supporting the guiding part 345.

As shown in FIG. 11, the inner-circumferential guide 342 is provided to extend from the guide rod 315 downwards, and is formed in a cylindrical shape at a central part of the support part to have a slit 342a making the pin 322 mobile while inserted in the vertical direction. The lower end of the inner-circumferential guide 342 also serves as a stopper fixing by abutting the stator core 60 raised by the lift mechanism 120 of the stator core conveying device 10. The assembly 50 made by assembling a plurality of the coil elements 40 aligned in an annular shape abuts the outer circumference of the inner-circumferential guide 342.

As shown in FIG. 13, the guide plate 343 is provided at the outer circumference of the inner-circumferential guide 342 and is plugged into the respective slots 61 of the stator core 60, which was raised by the lift mechanism 120 of the stator core conveying device 10, along with the pair of the expanded plate 346 and the second expanded plate 347.

The guide plate 343 is connected to the sloped face (face sloping in the radially outward direction to downwards) formed at a lower part of the inner-circumferential guide 342. The guide plate 343 is thereby extended to incline more downwards than the lower end of the inner-circumferential guide 342. The guide plate 343 is provided to correspond to the inside short side of the slot 61.

As shown in FIGS. 1 and 2, the slide mechanism 344 causes each of the partitioned guiding parts partitioned into a plurality in the circumferential direction constituting the guiding part 345 partitioned into 4 to move in the radial direction.

The slide mechanism 344 has four cylinder mechanisms, two slide pins provided to each plurality of partitioned guiding parts, a connection part connecting the base ends of these slide pins (outer end in radial direction), and link mechanism coupling adjacent connection parts that is provided to a lower face side of the connection part.

The four cylinder mechanisms are arranged at equal intervals in the circumferential direction.

The cylinder mechanism has a cylindrical cylinder that is supported by the support part, a piston provided to be reciprocally movable inside the cylinder, a rod connected to the piston, and a coupling part provided to the leading end of the rod that couples to the connection part. The drive power of the cylinder mechanism is transmitted to the two slide pins via the coupling part, connection part and link mechanism.

The two slide pins are provided to every plurality of partitioned guiding parts, and the leading end thereof is coupled to each partitioned guiding part. The slide pins are provided to be abreast above and below. These slide pins both have base ends (outside ends in radial direction) connected by the connection part. The two slide pins cause each partitioned guiding part to move in the radial direction by receiving the drive power of the cylinder mechanism and sliding in the radial direction.

In more detail, when receiving the drive power of the slide mechanism 344 towards the central axis C1, each slide pin slides in the radially inward direction. Each partitioned guiding part thereby advances to gather together in the radially inward direction.

In addition, when receiving the drive power of the slide mechanism 344 towards the radially outward direction, each slide pin slides in the radially outward direction against the biasing force of the spring. Each partitioned guiding part thereby retracts to scatter in the radially outward direction.

BY the guiding part 345 being freely sliding only in the radially inward/outward direction of the horizontal direction by way of the slide mechanism 344, the configuration of the guiding part 345 is simplified.

The guiding part 345 guides the leg part 41 of each of the coil elements 40 in the assembly 50 lowered by the coil element depressing mechanism 310 into the respective slots 61 of the stator core 60.

The guiding part 345 is provided in an annular shape, and is partitioned into four in the circumferential direction. A support part shifting the position of the partitioned guiding part upwards from the position of the slide mechanism 344 is provided to the guiding part 345.

Figure 14:
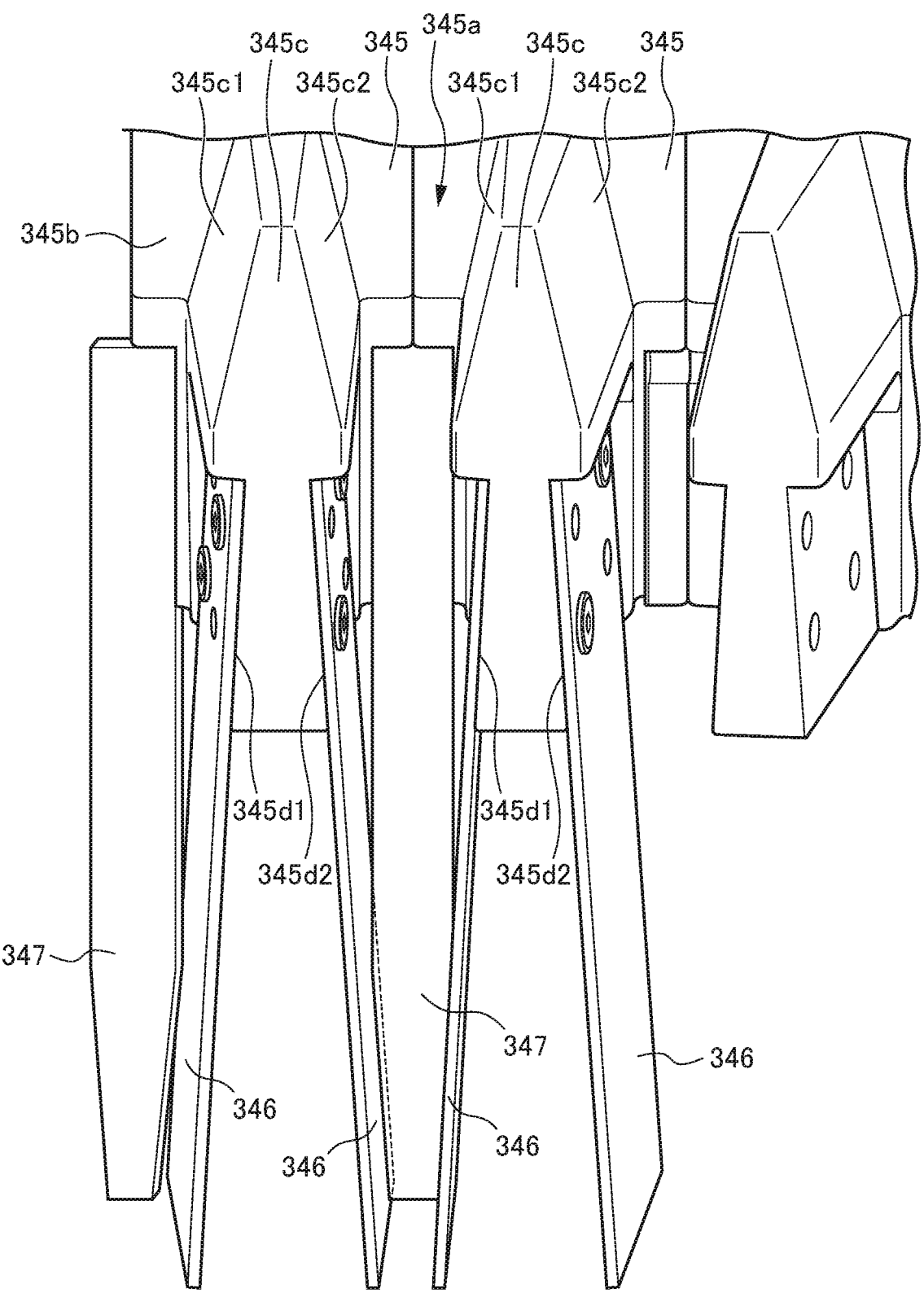
FIG. 14 is a perspective view showing a guiding part, and a pair of first expanded plates and a second expanded plate.

FIG. 14 is a perspective view showing the guiding part 345, and the pair of the first expanded plate 346 and second expanded plate 347 according to the present embodiment.

The guiding part 345 has a tapered structure 345a that expands in the opposite direction from the insertion direction (downwards) at the leading end side (radially inward direction).

In addition, the pair of the first expanded plates 346 and the second expanded plate 347 are provided for every tapered structure 345a under the tapered structure 345a of the guiding part 345. The pair of first expanded plates 345 is provided to correspond to the long sides of the slot 61 of rectangular cross section of the stator core 60. In addition, the second expanded plate 347 is provided to correspond to the outside short side of the slot 61.

The tapered structure 345a of the guiding part 345 is formed by the projecting parts 345c of arrow cross-section projecting from the leading end face 345b of the partitioned guiding part adjoining. In more detail, the upper lateral faces 345c1, 345c2 of the projecting part 345c incline so as to distance from each other as heading downwards, and the tapered structure 345a is formed by the upper lateral faces 345c1, 345c2 of the projecting parts 345c adjoining each other.

The pair of first expanded plates 346 and the second expanded plate 347 are extended in the insertion direction (downwards) from the leading end of the guiding part 345. Herein, since the lower lateral faces 345d1, 345d2 of the projecting part 345c incline so as to distance from each other as heading downwards, a tapered structure expanded in the opposite direction to the insertion direction (downwards) is also formed at the lower part of the projecting part 345c by the lower lateral faces 345d1, 345d2 of the projecting parts 345c adjoining each other.

The pair of first expanded plates 346 are coupled to the lower lateral faces 345d1, 345d2 of the projecting part 345c, and extend downwards along these lower lateral faces 345d1, 345d2. In other words, the pair of first expanded plates 346 is extended to each incline relative to the insertion direction, so as to approach each other as heading towards the lower end side (downwards).

Similarly, the second expanded plate 347 is also extended to incline relative to the insertion direction, so as to approach the slot center as heading towards the lower end side (downwards). The second expanded plate 347 is coupled to the sloped face (face sloping in the radially inward direction as downwards) formed at the leading end face lower part of the guiding part 345. As shown in FIG. 13, the second expanded plate 347 forms a pair with the guide plate 343 of the inner-circumferential guide 342, and approach each other as heading towards the lower end side (downwards).

In addition, this guide plate 343 and expanded plates 346, 347 are formed to have the lower end sides thereof expandable by bending. The spacing therebetween is formed to be narrower at the lower end side than the width of the insulating paper 62 installed inside of the respective slots 61 of the stator core 60, and formed to be wider at the upper end side than the width of the leg part 41 of the coil element 40.

This guide plate 343 and expanded plates 346, 347 are formed in lengths to insert the lower end into the respective slots 61 of the stator core 60 when causing the stator core 60 raised by the lift mechanism 120 of the stator core conveying device 10 to abut the lower end of the inner-circumferential guide 342.

As shown in FIGS. 1 and 2, the arc-shaped guide 348 is provided to every guiding part 345 partitioned into four at the lower side of the support part 341 of the guiding part 345. The arc-shaped guide 348 causes the rod to move in the radially inward direction by driving the piston, and abuts the outer circumference of the stator core 60 at the arc-shaped guide 348, when the lift mechanism 120 of the stator core conveying device 10 raises the jig 70 to which the stator core 60 is fixed. The position of the partitioned guiding part is finely adjusted so that the pair of first expanded plates 346 and the second expanded plate 347 thereby insert into the slot 61 of the stator core 60.

<Operation of Stator Manufacturing Device 1>

Next, operation of the stator manufacturing device 1 according to the present embodiment will be explained.

Figure 15:
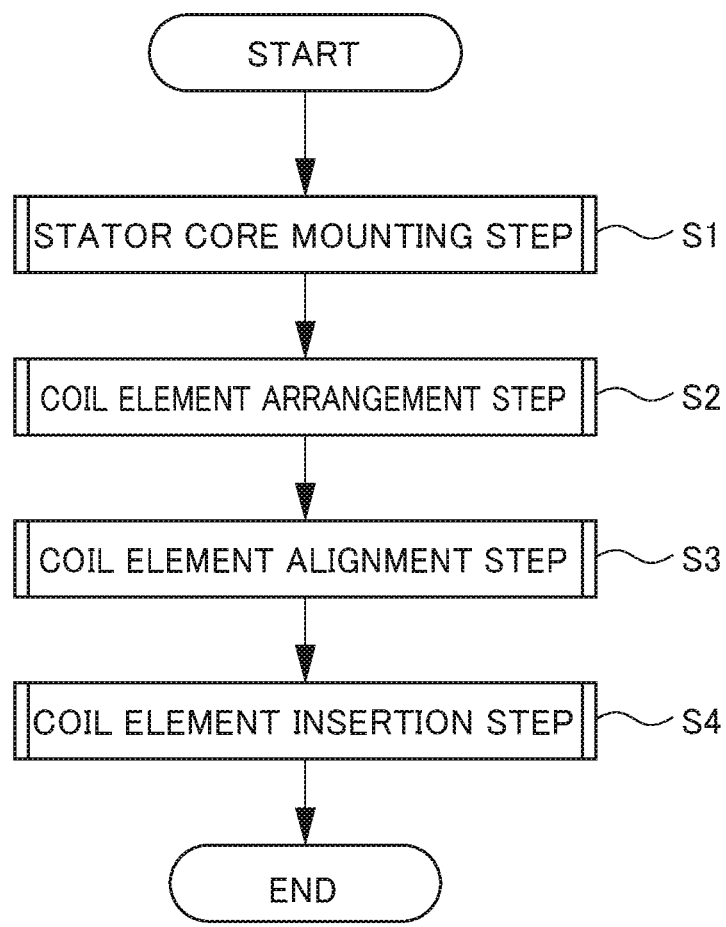
FIG. 15 is a flowchart showing operations of the stator manufacturing device according to the above-mentioned embodiment.

FIG. 15 is a flowchart showing operations of the stator manufacturing device 1 according to the present embodiment.

As shown in FIG. 15, the stator manufacturing device 1 conducts a stator core mounting step S1, coil element arrangement step S2, coil element alignment step S3, and coil element insertion step S4.

Next, each step will be explained.

<Stator Core Mounting Step S1>

In the stator core mounting step S1, the jig 70 to which the stator core 60 is fixed is installed at a predetermined position on the stator manufacturing device 1.

First, the operator places the jig 70 to which the stator core 60 is fixed on the conveying stand 112 on a front left side end of the stator manufacturing device 1, and then depresses a manufacture start button that is not illustrated.

After depression of the manufacture start button, the stator manufacturing device 1 activates. Then, the stator manufacturing device 1 drives the ball-screw mechanism 113 by way of the servo-motor 114 of the horizontal conveying mechanism 110 to cause the conveying stand 112 to move in the horizontal direction. The conveying stand 112 on which the jig 70 to which the stator core 60 is fixed is placed thereby moves on the slide rail 111 from the front left end of the stator manufacturing device 1 to the center.

Figure 16:
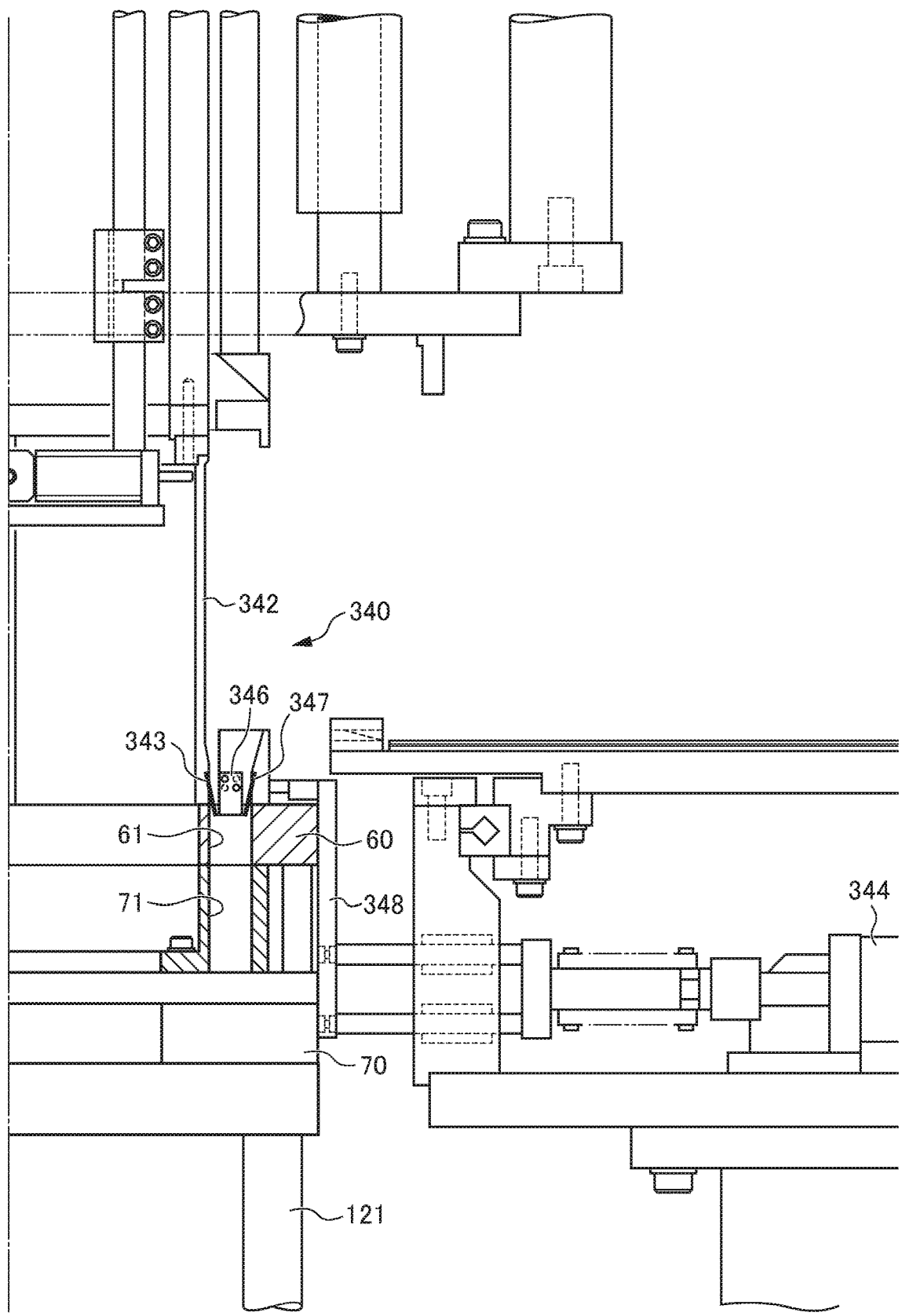
FIG. 16 is a view showing a state installing a stator core according to the above-mentioned embodiment.

FIG. 16 is a view showing a state of mounting the stator core 60 according to the present embodiment.

Next, the stator manufacturing device 1 drives the ball-screw mechanism 123 by way of the servo-motor 124 of the lift mechanism 120 to cause the four rods 121 to rise. The jig 70 to which the stator core 60 is fixed is thereby pressed up by the four rods 121. The four rods 121 pressing up the jig 70 to which the stator core 60 is fixed stops at a position having the upper face of the stator core 60 abut the lower end of the inner-circumferential guide 342 of the guidance device 340.

Herein, in the middle of pressing up the jig 70 to which the stator core 60 is fixed with the four rods 121, the stator manufacturing device 1 drives the piston of the cylinder mechanism of the guidance device 340 to cause the rod to move in the radially inward direction, and abuts the outer circumference of the stator core 60 with the arc-shaped guide 348. The positions of the pair of first expanded plates 346 and the second expanded plate 347 are thereby finely adjusted, and the guide plate 343 is aligned with the pair of first expanded plates 345 and the second expanded plate 347.

Then, the lower ends of the pair of first expanded plates 346 and the second expanded plate 347 along with the guide plate 343 of the guidance device 340 are inserted into the slot 61 of the stator core 60 in which the insulating paper 62 is installed.

As shown in FIG. 13, the end on the insertion side (upper side) of the insulating paper 62 installed inside of the slot 61 of the stator core 60 sticks out somewhat from the slot 61. For this reason, by the arc-shaped guide 348 abutting the outer circumference of the stator core 60 along with pushing up the jig 70 to which the stator core 60 is fixed by the four rods 121, the lower ends of the pair of first expanded plates 346 and the second expanded plate 347 along with the guide plate 343 enter a state inserted between the insulating paper 62 installed inside the slot 61 of the stator core 60.

<Coil Element Arrangement Step S2>

In the coil element arrangement step S2, the plurality of coil elements 40 is arranged in an annular shape lining up in the circumferential direction.

Figure 17:
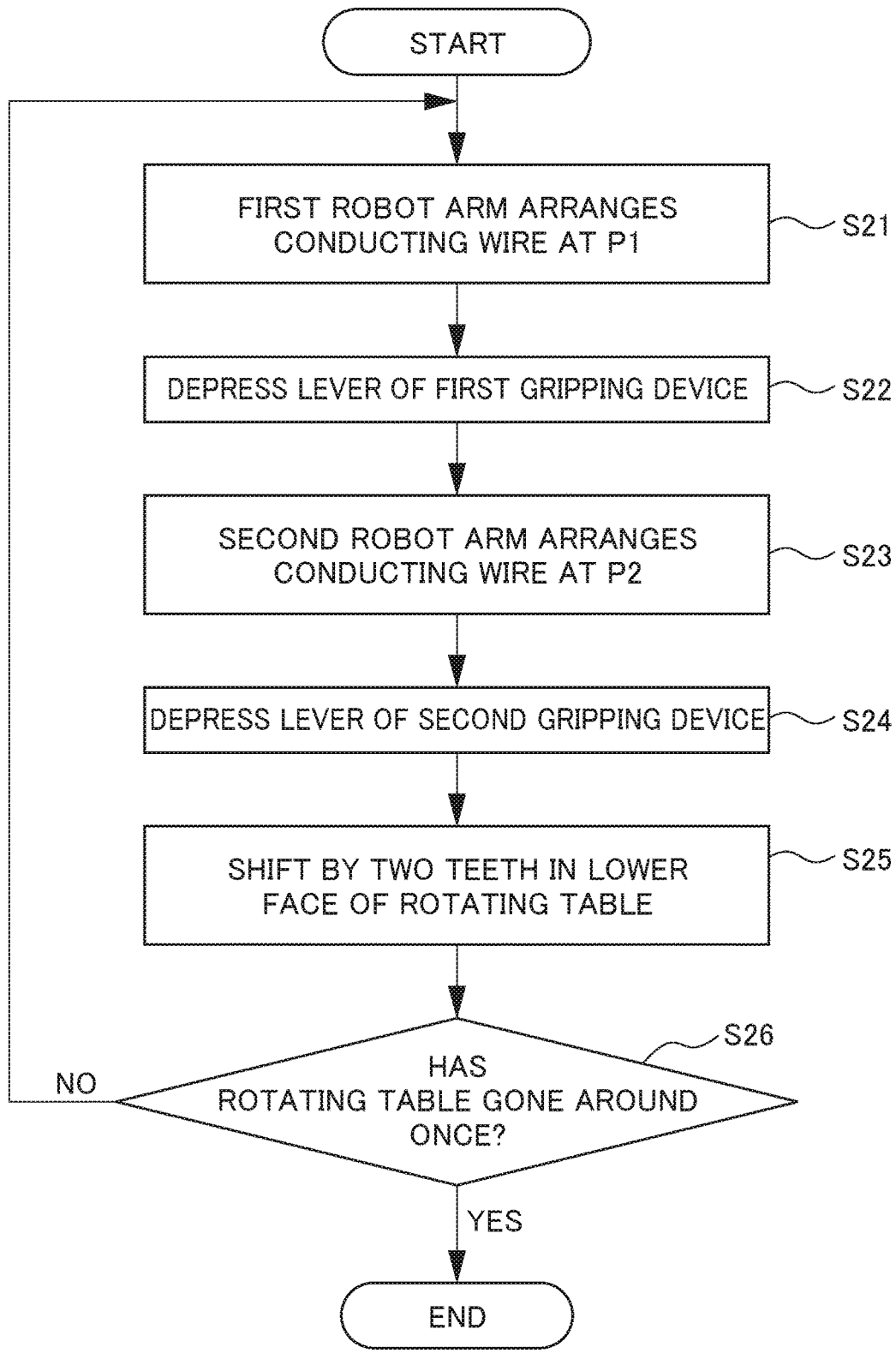
FIG. 17 is a flowchart showing operations of a coil element arrangement step according to the above-mentioned embodiment.

FIG. 17 is a flowchart showing the operations in the coil element arrangement step S2 according to the present embodiment.

As shown in FIG. 17, in Step S21, the stator manufacturing device 1 causes the coil element 40 to be gripped in the first robot arm 210a from the coil molding device 270a, and causes to be arranged at an arrangement point P1 on the rotating table 220 (refer to FIG. 3).

At the arrangement point P1, the coil element 40 is inserted in a chuck mechanism in the open state between the pair of claws 232g1, 232g2 of the first gripping device 230a.

Figure 18:
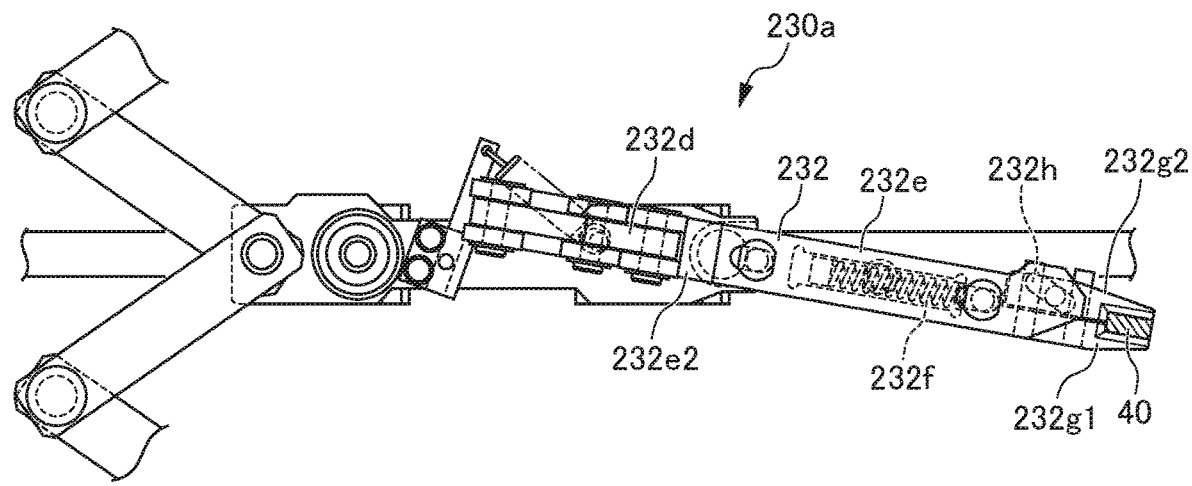
FIG. 18 is a view showing a state in which the first gripping device according to the above-mentioned embodiment gripped a coil element.
Figure 18:
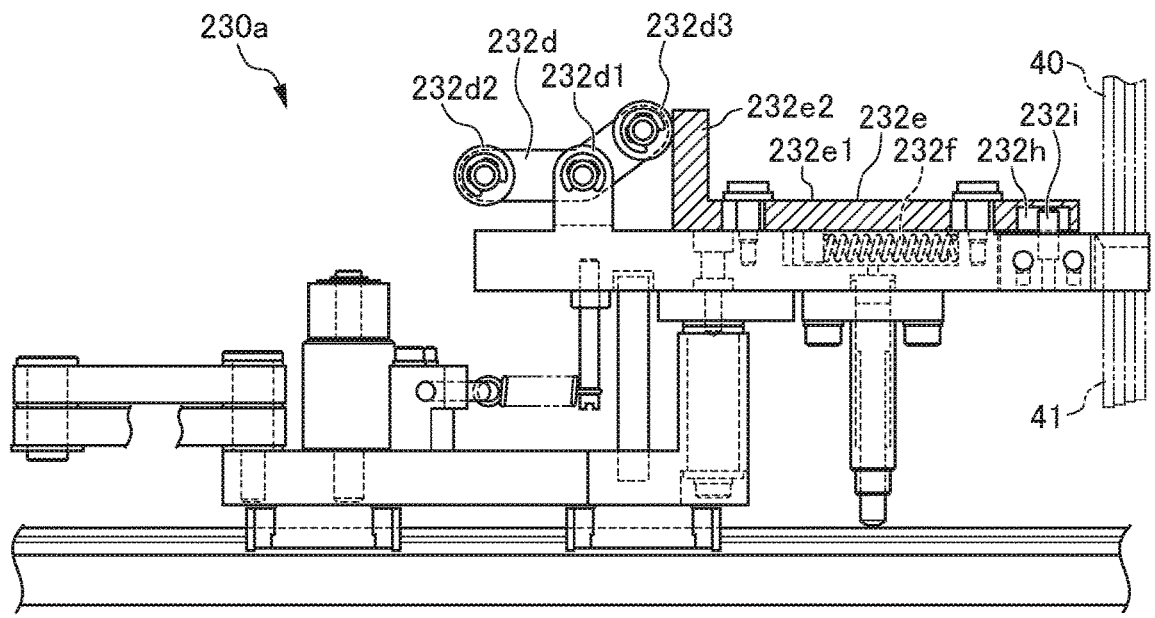

FIG. 18 is a view showing a state of the first gripping device 230a according to the present embodiment gripping the coil element 40.

In Step S22, the stator manufacturing device 1 depresses the base end 232d2 of the lever 232d of the first gripping device 230a existing at the arrangement point P1 with the depressing member 241, by driving the piston of the switch device 240. As shown in FIGS. 18(A) and (B), the first gripping device 230a thereby grips the coil element 40.

In more detail, when the depressing member 241 of the switch device 240 depresses the base end 232d2 of the lever 232d of the first gripping device 230a, the leading end 232d3 of the lever 232d rises and the L-shaped member 232e is biased to the base end side by the spring 232f. The elongated hole 232h of the L-shaped member 232e thereby moves to the base end side, and the protrusion 232i of the mobile claw 232g2 is arranged at the leading end side close to the right towards the central axis C1 of the elongated hole 232h. Then, the mobile claw 232g2 is pressed to the left wall face towards the central axis C1 of the elongated hole 232h, and the chuck mechanism of the pair of claws 232g1, 232g2 enters a clamping state, whereby one leg part 41 of the coil element 40 is gripped.

In addition, the depressing member 241 of the switch device 240 retracts upwards by way of the biasing of the spring, after depressing the base end 232d2 of the lever 232d. After retraction of the depressing member 241, in the first gripping device 230a, since the lever 232d is fixed to the short piece 232e2 of the L-shaped member 232e in a state raising the leading end 232d3 to be higher than the central part 232d1, the chuck mechanism is maintained in the clamped state.

By causing the main piece 232e1 to move by receiving the action of the switch device 240 at the short piece 232e2, the main piece 232e1 swings the mobile claw 232g2 by moving along the fixed claw 232g1. The linear motion of the main piece 232e1 can be converted to the gripping force of the pair of claws 232g1, 232g2 in this way. For this reason, the stator manufacturing device 1 can arrange the coil elements 40 in an annular shape by simply repeating a simple operation. In addition, the first gripping device 230a and switch device 240 become low-cost, simple, small-scale configurations.

In Step S23, the stator manufacturing device 1 causes the coil element 40 to be gripped at the second robot arm 210b from the coil molding device 270b, and causes to be arranged at the arrangement point P2 on the rotating table 220 (refer to FIG. 3).

At the arrangement point P2, the coil element 40 is inserted into the chuck mechanism in the open state between the pair of claws 232g1, 232g2 of the second gripping device 230b.

Figure 19:
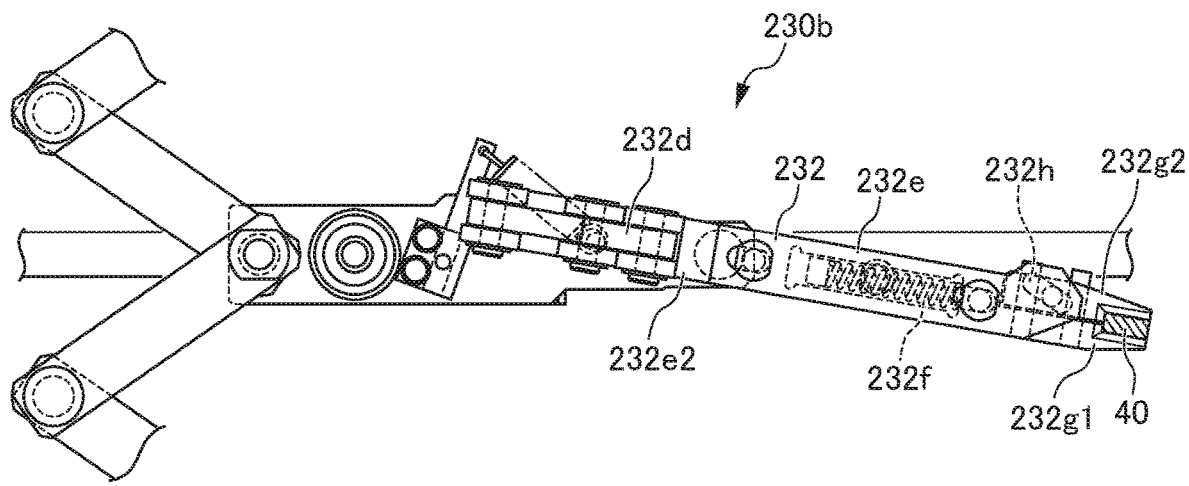
FIG. 19 is a view showing a state in which the second gripping device according to the above-mentioned embodiment gripped a coil element.
Figure 19:
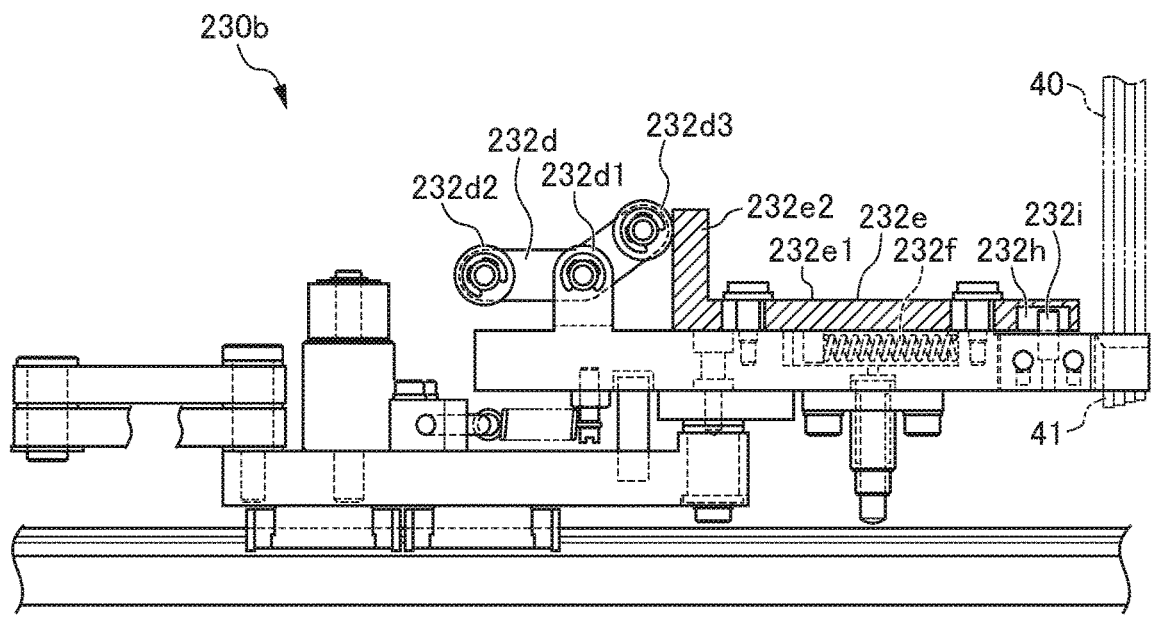

FIG. 19 is a view showing a state of the second gripping device 230b according to the second embodiment gripping the coil element 40.

In Step S24, the stator manufacturing device 1 depresses the base end 232d2 of the lever 232d of the second gripping device 230b existing at the arrangement point P2 with the depressing member 241 by driving the piston of the switch device 240. As shown in FIGS. 19(A) and (B), the second gripping device 230b thereby grips the coil element 40.

In more detail, when the depressing member 241 of the switch device 240 depresses the base end 232d2 of the lever 232d of the second gripping device 230b, the leading end 232d3 of the lever 232d rises and the L-shaped member 232e is biased to the base end side by the spring 232f. The elongated hole 232h of the L-shaped member 232e thereby moves to the base end side, and the protrusion 232i of the mobile claw 232g2 is arranged at the leading end side close to the right towards the central axis C1 of the elongated hole 232h. Then, the mobile claw 232g2 is pressed to the left wall face towards the central axis C1 of the elongated hole 232h, and the chuck mechanism of the pair of claws 232g1, 232g2 enters a clamping state, whereby one leg part 41 of the coil element 40 is gripped. Herein, the second gripping device 230b has a lower height in the axis-line direction of the central axis C1 than the first gripping device 230a, and thus grips even lower on the lower end of the one leg part 41 of the coil element 40.

In addition, the depressing member 241 of the switch device 240 retracts upwards by way of the biasing of the spring, after depressing the base end 232d2 of the lever 232d. After retraction of the depressing member 241, in the second gripping device 230b, since the lever 232d is fixed to the short piece 232e2 of the L-shaped member 232e in a state raising the leading end 232d3 to be higher than the central part 232d1, the chuck mechanism is maintained in the clamped state.

By causing the main piece 232e1 to move by receiving the action of the switch device 240 at the short piece 232e2, the main piece 232e1 swings the mobile claw 232g2 by moving along the fixed claw 232g1. The linear motion of the main piece 232e1 can be converted to the gripping force of the pair of claws 232g1, 232g2 in this way. For this reason, the stator manufacturing device 1 can arrange the coil elements 40 in an annular shape by simply repeating a simple operation. In addition, the second gripping device 230b and switch device 240 become low-cost, simple, small-scale configurations.

After the processing of Step S24, each of the plurality of gripping devices 230 is biased by the spring 233 so as to enter a state prior to rotating the coil elements 40 to the right side 10° towards the central axis C1 about the rotation shaft 231e that is parallel to the annular central axis C1. For this reason, each of the plurality of coil elements 40 can rotate about the rotation shaft 231e that is parallel to the annular central axis C1, while moving towards the annular center.

In Step S25, the stator manufacturing device 1 only shifts two teeth 224 in the lower face of the rotating table 220 by driving the servo-motor 262 of the table drive device 260. From each of the first gripping device 230a and second gripping device 230b for which gripping of the coil element 40 has thereby completed, one of the empty gripping devices 230a, 230b of the same type that has not yet gripped the coil element 40 is arranged at the two arrangement points P1, P2 on the rotating table 220, respectively.

At this time, every time shifting one tooth 224 in the lower face of the rotating table 220 by driving the servo-motor 262, the roller 231c fitting with the convex part 256 in the plate 255 of the four drive mechanisms 250, at different positions from the two arrangement points P1, P2 on the rotating table 220, moves in the circumferential direction from the convex part 256 according to the movement in the circumferential direction of the gripping device 230 accompanying the rotation of the rotating table 220, whereby the fitting between the roller 231c and the convex part 256 is released. Then, the gripping device 230 having this roller 231c moves from the four drive mechanisms 250.

Furthermore, the gripping device 230 adjacent to the gripping drive 230 moving from the four drive mechanisms 250 moves to the four drive mechanisms 250. Then, the roller 231c of the gripping device 230 moving to the four drive mechanisms 250 comes together from the circumferential direction with the convex part 256 according to the movement in the circumferential direction of the gripping device 230 accompanying the rotation of the rotating table 220, and the roller 231c and the convex part 256 fit together.

In Step S26, the stator manufacturing device 1 determines whether the rotating table 220 has rotated once. In the case of positively determining that the rotating table 220 rotated once in Step S26, since the plurality of coil elements 40 have been arranged in an annular shape, the coil element arrangement step S2 is ended. In the case of negatively determining that the rotating table 220 has not yet rotated once, the processing advances to Step S21.

In this way, in the coil element arrangement step S2, the plurality of coil elements 40 are arranged in an annular shape by repeating Steps S21 to S24 for gripping the coil elements 40 in the first gripping device 230a and second gripping device 230b, and Step S25 for arranging the other gripping devices 230 that have not yet gripped the coil element 40 at the arrangement points P1, P2 for gripping the coil element 40 by causing the plurality of gripping devices 230 to rotate integrally.

By causing the gripping devices 230 to rotate by the rotating table 220 on which the plurality of gripping devices 230 are aligned in an annular shape, the plurality of coil elements 40 can thereby be arranged in an annular shape while supplying the coil elements 40 to the same arrangement points P1, P2 with the robot arms 210a, 210b and gripping in the gripping devices 230.

Therefore, it is possible to grip each of the plurality of coil elements 40 by the plurality of gripping devices 230, respectively, by repeating a simple operation with a low-cost, simple, small-scale configuration.

<Coil Element Alignment Step S3>

In the coil element alignment step S3, the assembly 50 is formed by assembling the plurality of coil elements 40.

Figure 20:
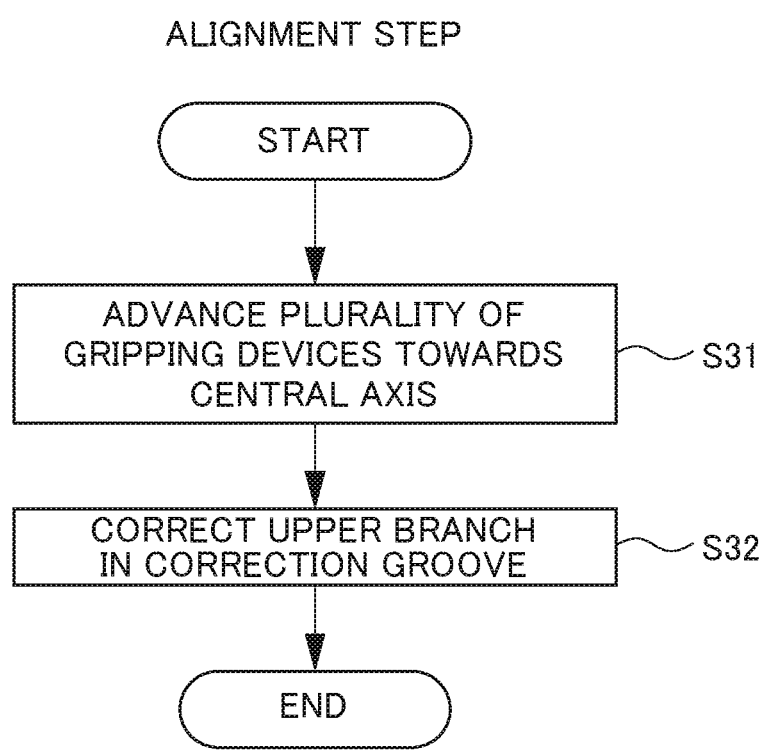
FIG. 20 is a flowchart showing operations of a coil element alignment step according to the above-mentioned embodiment.
Figure 21:
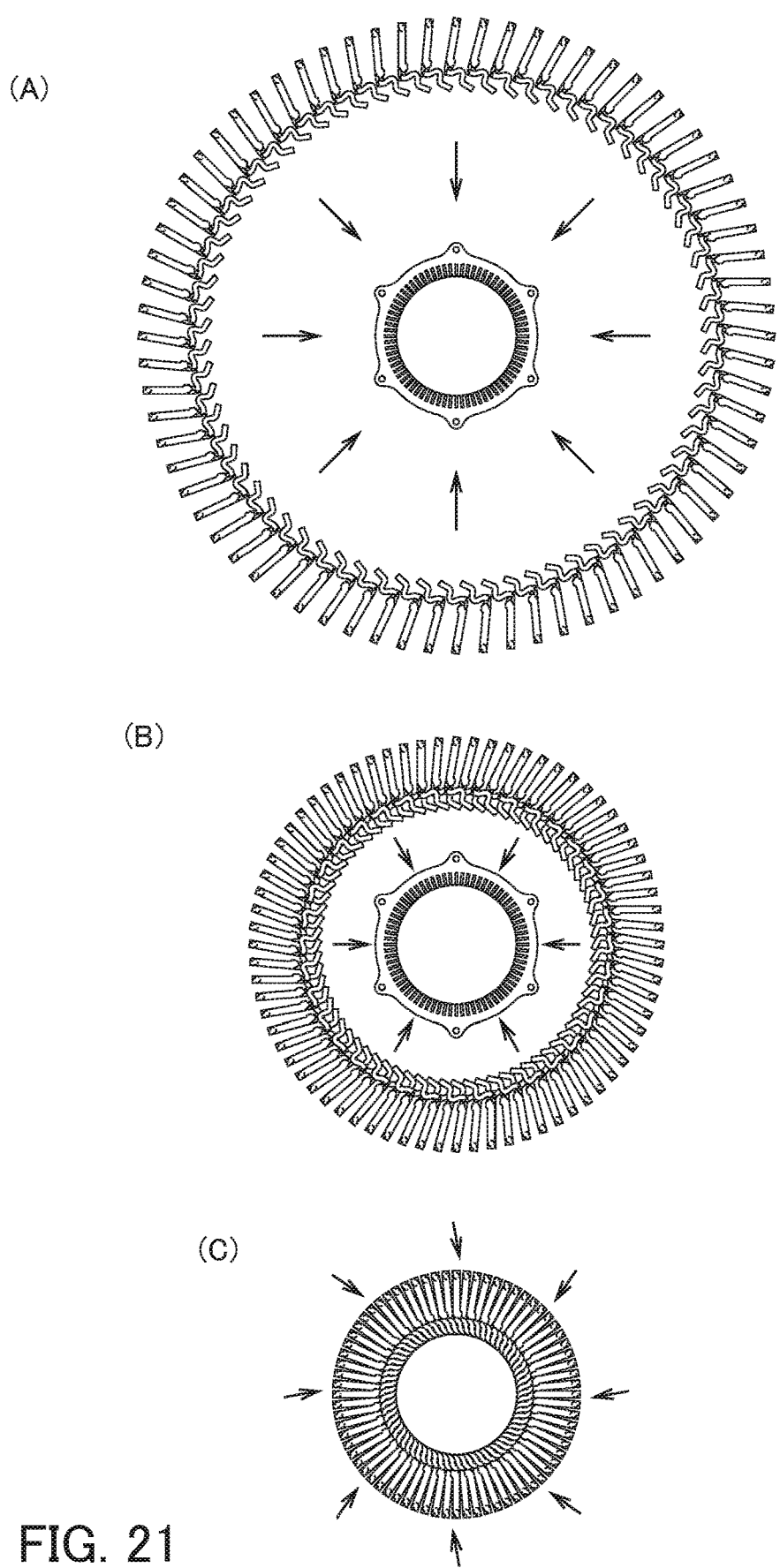
FIG. 21 is a view of forming an assembly by assembling a plurality of coil elements according to the above-mentioned embodiment.

FIG. 20 is a flowchart showing the operations of the coil element alignment step S3 according to the present embodiment. FIG. 21 is a view of forming an assembly by assembling the plurality of coil elements 40 according to the present embodiment.

As shown in FIG. 20, in Step S31, the stator manufacturing device 1 causes the plate 255 attached to the slide rail 254 to move in the radially inward direction by driving the servo-motor 253 of the four drive mechanisms 250. The drive force is imparted on the plurality of gripping devices 230, thereby causing the plurality of gripping devices 230 to advance toward the annular central axis C1. The plurality of coil elements 40 arranged in an annular shape are thereby reduced in the diameter of the annular shape such as from the state of FIG. 21(A) to the state of FIG. 21(B).

In Step S32, the stator manufacturing device 1 causes the plate 255 attached to the slide rail 254 to move in the radially inward direction by further driving the servo-motor 253 of the four drive mechanisms 250. At this time, the pin 232c of the upper branch 232 of the gripping device 230 is guided to the correction groove 223, at the near side at which the plurality of gripping devices 230 gather towards the annular central axis C1. The upper branch 232 of the plurality of gripping devices 230 is corrected 10° to the left side towards the central axis C1 about the rotation shaft 231e that is parallel to the annular central axis C1, while the plurality of gripping devices 230 advances towards the annular central axis C1. As shown in FIG. 21(C), the corrected upper branches 232 cause the gripped coil elements 40 to abut the inner-circumferential guide 342 by correcting 10° to the left side towards the central axis C1 about the rotation shaft 231e that is parallel to the annular central axis C1.

The pin 232c is guided to the correction groove 223, causing the upper branch 232 gripping the coil element 40 to rotate, whereby the each of the plurality of coil elements 40 rotates about the rotation shape 231e that is parallel to the annular central shaft C1, while moving towards the annular center.

Since the plurality of coil element 40 thereby rotates 10° C. to the left side towards the central axis C1 about the rotation shaft 231e that is parallel to the annular central axis C1, the diameter of the annular shape in which the plurality of coil elements 40 is arranged becomes smaller than the state not rotated, and interference between adjacent coil elements 40 is avoided.

Therefore, when one leg part 41 of the plurality of coil elements 40 is gripped and aligned, the leg parts 41 of adjacent coil elements 40 will not interfere immediately before alignment.

Figure 22:
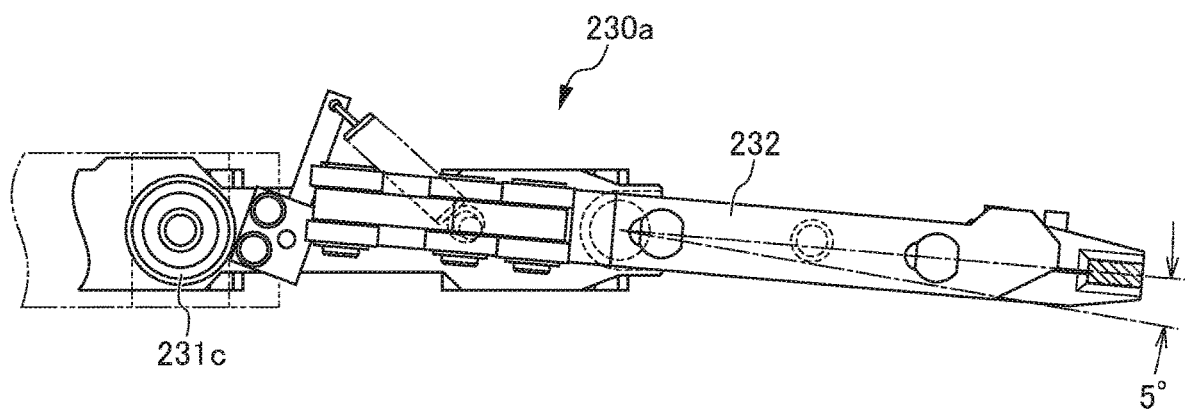
FIG. 22 is a view showing a state of correcting an upper branch of the first gripping device according to the above-mentioned embodiment by 5° to the left side towards a central axis.
Figure 22:
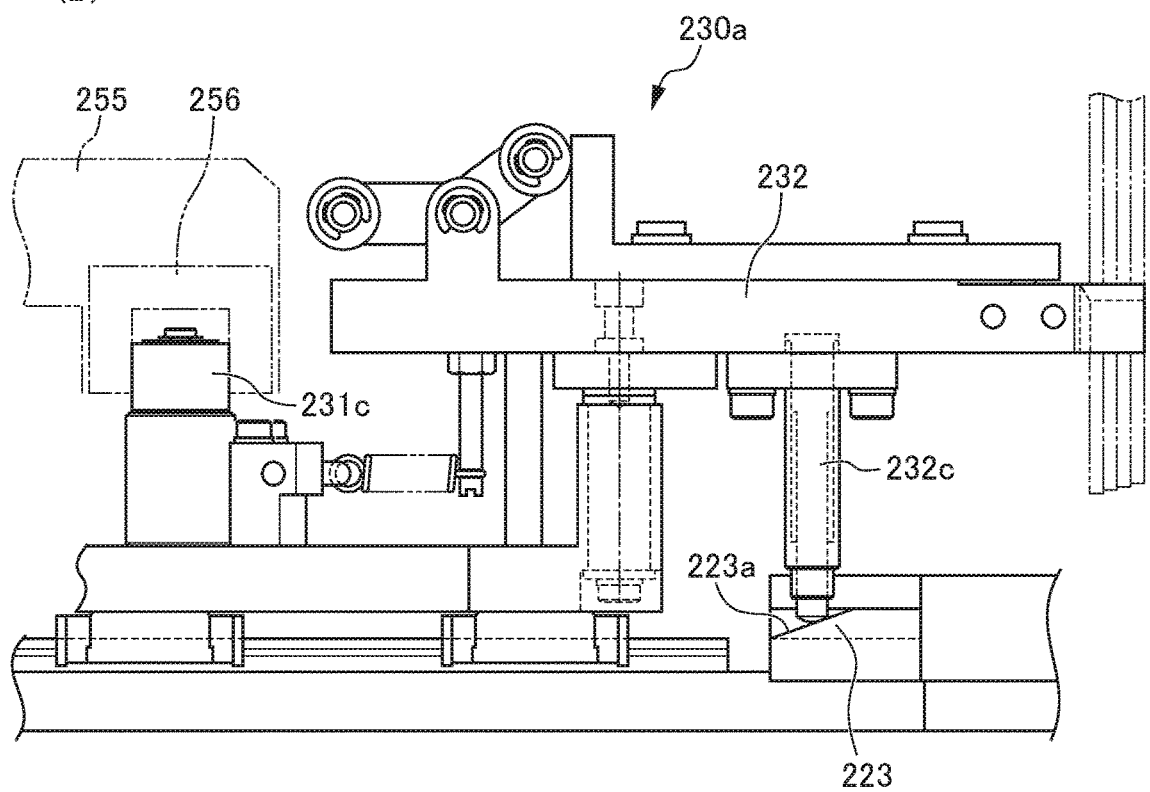
Figure 23:
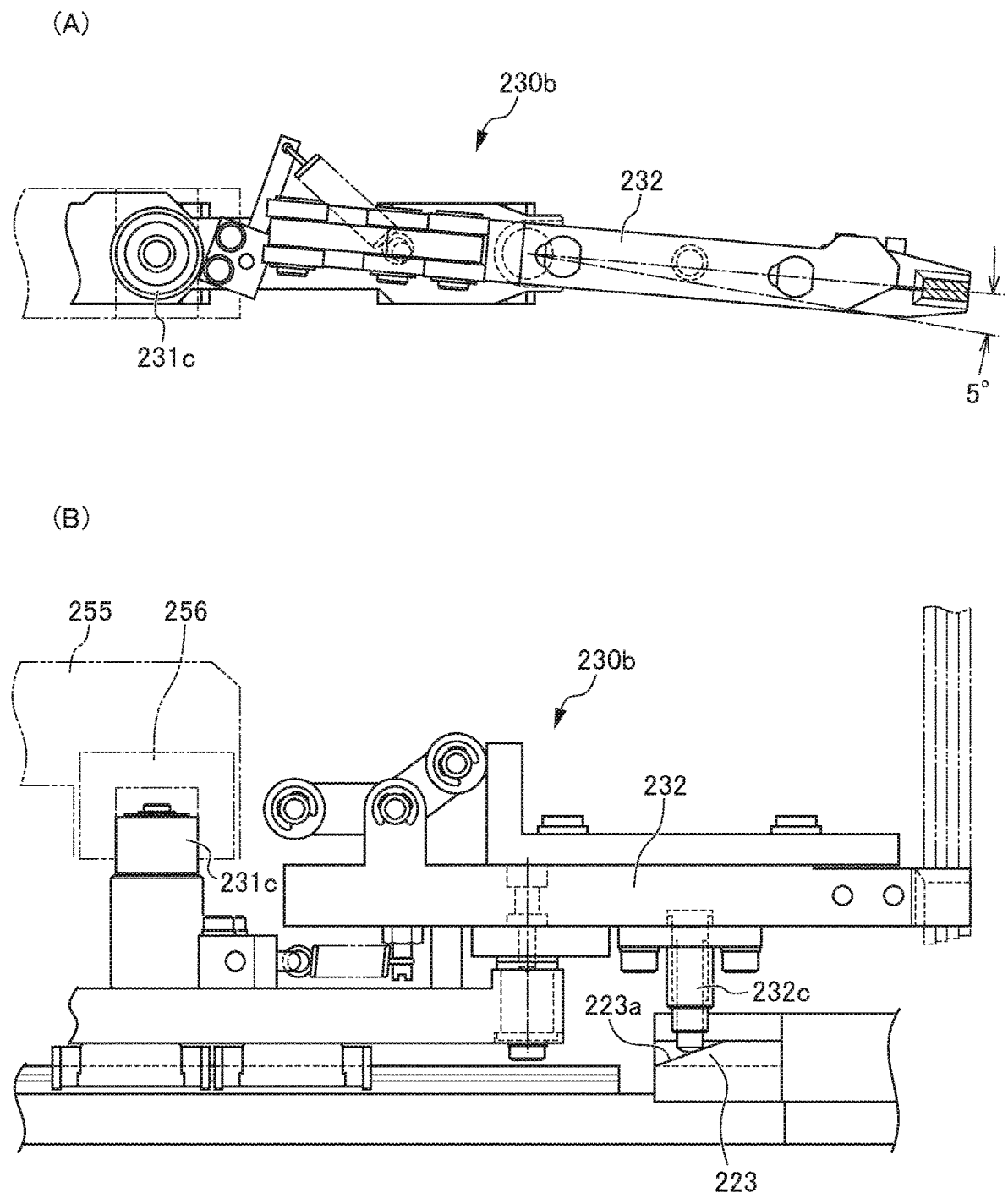
FIG. 23 is a view showing a state of correcting an upper branch of the second gripping device according to the above-mentioned embodiment by 5° to the left side towards a central axis.

FIG. 22 is a view showing a state of correcting the upper branch 232 of the first gripping device 230a according the present embodiment 5° to the left side towards the central axis C1. FIG. 23 is a view showing a state of correcting the upper branch 232 of the second gripping device 230b according the present embodiment 5° to the left side towards the central axis C1.

As shown in FIGS. 22 and 23, when the pins 232c of the upper branch 232 of the first gripping device 230a and second gripping device 230b are guided in the correction grooves 223, the pins 232c are corrected to the left side towards the central axis C1 by the regulating wall faces 223b along with running on the sloped faces 223a.

Figure 24:
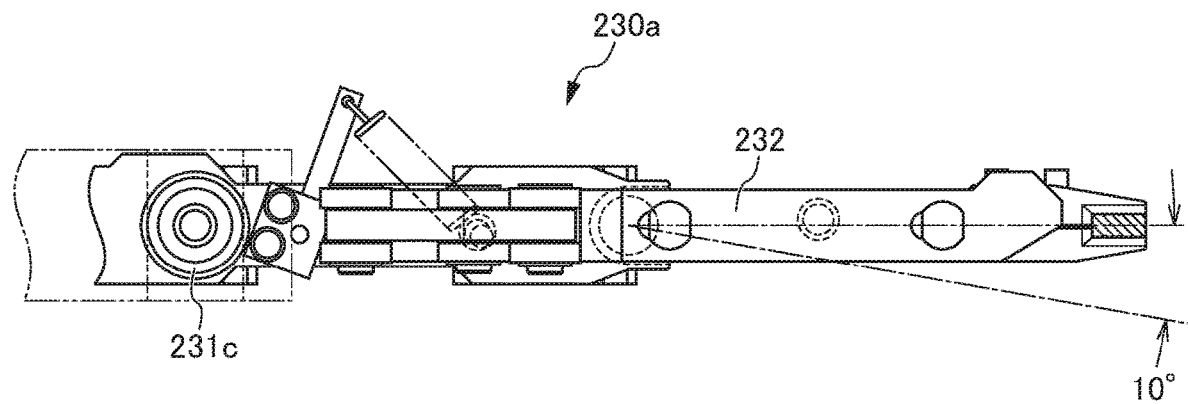
FIG. 24 is a view showing a state of correcting an upper branch of the first gripping device according to the above-mentioned embodiment by 10° to the left side towards a central axis.
Figure 24:
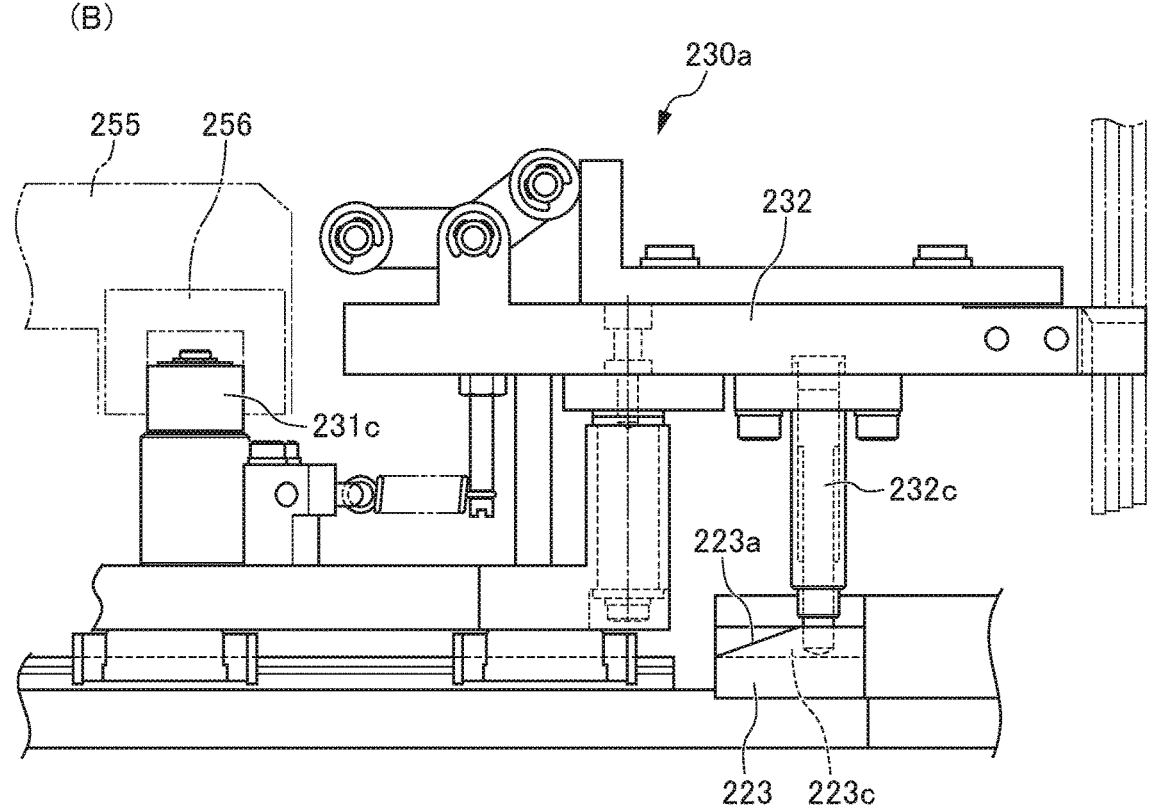
Figure 25:
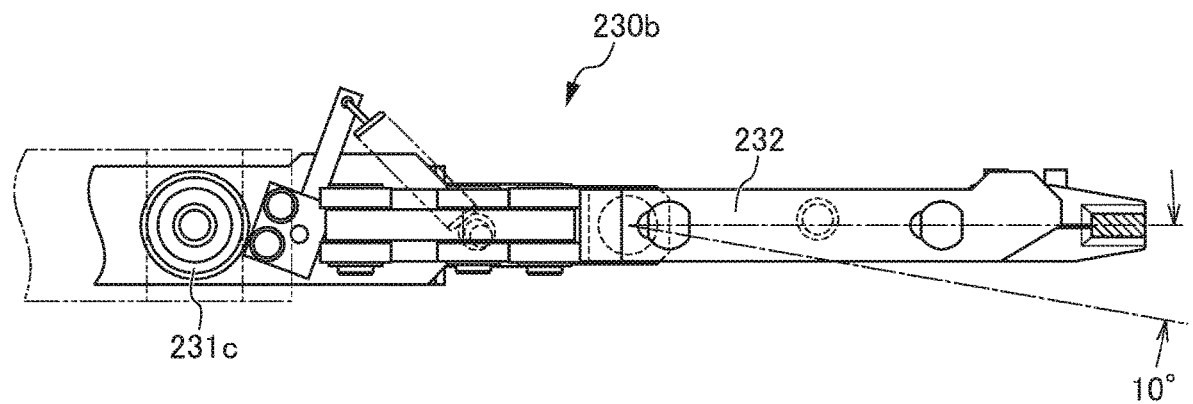
FIG. 25 is a view showing a state of correcting an upper branch of the second gripping device according to the above-mentioned embodiment by 10° to the left side towards a central axis.
Figure 25:
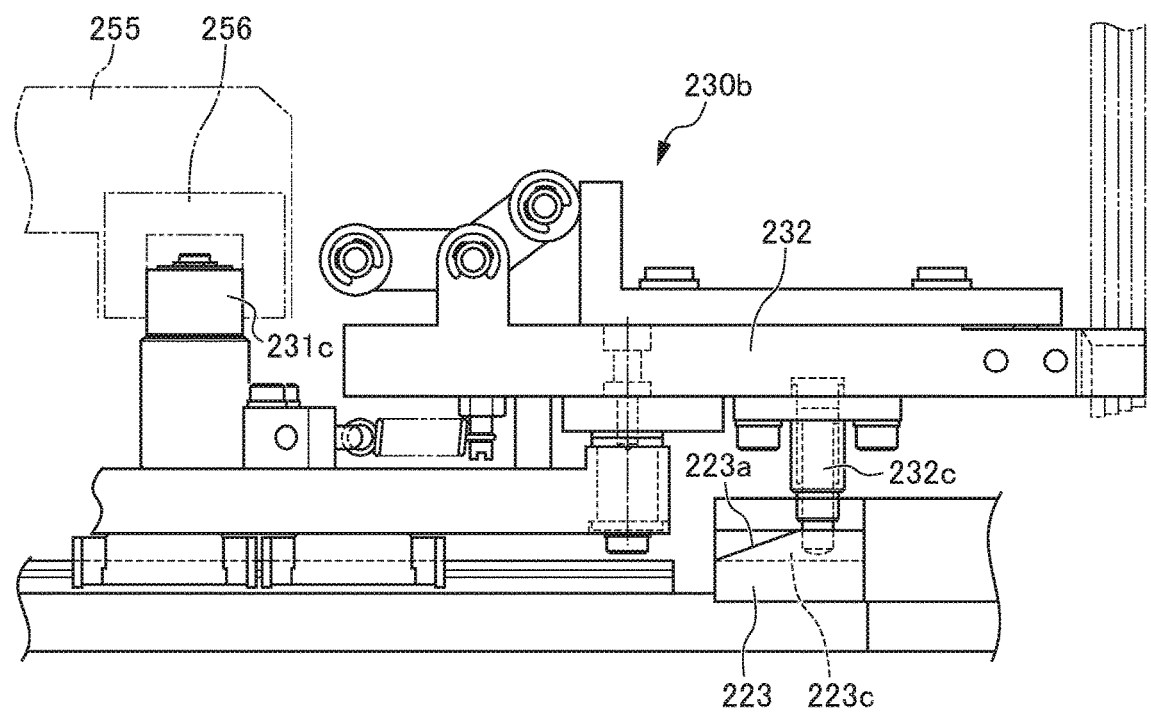

FIG. 24 is a view showing a state of correcting the upper branch 232 of the first gripping device 230a according to the present embodiment 10° to the left side towards the central axis C1. FIG. 25 is a view showing a state of correcting the upper branch 232 of the second gripping device 230b according to the present embodiment 10° to the left side towards the central axis C1.

As shown in FIGS. 24 and 25, when the first gripping device 230a and second gripping device 230b move further to the central axis C1 direction, while the pin 232c is being guided in the correction groove 223, the pin 232c is corrected 100 to the left side towards the central axis C1 by the regulating wall face 223b and falls to the bottom face 223c from the sloped face 223. The first gripping device 230a and second gripping device 230b thereby maintain a state correcting the upper branch 232 10° to the left side towards the central axis C1, and gather the gripped coil elements 40 by causing to move 10° towards the central axis C1. At this time, it enters a state directly connecting the upper branch 232 and main body 231 along the radial direction, and thus adjacent gripping devices 230 can gather without interfering.

Figure 26:
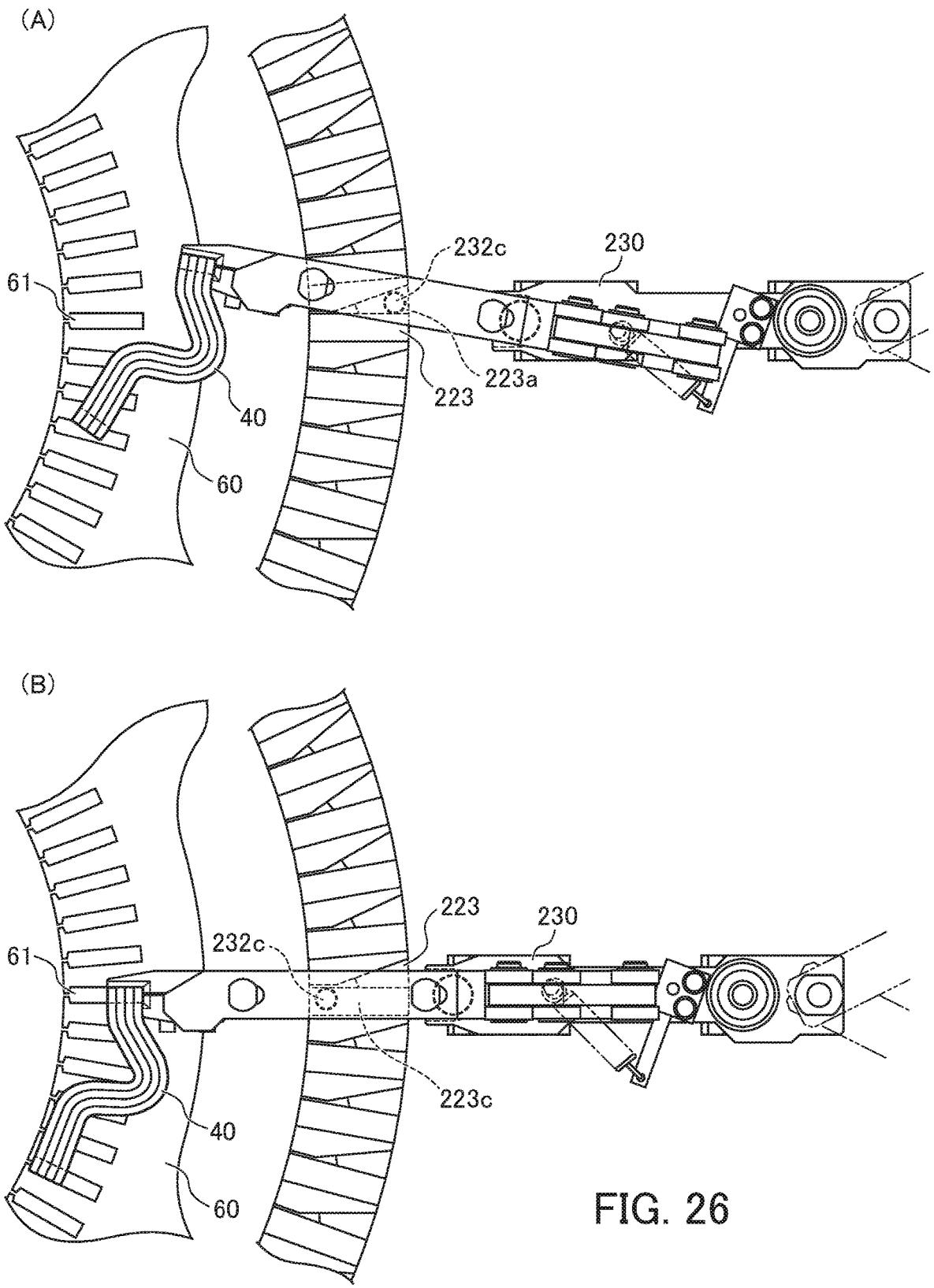
FIG. 26 is a view showing states before and after a coil element according to the above-mentioned embodiment rotates.

FIG. 26 is a view showing states before and after the coil element 40 according to the present embodiment rotates.

In this way, by causing the plurality of coil elements 40 to move in a direction reducing the diameter of the annular shape, each of the plurality of coil elements 40 is aligned in a state in which the turn sections 42 provided at substantially apex portions alternately overlap. At this time, such as from the pre-rotation state shown in FIG. 26(A) to the post-rotation state shown in FIG. 26(B), it is arranged in a state rotating 10° to the left side towards the central axis C1 about the rotation shaft 231e that is parallel to the annular central axis C1.

Figure 27:
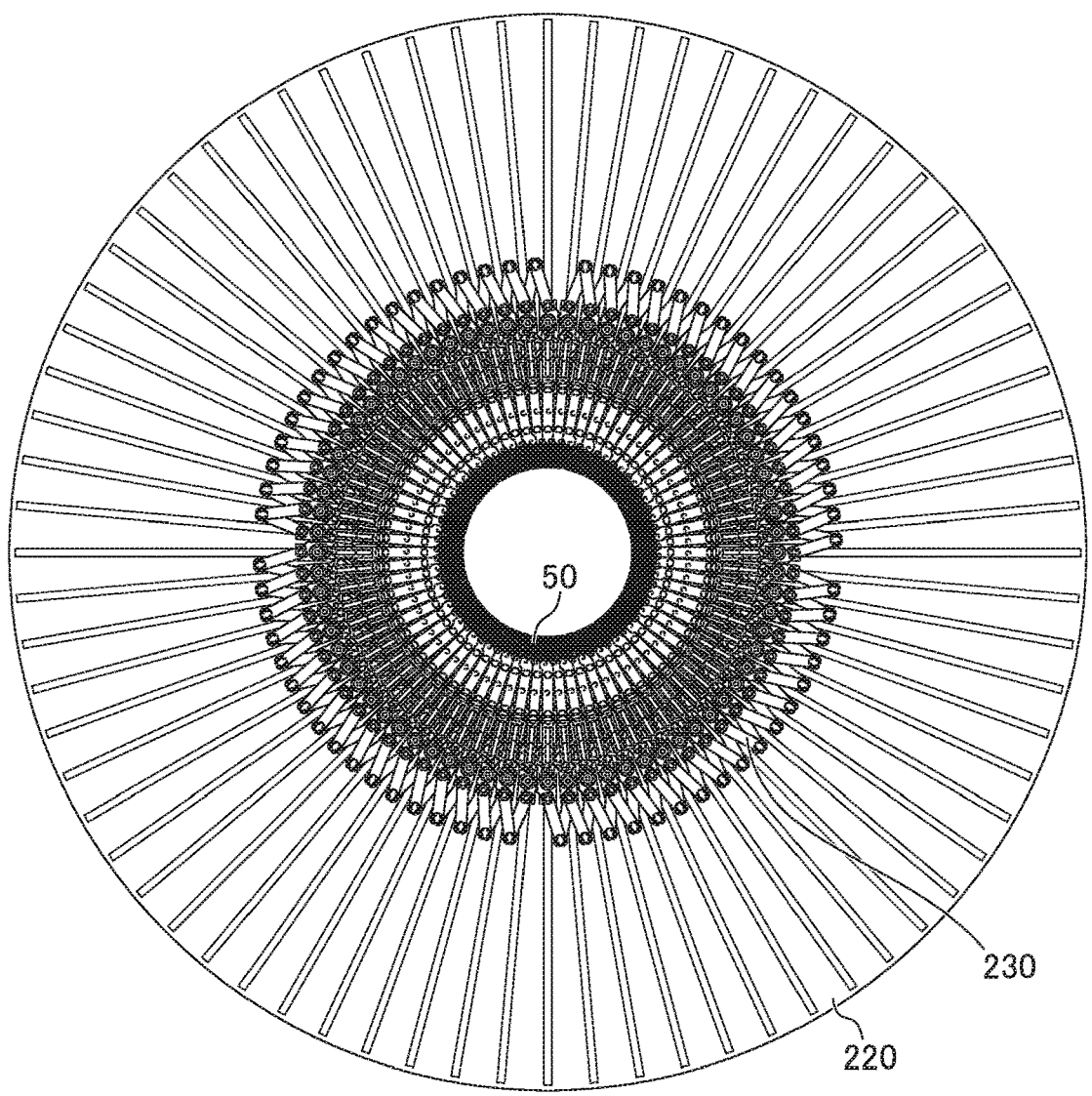
FIG. 27 is a view showing a state of an assembly according to the above-mentioned embodiment being formed.
Figure 27:
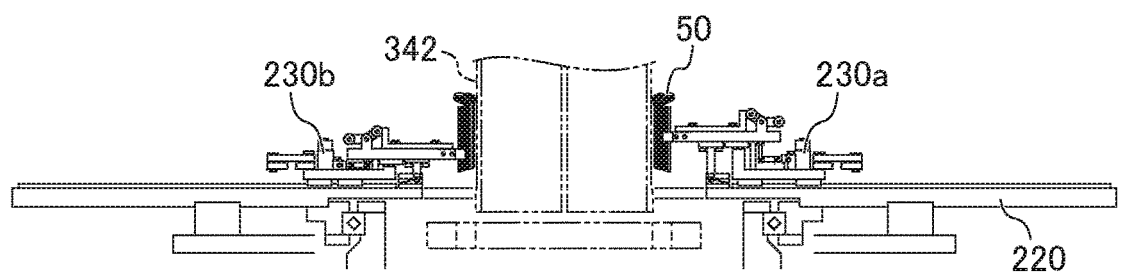

FIG. 27 is a view showing a state in which the assembly 50 according to the present embodiment is formed.

As shown in FIG. 27, the assembly 50 is formed that is an annular shape which is a state in which the turn sections 42 of the plurality of coil elements 40 alternately overlap, and at the inside diameter side, is abutting the inner-circumferential guide 342.

<Coil Element Insertion Step>

In the coil element insertion step S4, the leg part 41 of each coil element 40 in the assembly 50 is inserted into the respective slots 61 of the stator core 60.

Figure 28:
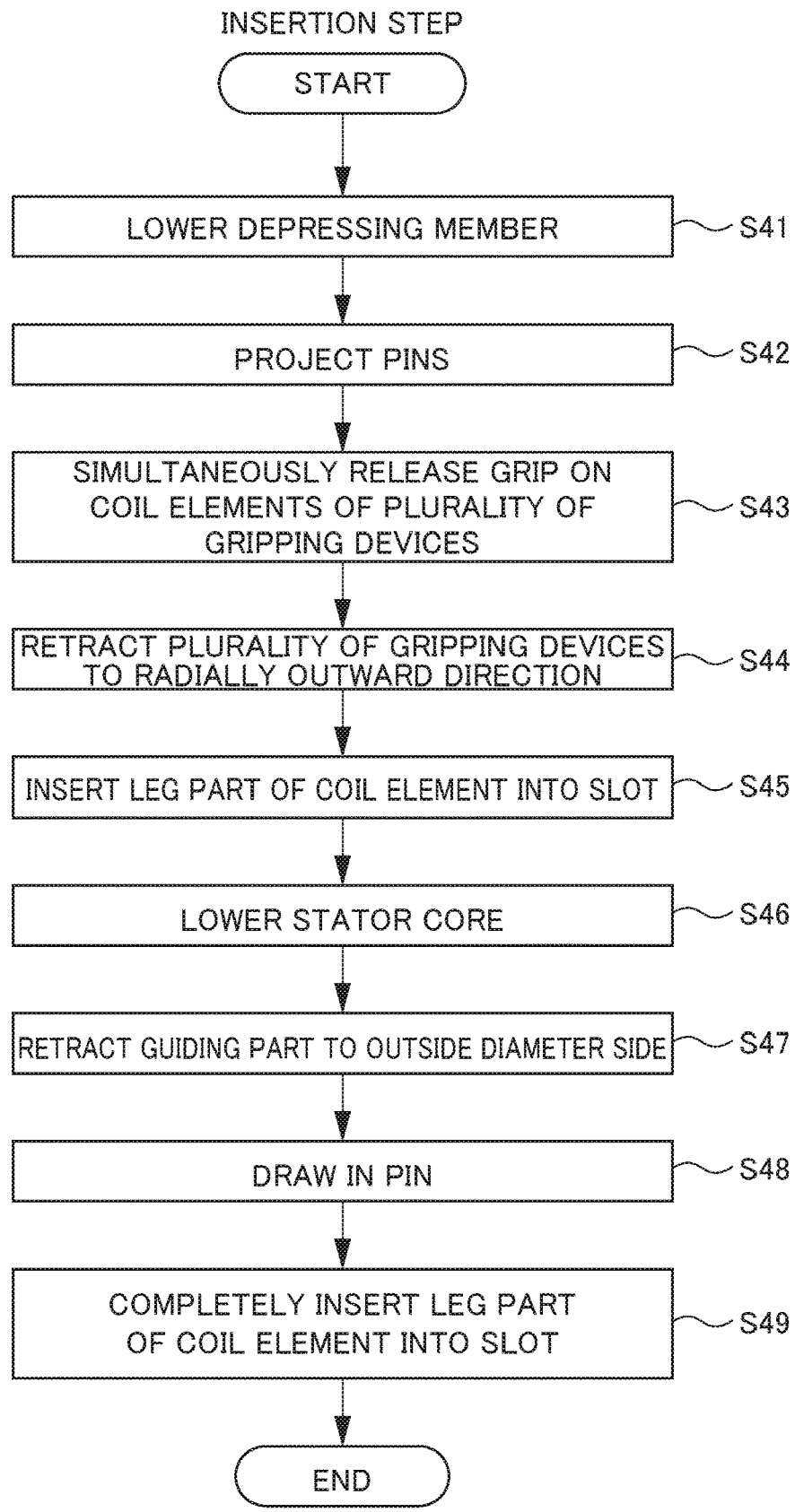
FIG. 28 is a flowchart showing operations of a coil element insertion step according to the above-mentioned embodiment.

FIG. 28 is a flowchart showing the operations of the coil element insertion step S4 according to the present embodiment.

Figure 29:
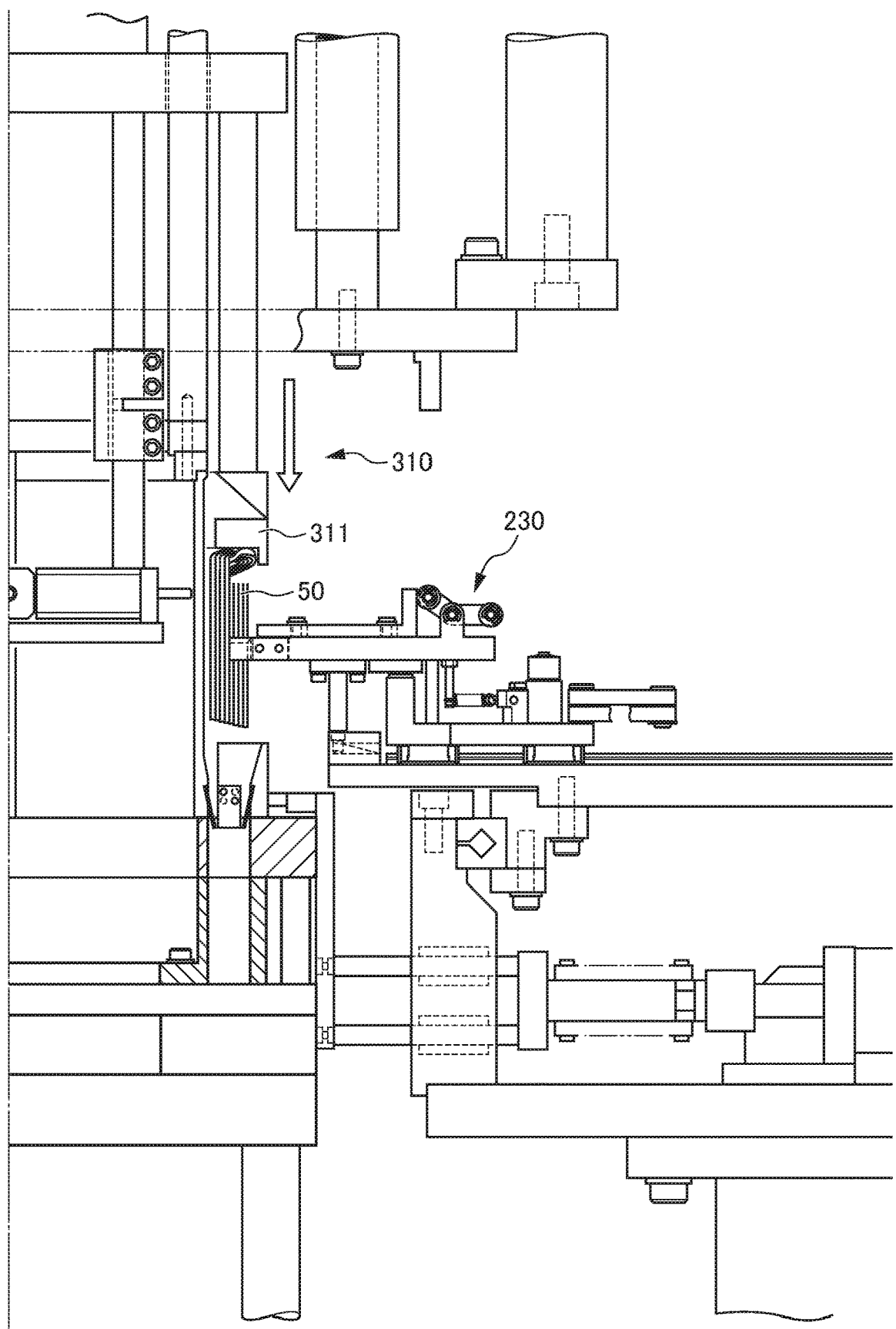
FIG. 29 is a view showing a state of a depressing member according to the above-mentioned embodiment being made to descend.

FIG. 29 is a view showing a state lowering the depressing member 311 according to the present embodiment.

As shown in FIG. 29, in Step S41, the stator manufacturing device 1 causes the depressing member 311 of the coil element depressing mechanism 310 to lower by driving the piston of the coil element depressing mechanism-cylinder mechanism 350, thereby causing the lower face of the depressing member 311 to abut the assembly 50.

Figure 30:
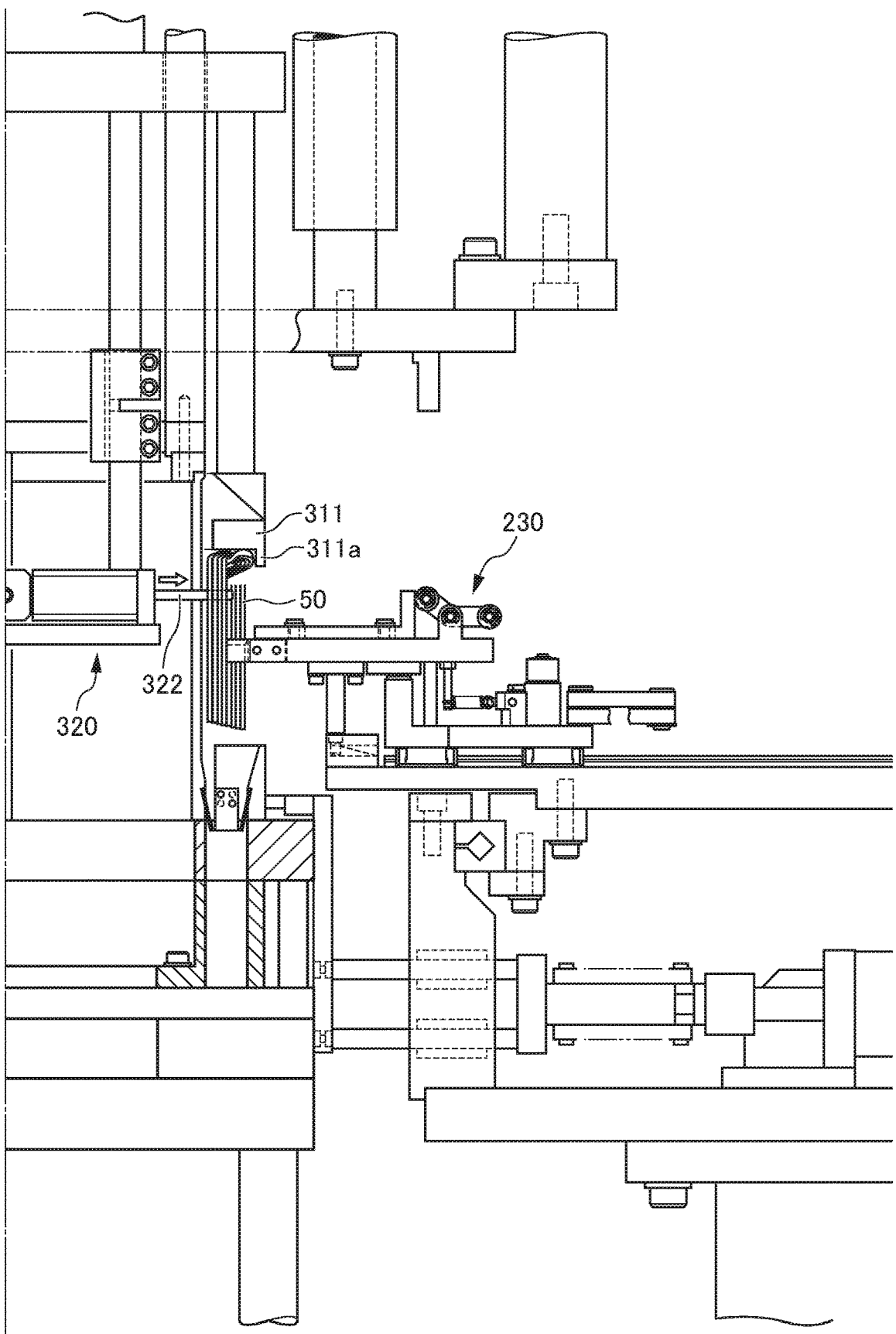
FIG. 30 is a view showing a state of projecting a pin according to the above-mentioned embodiment.

FIG. 30 is a view showing a state of projecting the pin 322 according to the present embodiment.

As shown in FIG. 30, in Step S42, the stator manufacturing device 1 causes the pin 322 of the pin projecting mechanism 320 to project when the lower face of the lowered depressing member 311 abuts the assembly 50. Four of the pins 322 thereby project to the radially outward direction, abutting the lower side of the turn section 42 of a predetermined coil element 40 in the assembly 50, sandwiching the turn section 42 with the depressing member 31, and supporting from the lower side using the shape of the turn section 42, whereby the assembly 50 is supported. Then, since the assembly 50 is supported by supporting the turn sections 42 from the lower side, the leg part 41 of each of the coil elements 40 in the assembly 50 enters a free state.

By causing the pin 322 of the pin projecting mechanism 320 to project when the lower face of the lowered depressing member 311 abuts the assembly 50, the pin 322 projects at the ideal timing for abutting the lower side of the turn section 42 of a predetermined coil element 40 in the assembly 50.

At this time, by the lower face of the lowered depressing member 311 abutting the assembly 50, the annular protrusion 311 at the lower face of the depressing member 311 guides the outer circumferential side of the turn section 42 of each coil element 40 in the assembly 50 from the outside diameter side. When the four pins 322 project in the radially outward direction in this way, due to being a state in which the annular protrusion 311a at the lower face of the depressing member 311 guides the turn section 42 of each coil element 40 in the assembly 50 from the outside diameter side, the shape of the assembly 50 can be maintained, even if the projecting pins 322 press the assembling 50 from the outside diameter side.

Figure 31:
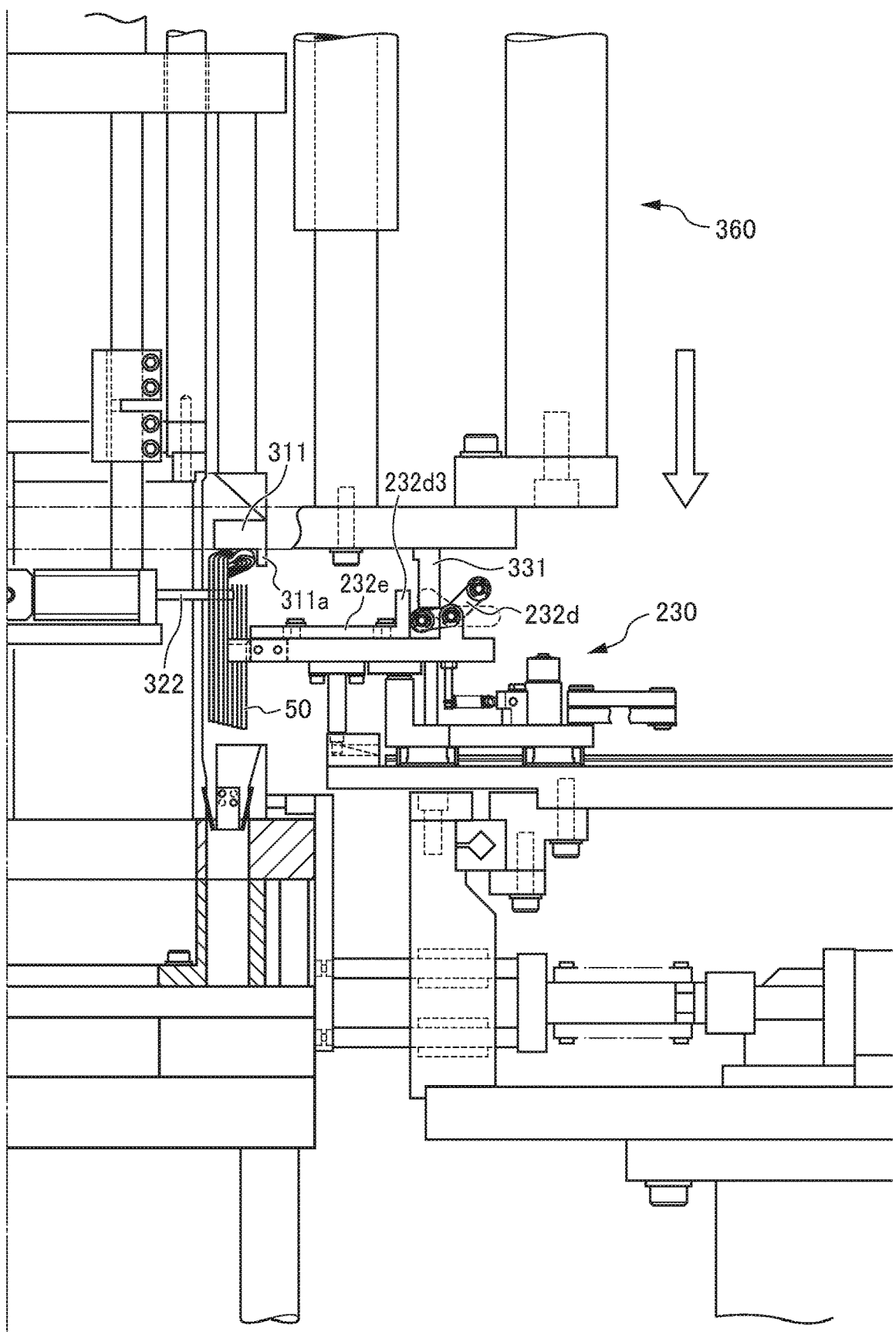
FIG. 31 is a view showing a state simultaneously releasing the grip of coil elements by the plurality of gripping devices according to the above-mentioned embodiment.

FIG. 31 is a view showing a state of simultaneously releasing the grip of the coil elements 40 by the plurality of gripping devices 230 according to the present embodiment.

As shown in FIG. 31, in Step S43, the stator manufacturing device 1 causes the plurality of depressing pins 331 of the lever depressing mechanism 330 to lower by driving the pistons of the two lever depressing mechanism-cylinder mechanisms 360, and simultaneously depresses the leading end 232d3 of the levers 232d of the plurality of gripping devices 230 with the plurality of depressing pins 331. The plurality of gripping devices 230 thereby simultaneously releases the grip of the coil elements 40.

In more detail, when simultaneously depressing the leading end 232d3 of the levers 232 of the plurality of gripping devices 230 with the plurality of depressing pins 331, the leading end 232d3 of the lever 232d lowers and the L-shaped member 232e moves to the leading end side against the spring 232f. The elongated hole 232h of the L-shaped member 232e thereby moves to the leading end side, causing the protrusion 232i of the mobile claw 232g2 to be arranged at the base end side of the elongated hole 232h close to the left towards the central axis C1. Then, the chuck mechanism of the pair of claws 232g1, 232g2 enters the open state by the mobile claw 232g2 being pressed to the right wall face of the elongated hole 232h, and one leg part 41 of the coil element 40 is released.

After the plurality of depressing pins 331 simultaneously depress the leading end of 232d3 of the levers 232d of the plurality of gripping devices 230, the stator manufacturing device 1 causes the plurality of depressing pins 331 of the lever depressing mechanism 330 to rise by driving the pistons of the two lever depressing mechanism-cylinder mechanisms 360. When causing the plurality of depressing pins 331 to rise, with the plurality of gripping devices 230, the lever 232d is fixed to the short piece 232e2 of the L-shaped member 232e in a state lowering the leading end 232d3 to lower than the central part 232d1; therefore, the chuck mechanism is maintained in an opened state.

Then, the assembly 50 is supported by the four pins 322, along with the turn section 42 of each coil element 40 in the assembly 50 being guided from the outside diameter side by the annular protrusion 331a on the lower face of the depressing pin 331.

Figure 32:
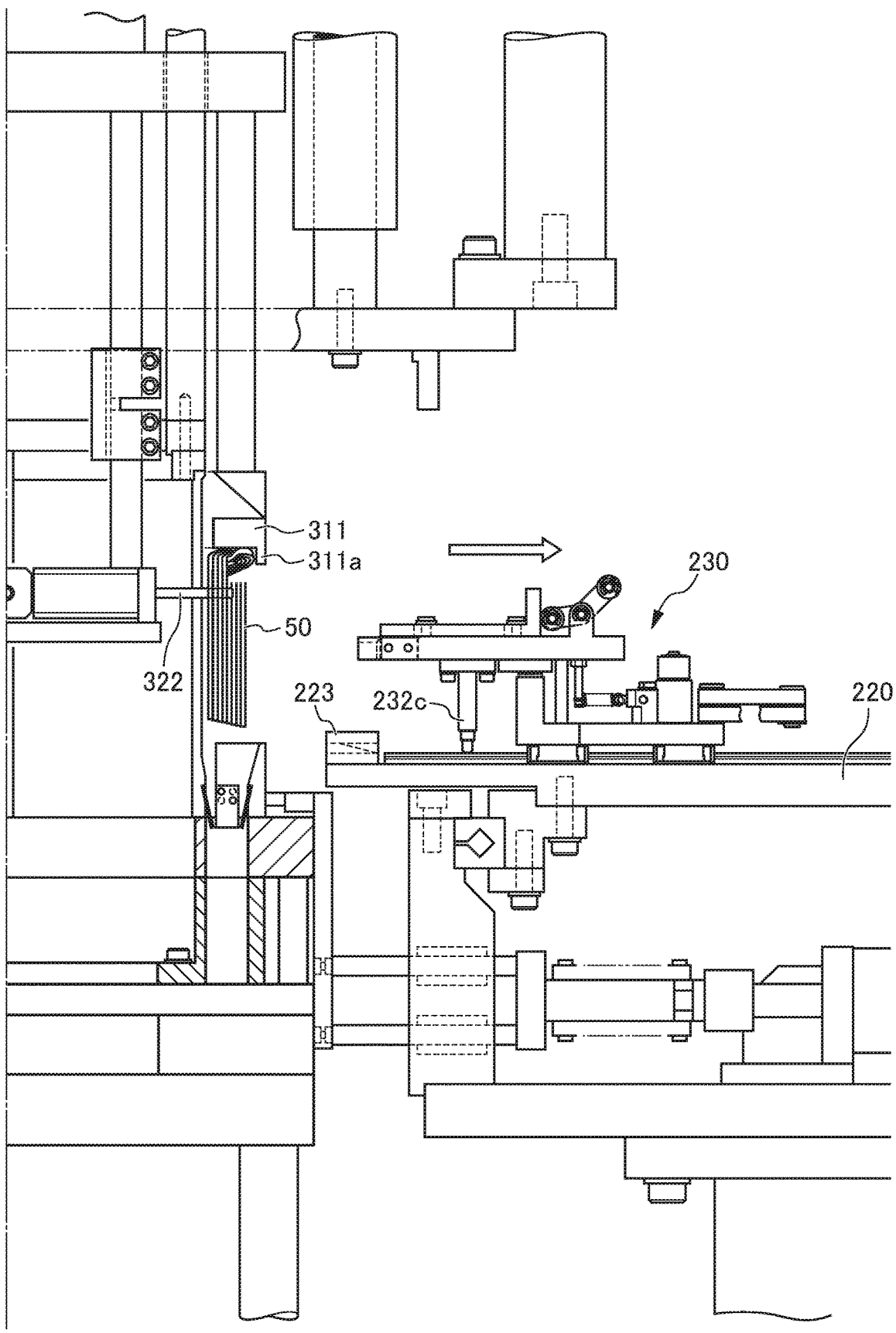
FIG. 32 is a view showing a state of causing the plurality of gripping devices according to the above-mentioned embodiment to retract in a radially outward direction.

FIG. 32 is a view showing a state of causing the plurality of gripping devices 230 according to the present embodiment to retract in the radially outward direction.

As shown in FIG. 32, in Step S44, the stator manufacturing device 1 imparts the drive force on the plurality of gripping devices 230 by causing the plate 255 attached to the slide rail 254 to move in the radially outward direction by driving the servo-motor 253 of the four drive mechanisms 250, and thus causes the plurality of gripping devices 230 to retract and scatter in the radially outward direction.

At this time, the pins 232c of the plurality of gripping devices 230 return to a state in which the upper branch 232 slants to the right towards the central axis C1 relative to the main body 231 due to the bias of the spring 233, when falling out in the radially outward direction from the correction groove 223 from a state arranged at the bottom face 223c of the correction groove 223 and being corrected to the side wall of the sloped face 223a. By causing to retract in the radially outward direction while maintaining the state of the plurality of gripping devices 230 being corrected by the correction groove 223 until the middle, interference between adjacent gripping devices 230 will not occur when the plurality of gathered gripping devices 230 retract in the radially outward direction.

Figure 33:
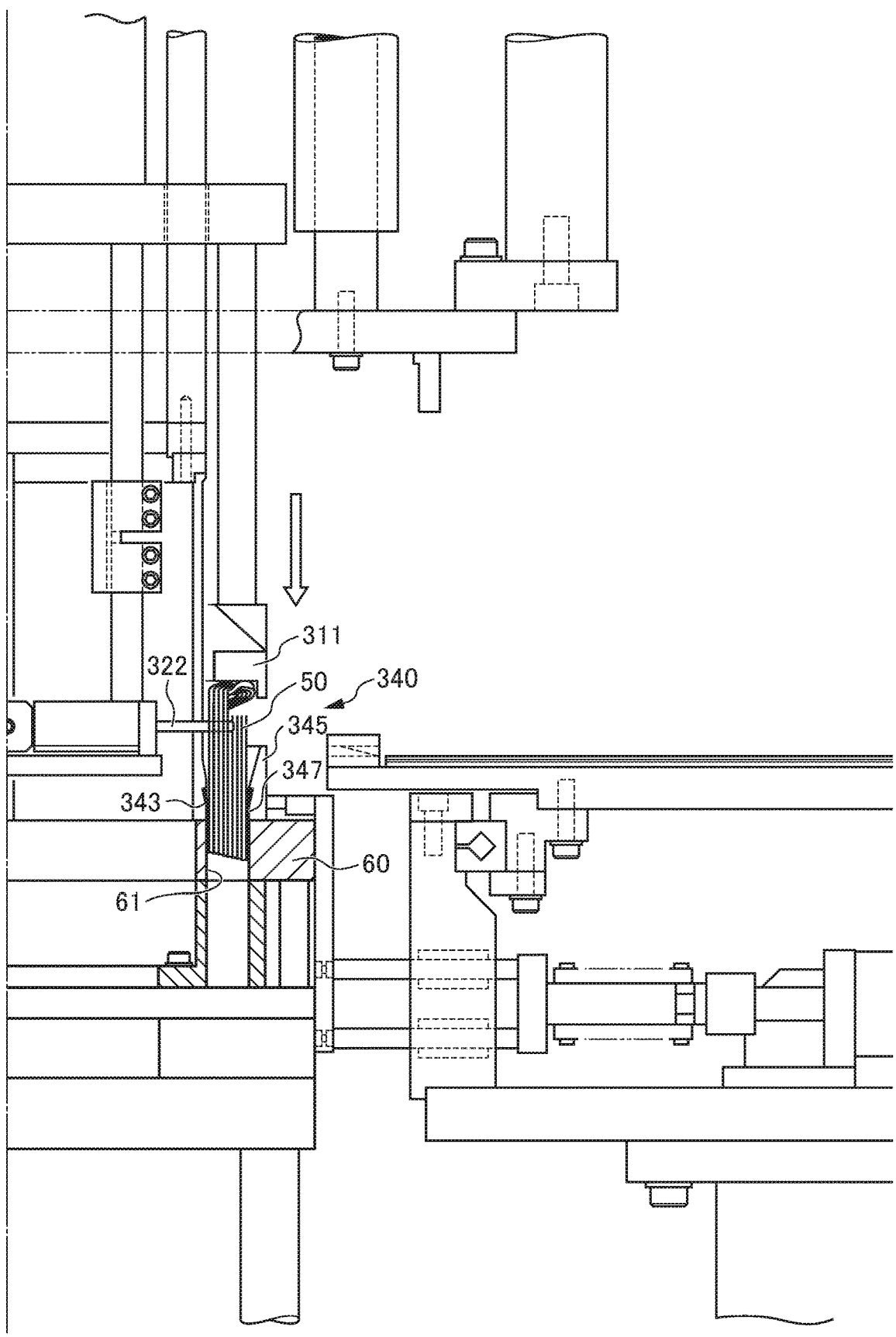
FIG. 33 is a view showing a state of inserting leg parts of each coil element of the assembly according to the above-mentioned embodiment into the respective slots of the stator core.

FIG. 33 is a view showing a state inserting the leg part 41 of each coil element 40 in the assembly 50 according to the present embodiment into the respective slots 61 of the stator core 60.

As shown in FIG. 33, in Step S45, the stator manufacturing device 1 causes the leg part 41 of each coil element 40 in the assembly 50 to be guided by the pair of first expanded plates 346 and the second expanded plate 347 along with the guide plate 343 and inserted into the respective slots 61 of the stator core 60, by causing the assembly 50 to lower by the lowering depressing member 311.

In other words, the lower ends of the pair of first expanded plates 346 and the second expanded plate 347 along with the guide plate 343 are in a state already inserted into the slot 61 into which insulating paper 62 is installed inside of the stator core 60 mounted in stator core mounting step S1. Then, when causing the assembly 50 to lower by the lowering depressing member 311, the leg part 41 of each coil element 40 in the assembly 50 is guided by the pair of first expanded plates 346 and the second expanded plate 347 along with the guide plate 343. The leg part 41 of each coil element 40 in the assembly 50 is thereby inserted in to the respective slots 61 of the stator core 60 without entangling in the insulating paper 62.

Figure 34:
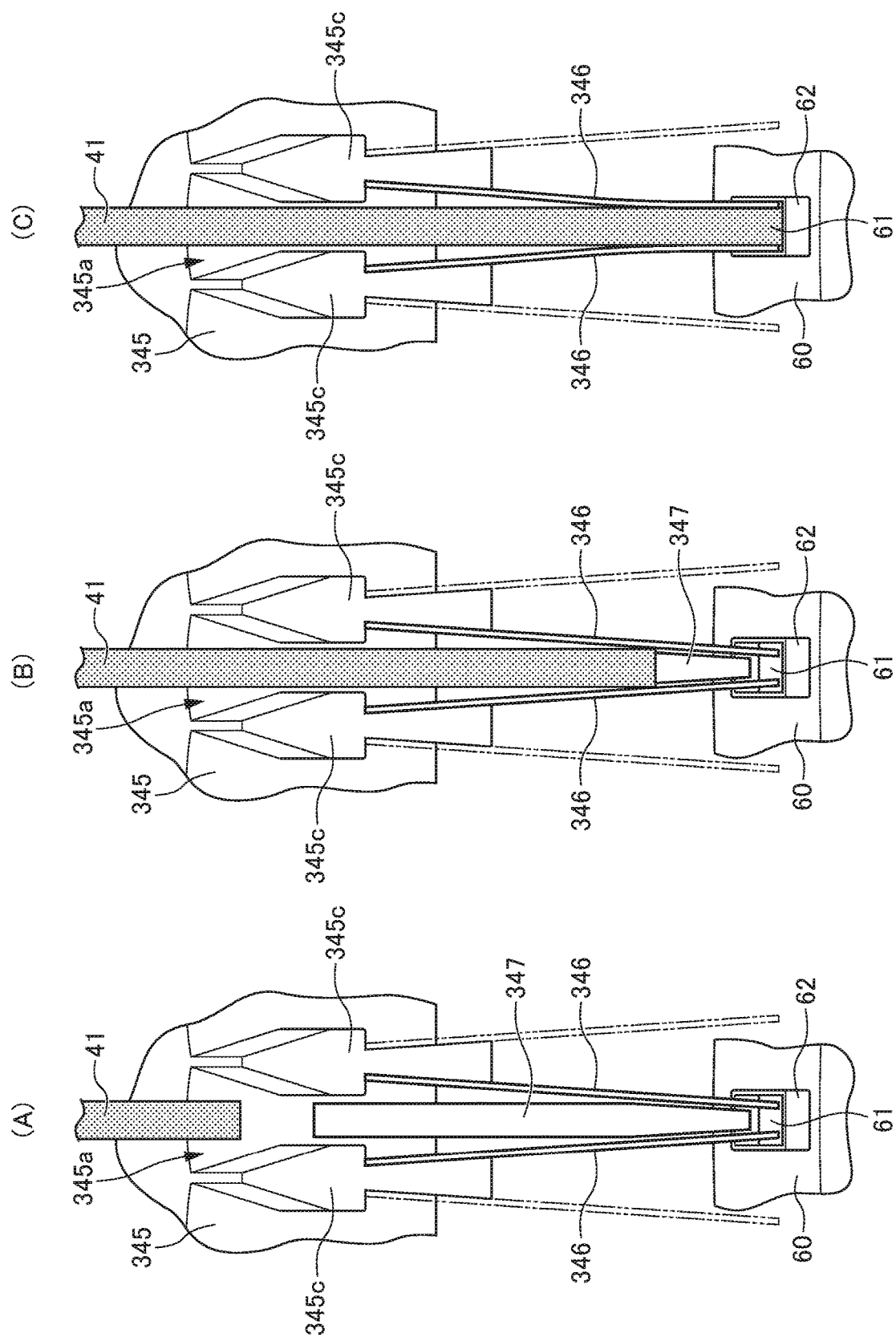
FIG. 34 is a view illustrating operations of the pair of first expanded plates and the second expanded plate along with the guide plate according to the above-mentioned embodiment.

FIG. 34 is a view illustrating the operations of the guide plate 343 as well as the pair of first expanded plates 346 and the second expanded plate 347, and is a view when looking at the guiding part 345 from the radially inward direction.

As shown in FIG. 34(A), the guiding part 345 has the tapered structure 345a that expands in the opposite direction from the insertion direction; therefore, even if the position of the leg part 41 of the coil element 40 and the position of the guiding part 345 shift slightly, the leg part 41 of the coil element 40 will be reliably guided between the pair of first expanded plates 346 and the second expanded plate 347 along with the guide plate 343.

Next, as shown in FIG. 34(B), the leg part 41 of the coil element 40 is inserted between the pair of first expanded plates 346 and the second expanded plate 347 along with the guide plate 343.

Next, as shown in FIG. 34(C), when the leg part 41 of the coil element 40 is inserted until the lower ends of the pair of first expanded plates 346 and the second expanded plate 347 along with the guide plate 343, the lower end sides of first expanded plates 346 and the second expanded plate 347 along with the guide plate 343 expand. Between the ends of the insulating paper 62 is thereby expanded, and in this state, the leg part 41 of the coil element 40 is inserted into the slot 61.

Figure 35:
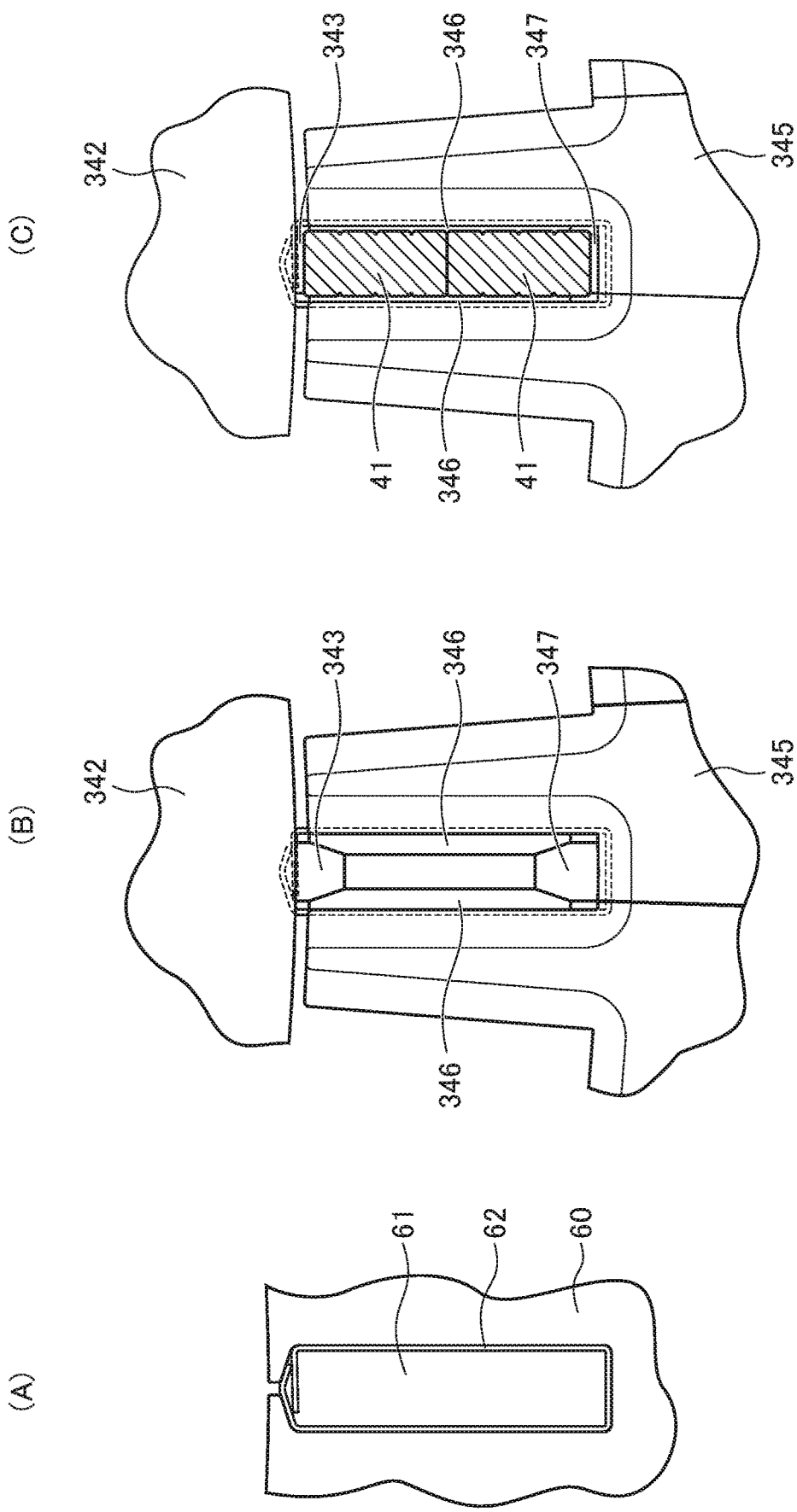
FIG. 35 is a view illustrating the operations of the pair of first expanded plate and second expanded plate along with the guide plate according to the above-mentioned embodiment.

FIG. 35 is a view illustrating operations of the pair of first expanded plates 346 and the second expanded plate 347 along with the guide plate 343 according to the present embodiment, and is a plan view in the vicinity of the slot 61.

As shown in FIG. 35(A), the insulating paper 62 is arranged inside of the slot 61 in advance.

Then, as shown in FIG. 35(B), when the guiding parts 345 gather at the time of ending the previous stator manufacture, the guiding part 345 is arranged above the slot 61. At this time, for the pair of first expanded plates 346 and the second expanded plate 347 along with the guide plate 343, the gap at the lower end sides thereof narrows.

Next, as shown in FIG. 35(C), when guided by the guiding part 345 and the leg part 41 of the coil element 40 is inserted between the pair of first expanded plates 346 and the second expanded plate 347 along with the guide plate 343, the ends of the insulating paper 62 are expanded by the lower end sides this pair of first expanded plates 346 and the second expanded plate 347 along with the guide plate 343 being expanded.

The ends of the insulating paper 62 are expanded in this above way, and the leg part 41 of the coil element 40 is reliably inserted into the slot 61.

Herein, as shown in FIG. 33, when the leg part 41 of each coil element 40 in the assembly 50 is inserted into the respective slots 61 of the stator core 60, the annular protrusion 311a at the lower face of the depressing member 311 guides the outer circumferential part of the turn section 42 of each coil element 40 in the assembly 50 from the outside diameter side. In this way, since the annular protrusion 311a at the lower face of the depressing member 311 inserts the leg part 41 of each coil element 40 in the assembly 50 into the respective slots 61 of the stator core 60 while guiding the outer circumferential side of the turn section 42 of each coil element 40 in the assembly 50 from the outside diameter side, the shape of the assembly 50 can be maintained, even if resistance arises during insertion when the lower end sides of the pair of first expanded plates 346 and the second expanded plate 347 along with the guide plate 343 expand.

Figure 36:
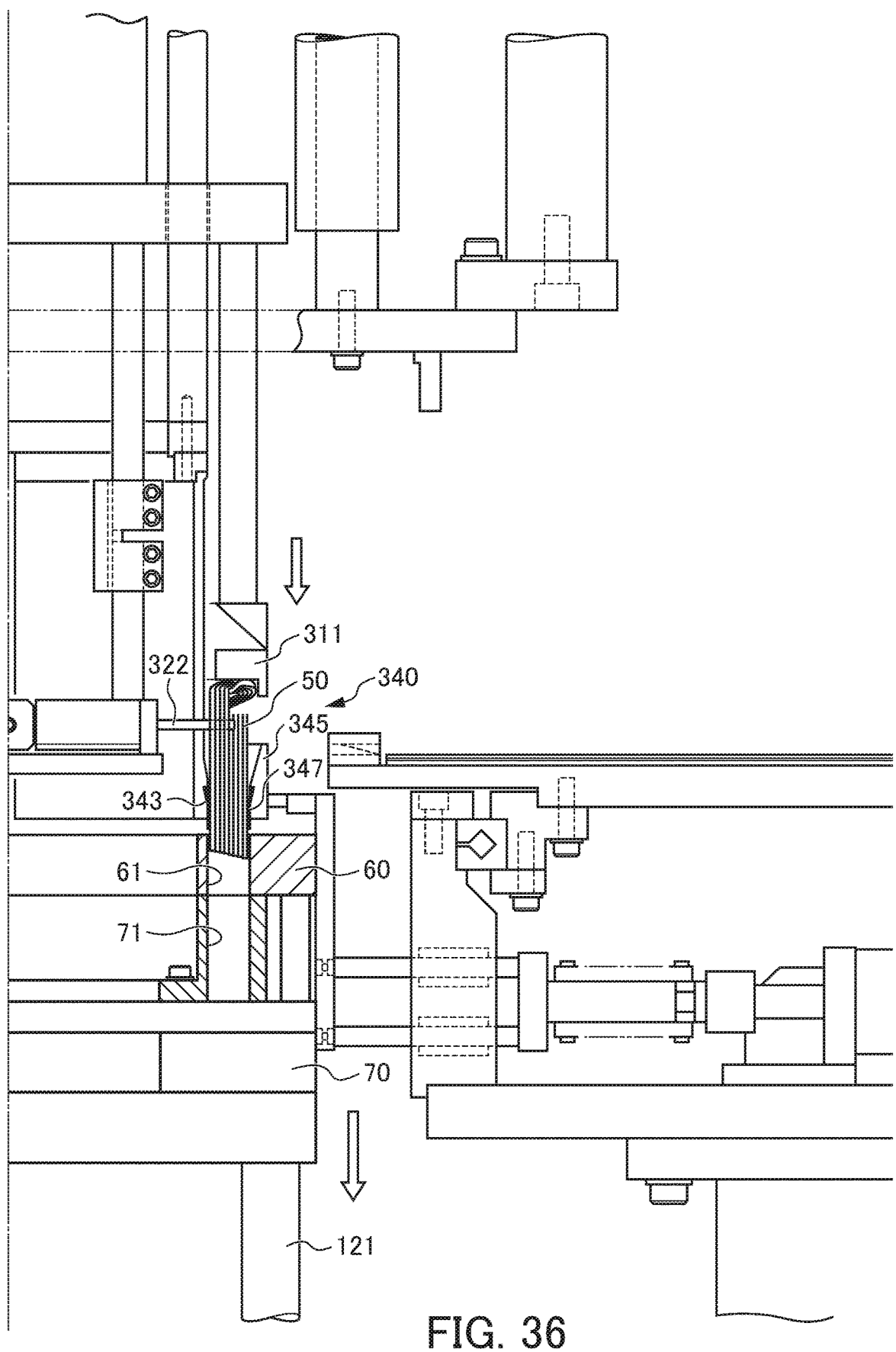
FIG. 36 is a view showing a state of causing the stator core according to the above-mentioned embodiment to descend.

FIG. 36 is a view showing a state of lowering the stator core 60 according to the present embodiment.

As shown in FIG. 36, in Step S46, the stator manufacturing device 1 causes the stator core 60 into which the leg parts 41 are inserted into the respective slots 61 to also lower, by lowering the assembly 50 with the depressing member 311 while lowering the four rods 121 of the lift mechanism 120. The lower ends of the pair of first expanded plates 346 and the second expanded plate 347 along with the guide plate 343 are thereby exposed by falling out from the lowered stator core 60.

Figure 37:
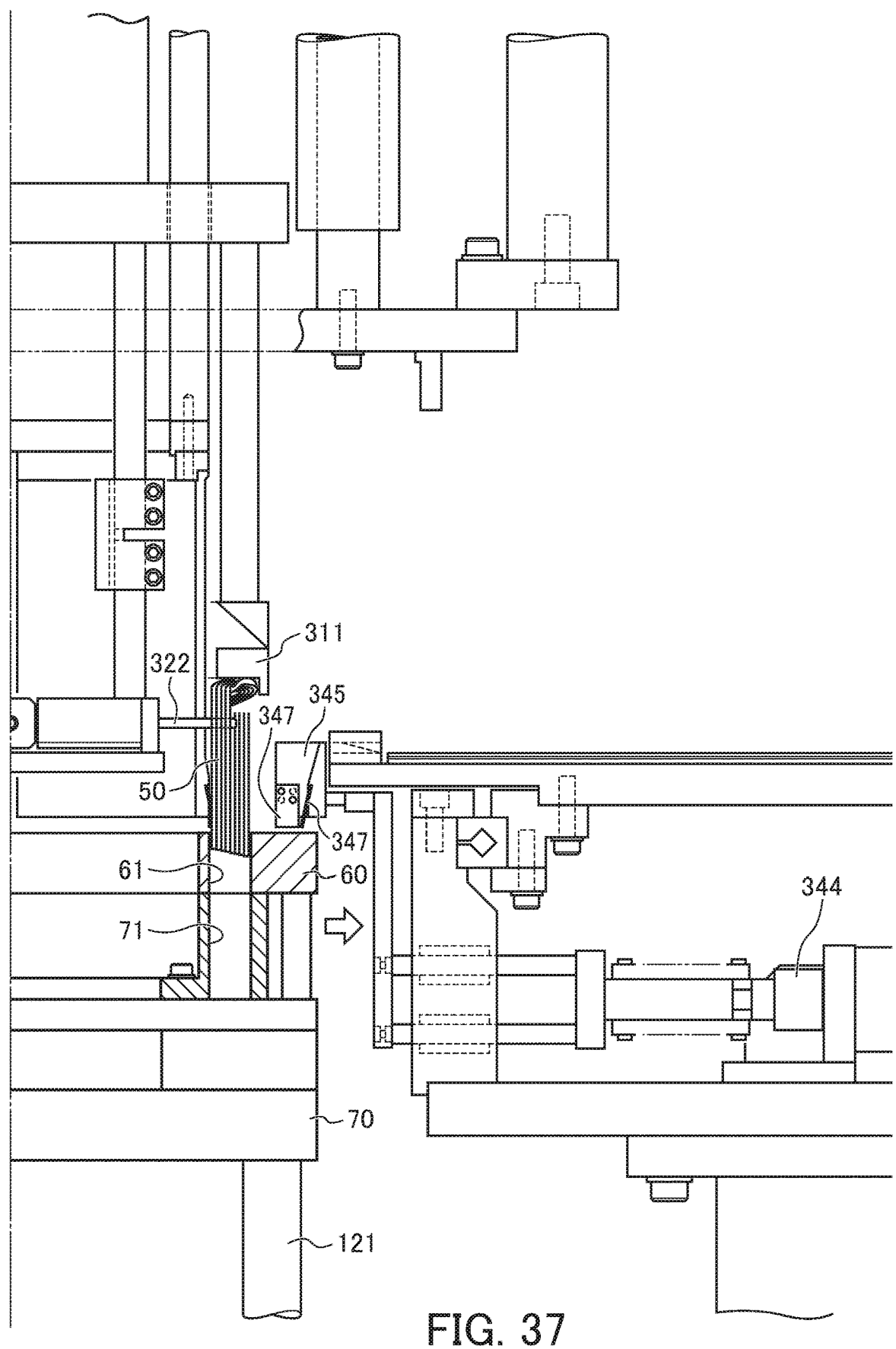
FIG. 37 is a view showing a state of causing the guiding part according to the above-mentioned embodiment to retract.

FIG. 37 is a view showing a state of causing the guiding part 345 according to the present embodiment to retract to the outside diameter side.

As shown in FIG. 37, in Step S47, the stator manufacturing device 1 causes the guiding part 345 to retract from the lowered trajectory range of the assembly 50 to the outside diameter side, by causing the guiding part 345 to slide in the radially outward direction by driving the piston of the cylinder mechanism, when the lower ends of the pair of first expanded plates 346 and the second expanded plate 347 along with the guide plate 343 are exposed by falling out from the lowered stator core 60.

Figure 38:
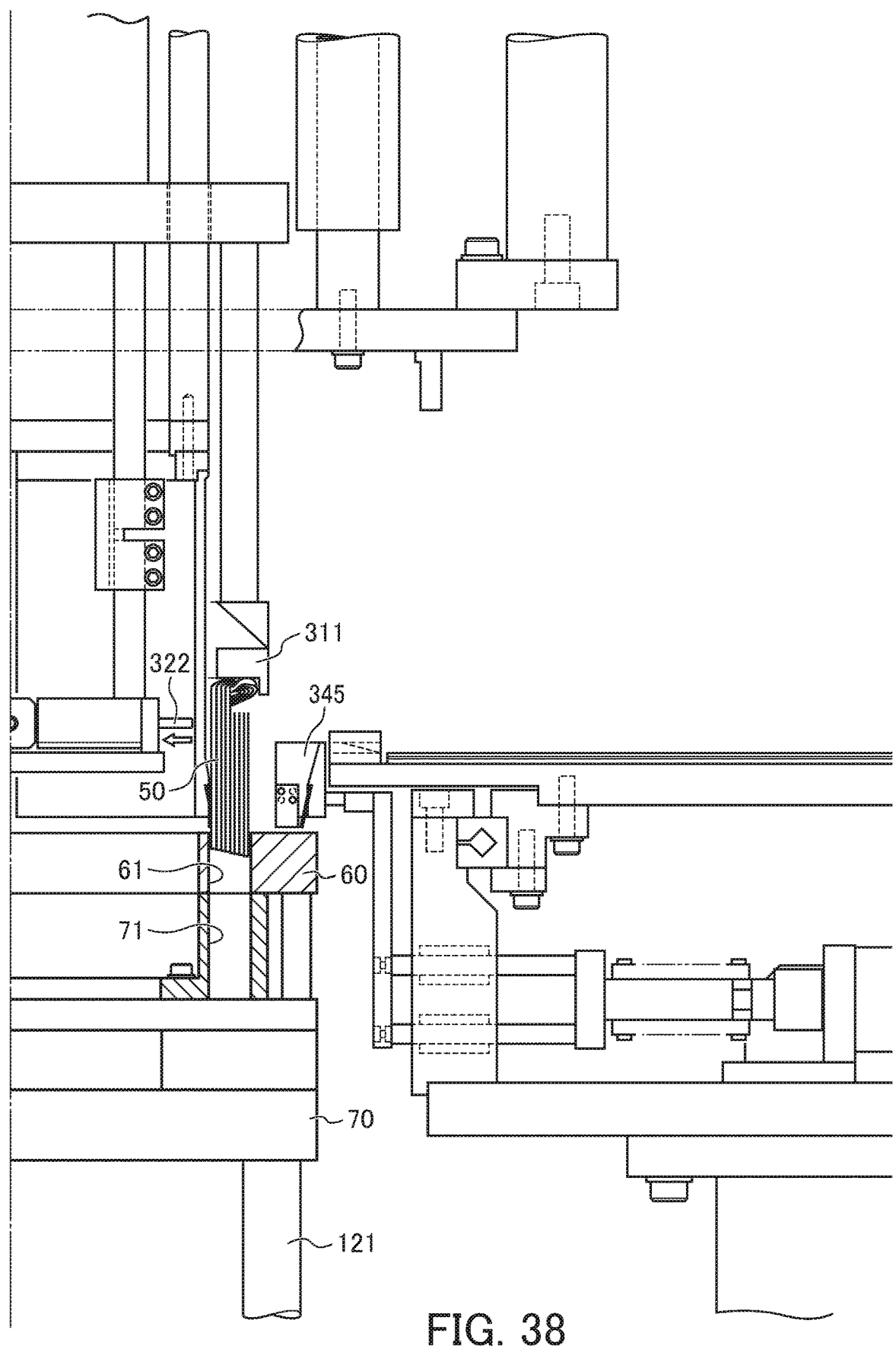
FIG. 38 is a view showing a state of drawing the pin according to the above-mentioned embodiment in an radially inward direction.

FIG. 38 is a view showing a state of drawing the pin 322 according to the present embodiment to the radially inward direction.

As shown in FIG. 38, in Step S48, the stator manufacturing device 1 draws the pin 322 projecting in order to support the assembly 50 to the radially inward direction. The assembly 50 thereby enters a state inserting each of the leg parts 41 into the respective slots 61 of the stator core 60, along with guiding the turn section 42 of each of the coil elements 40 in the assembly 50 from the outside diameter side by the annular protrusion 311a at the lower face of the depressing member 311.

Figure 39:
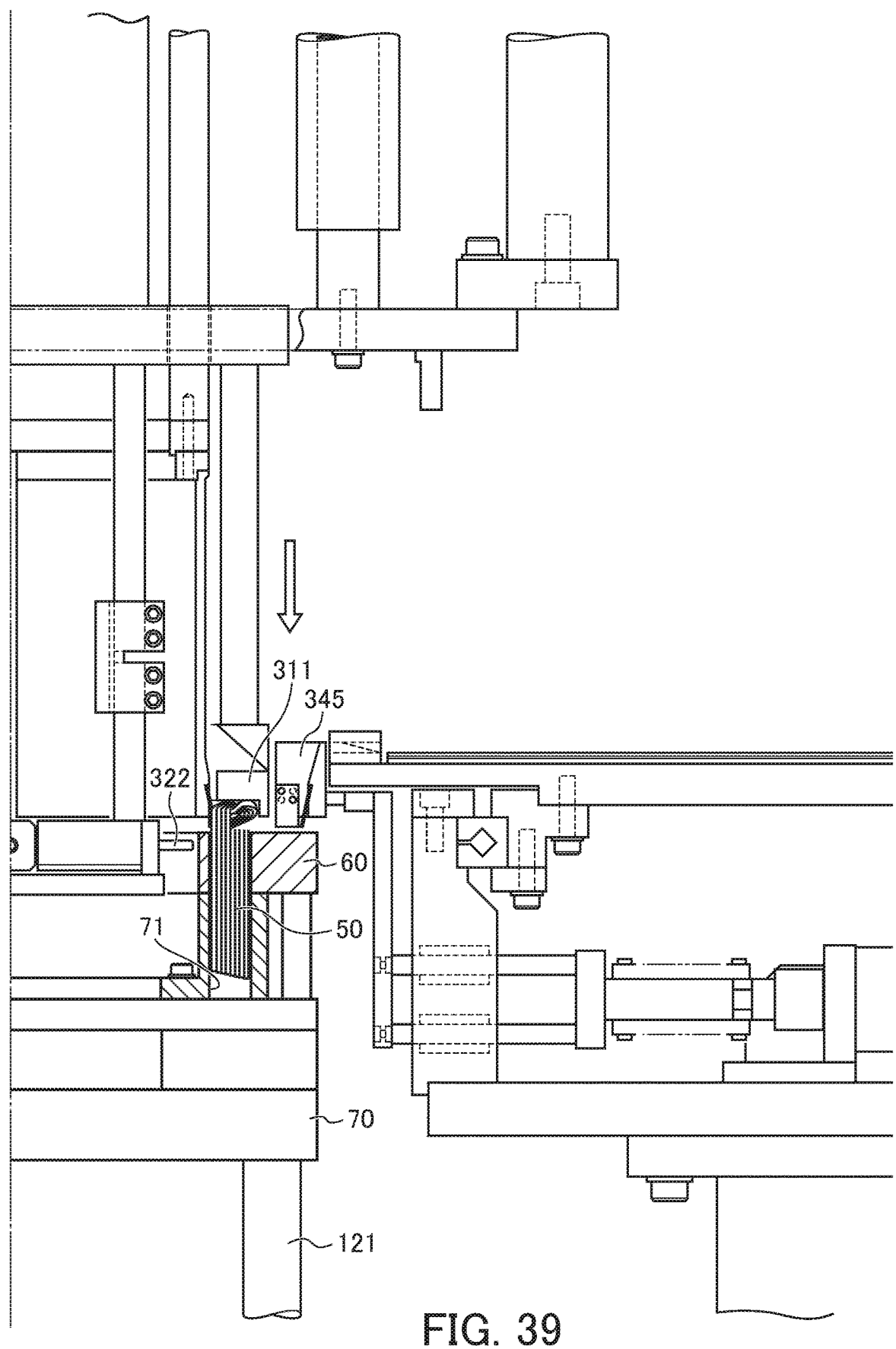
FIG. 39 is a view showing a state of completely inserting the leg part of each coil element in the assembly according to the above-mentioned embodiment into the respective slots of the stator core.

FIG. 39 is a view showing a state of completely inserting the leg part 41 of each coil element 40 in the assembly 50 according to the present embodiment into the respective slots 61 of the stator core 60.

As shown in FIG. 39, in Step S49, the stator manufacturing device 1 completely inserts the leg part 41 of each coil element 40 in the assembly 50 into the respective slots 61 of the stator core 60, by causing the assembly 50 to lower by the lowering depressing member 311, while fixing the four rods 121 of the lift mechanism 120.

At this time, the depressing member 311 lowers the inside diameter side of the guiding part 345 which has retracted to the radially outward direction.

The stator in which the leg parts 41 of the plurality of coil elements 40 are inserted into the respective slots 61 of the stator core 60 is manufactured as above.

Subsequently, the stator manufacturing device 1 places the jig 70 to which the stator core 60 is fixed on the conveying stand 112, by lowering the four rods 121 of the lift mechanism 120 which had pushed up the jig 70 to which the stator core 60 is fixed. Furthermore, the conveying stand 112 on which the jig 70 to which the stator core 60 is fixed is placed is then conveyed from the center of the stator manufacturing device 1 until the front left side end.

Finally, the operator removes, from the stator manufacturing device 1, the jig 70 to which the stator core 60 is fixed that was placed on the conveying stand 112 having reached the front left side end of the stator manufacturing device 1. In addition, the stator manufacturing device 1, after conveying the conveying stand 112 on which the jig 70 to which the stator core 60 is fixed is placed until the front left side end of the stator manufacturing device 1, by causing the guiding part 345 to slide in the radially inward direction by driving the piston of the cylinder mechanism, causes the guiding part 345 to advance to the inside diameter side until a position at which the arc-shaped guide 348 still does not abut the outer circumference of the stator core 60, and causes to standby, able to insert the lower ends of the pair of first expanded plates 346 and the second expanded plate 347 into the slots 61 of the next stator core 60.

The following effects are exerted according to the stator manufacturing device 1 according to the present embodiment.

(1) Each of the plurality of coil element 40 rotates about the rotation shaft 23e that is parallel to the annular central axis C1, while moving towards the annular center.

Since the plurality of the coil elements 40 thereby rotates, the diameter of the annular shape in which the plurality of coil elements 40 is arranged becomes smaller than a state not rotated, and interference between adjacent coil elements 40 is avoided, and thus the plurality of coil elements 40 are aligned in a state in which turn sections 42 provided to the substantially apex portion are alternately overlapped.

Therefore, when one leg part 41 possessed by the plurality of coil elements 40 is gripped and made to align, the leg parts 41 of adjacent coil elements 40 do not interfere immediately before alignment.

(2) The plurality of coil elements 40 rotate 10° to the right side towards the central axis C1 about the rotation shaft 231e that is parallel to the annular central axis C1; therefore, the diameter of the annular shape in which the plurality of coil elements 40 is arranged becomes smaller than a state no rotated, and interference between adjacent coil elements 40 is avoided.

(3) Each of the plurality of gripping devices 230 is biased by way of the spring 233 to the opposite direction to the direction rotating the coil elements 40 about the rotation shaft 231e that is parallel to the annular central axis C1 (state slanted 10° to the right side towards the central axis C1). For this reason, it is possible to rotate each of the plurality of coil elements 40 about the rotation shaft 231e that is parallel to the annular central axis C1, while causing to move towards the annular center.

(4) The pin 232c is guided in the correction groove 223 to cause the upper branch 232 gripping the coil element 40 to rotate, whereby each of the plurality of coil elements 40 can be rotated about the rotation shaft 231e that is parallel to the annular central axis C1, while causing to move towards the annular center.

It should be noted that the present invention is not to be limited to the above-mentioned embodiment, and that modifications and improvements within a scope capable of achieving the objects of the present invention are also encompassed by the present invention.

For example, although substantially U-shaped coil elements for a rotating electric machine are employed as the electrical conductors in the above-mentioned embodiment, so long as being electrical conductors, it is not particularly limited.

EXPLANATION OF REFERENCE NUMERALS

1 stator manufacturing device (insertion device)
40 coil element (electrical conductor)
223 correction groove
230 gripping device
231e rotation shaft
232 upper branch
232c pin
233 spring (biasing member)
250 drive mechanism
C1 central axis

The invention claimed is:

1. An alignment method for aligning a plurality of U-shaped electrical conductors as stator conductors of a rotating electrical machine in a state in which turn sections provided to an apex portion thereof are alternately overlapped, by arranging the plurality of electrical conductors in an annular shape, the method comprising:

causing the plurality of the electric conductors to move in a direction to reduce the diameter of the annular shape by utilizing a plurality of grippers and a plurality of slide rails, the plurality of grippers gripping the respective plurality of electric conductors, and the plurality of slide rails extending radially around a central axis of the annular shape to slidably guide movement of the plurality of grippers in a radial direction, and aligning the plurality of the electrical conductors by causing each of the plurality of the electrical conductors to rotate via rotation of the plurality of grippers about a shaft that is parallel to the central axis of the annular shape, while causing the plurality of the electric conductors to move towards the center of the annular shape via movement of the plurality of grippers in the radial direction, wherein each of the plurality of the electrical conductors is arranged in a state of maintaining a predetermined correcting rotation of a predetermined angle about the shaft that is parallel to the central axis of the annular shape by utilizing a correction groove and a pin provided correspondently, when aligning by reducing the diameter of the annular shape.

2. The alignment method according to claim 1, wherein an arrangement of the plurality of electrical conductors in the annular shape is performed such that the turn sections are separated from each other in the initial state and then put into an overlapped state with each other.

3. The alignment method according to claim 1, wherein retaining action is performed prior to the plurality of the electrical conductors rotating about the shaft, in the retaining action, one leg part of the U-shaped electrical conductors are retained, and then causing to move towards the center of the annular shape.

4. The alignment method according to claim 3, wherein the retaining action is performed while each of the retained portions of the one leg part of the U-shaped electrical conductors are positioned such that the heights thereof adjacent being alternately shifted in the direction parallel to the central axis of the annular shape.

* * * * *